(12) United States Patent
Kuo

(10) Patent No.: US 11,194,126 B2
(45) Date of Patent: Dec. 7, 2021

(54) ELECTRONIC DEVICE

(71) Applicant: LARGAN PRECISION CO., LTD., Taichung (TW)

(72) Inventor: Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 360 days.

(21) Appl. No.: 16/161,283

(22) Filed: Oct. 16, 2018

(65) Prior Publication Data

US 2019/0271832 A1 Sep. 5, 2019

(30) Foreign Application Priority Data

Mar. 2, 2018 (TW) ................................. 107107119

(51) Int. Cl.
| | | |
|---|---|---|
| *G02B 3/02* | (2006.01) | |
| *G02B 13/18* | (2006.01) | |
| *G02B 13/00* | (2006.01) | |
| *G02B 9/60* | (2006.01) | |

(52) U.S. Cl.
CPC ........... *G02B 13/0045* (2013.01); *G02B 9/60* (2013.01); *G02B 13/18* (2013.01)

(58) Field of Classification Search
CPC ....... G02B 9/60; G02B 13/0045; G02B 13/18
USPC ................................. 359/708, 714, 753, 754
See application file for complete search history.

(56) References Cited

U.S. PATENT DOCUMENTS

| | | |
|---|---|---|
| 5,398,136 A | 3/1995 | Ohzawa et al. |
| 8,736,984 B1 | 5/2014 | Hsieh et al. |
| 8,908,288 B2 | 12/2014 | Hsu et al. |
| 8,953,257 B1 | 2/2015 | Chen |
| 9,134,510 B2 | 9/2015 | Suzuki |
| 9,291,801 B2 | 3/2016 | Kubota et al. |
| 9,557,524 B2 | 1/2017 | Tang et al. |
| 9,581,789 B2 | 2/2017 | Liao et al. |
| 9,678,304 B2 | 6/2017 | Tang et al. |
| 9,678,327 B2 | 6/2017 | Harada |
| 9,933,600 B1 | 4/2018 | Fang |
| 2006/0127075 A1 | 6/2006 | Minakata et al. |
| 2010/0188555 A1 | 7/2010 | Hirao et al. |
| 2012/0194917 A1 | 8/2012 | Chen |
| 2013/0010181 A1 | 1/2013 | Baba |
| 2013/0010374 A1 | 1/2013 | Hsieh et al. |
| 2016/0139364 A1 | 5/2016 | Tang et al. |
| 2016/0139365 A1 | 5/2016 | Tang et al. |

(Continued)

FOREIGN PATENT DOCUMENTS

| | | |
|---|---|---|
| CN | 101421658 A | 4/2009 |
| CN | 102414597 A | 4/2012 |

(Continued)

*Primary Examiner* — Mahidere S Sahle
(74) *Attorney, Agent, or Firm* — McClure, Qualey & Rodack, LLP

(57) ABSTRACT

An electronic device includes at least one optical lens system. The optical lens system includes five lens elements, and the five lens elements are, in order from an outside to an inside, a first lens element, a second lens element, a third lens element, a fourth lens element and a fifth lens element. At least one of outside surfaces and inside surfaces of the first lens element, the second lens element, the third lens element, the fourth lens element and the fifth lens element is aspheric and includes at least one inflection point.

15 Claims, 27 Drawing Sheets

(56) References Cited

U.S. PATENT DOCUMENTS

| | | | |
|---|---|---|---|
| 2017/0131519 A1 | 5/2017 | Hsieh et al. | |
| 2017/0227742 A1 | 8/2017 | Hsieh et al. | |
| 2017/0235107 A1* | 8/2017 | Lai | G02B 13/0045 |
| | | | 359/714 |
| 2017/0336625 A1 | 11/2017 | Amanai et al. | |
| 2018/0143404 A1 | 5/2018 | Chen et al. | |
| 2018/0164551 A1 | 6/2018 | Kim | |
| 2019/0079270 A1* | 3/2019 | Tseng | G02B 13/18 |
| 2019/0079275 A1 | 3/2019 | Lai et al. | |

FOREIGN PATENT DOCUMENTS

| | | | |
|---|---|---|---|
| CN | 103837964 A | | 6/2014 |
| CN | 105607219 A | | 5/2016 |
| CN | 106802470 A | | 6/2017 |
| CN | 107065128 A | | 8/2017 |
| CN | 206563841 U | | 10/2017 |
| CN | 107422454 A | | 12/2017 |
| CN | 108107549 A | | 6/2018 |
| CN | 108363169 A | | 8/2018 |
| CN | 108363170 A | | 8/2018 |
| JP | 2013025202 A | | 2/2013 |
| JP | 2016014754 A | | 1/2016 |
| JP | 2017207658 A | | 11/2017 |
| TW | 106131474 | * | 9/2017 |
| TW | I606282 B | | 11/2017 |

* cited by examiner

ELECTRONIC DEVICE

RELATED APPLICATIONS

This application claims priority to Taiwan Application Serial Number 107107119, filed Mar. 2, 2018, which is herein incorporated by reference.

BACKGROUND

Technical Field

The present disclosure relates to an electronic device. More particularly, the present disclosure relates to an electronic device with at least one optical lens system.

Description of Related Art

With rapid developments of technologies, three-dimensional image capturing technology has further progressed, and its application field is becoming wider. The three-dimensional image capturing technology also can be combined with two-dimensional image capturing technology to add depth-of-field information to 2D images to achieve more applications.

Currently, the three-dimensional image capturing technology is widely applied to electronic device, such as face recognition systems, somatosensory game machines, augmented reality devices, driving assistance systems, various smart electronic products, multi-lens devices, wearable devices, digital cameras, identification systems, entertainment devices, sports devices, and home intelligence assistance systems. The common operating principle of the three-dimensional image capturing technology is to project light with specific characteristics (such as wavelength, pattern or periodicity, etc.) from a light source onto an object, and reflect it by different positions. The light is reflected by the position of different depths of the object, and then received by a lens assembly. The distance between each position of the object and the lens assembly can be obtained by analyzing the change in the characteristics of the reflected light, so as to determine the three-dimensional image structure of the object, or to determine the motion of the object by continuous shooting.

As the technology becomes more sophisticated, the requirements for projection capabilities and image quality have increased. The wider range of applications has also increased the requirements for angle of view and aperture, and the multifunctionality and miniaturization of electronic products have also caused volume restrictions. The conventional four-lens optical system has been difficult to achieve all the requirements at the same time.

SUMMARY

According to one aspect of the present disclosure, an electronic device includes at least one optical lens system. The optical lens system includes five lens elements, and the five lens elements are, in order from an outside to an inside, a first lens element, a second lens element, a third lens element, a fourth lens element and a fifth lens element. At least one of outside surfaces and inside surfaces of the first lens element, the second lens element, the third lens element, the fourth lens element and the fifth lens element is aspheric and includes at least one inflection point. At least four lens elements of the first lens element, the second lens element, the third lens element, the fourth lens element and the fifth lens element have Abbe numbers smaller than 38. When an axial distance between an outside surface of one of the lens elements closest to the outside and an inside surface of one of the lens elements closest to the inside is TD, an axial distance between the outside surface of the first lens element and an inside conjugation surface of the optical lens system is TL, a focal length of the optical lens system is f, a central thickness of the third lens element is CT3, an axial distance between the first lens element and the second lens element is T12, an axial distance between the second lens element and the third lens element is T23, and an axial distance between the third lens element and the fourth lens element is T34, the following conditions are satisfied:

$0.80 \text{ mm} < TD < 7.0 \text{ mm}$;

$1.55 < TL/f$; and $0 < CT3/(T12+T23+T34) < 10$.

According to another aspect of the present disclosure, an electronic device includes at least one optical lens system. The optical lens system includes five lens elements, the five lens elements are, in order from an outside to an inside, a first lens element, a second lens element, a third lens element, a fourth lens element and a fifth lens element. At least one of outside surfaces and inside surfaces of the first lens element, the second lens element, the third lens element, the fourth lens element and the fifth lens element is aspheric and includes at least one inflection point. At least four lens elements of the first lens element, the second lens element, the third lens element, the fourth lens element and the fifth lens element have Abbe numbers smaller than 38. When an axial distance between an outside surface of one of the lens elements closest to the outside and an inside surface of one of the lens elements closest to the inside is TD, half of a maximum field of view of the optical lens system is HFOV, a central thickness of the second lens element is CT2, and a central thickness of the third lens element is CT3, the following conditions are satisfied:

$0.80 \text{ mm} < TD < 7.0 \text{ mm}$;

$45.0 \text{ degrees} < \text{HFOV}$; and $0.10 < CT3/CT2 < 10$.

According to further another aspect of the present disclosure, an electronic device includes a sensing module, which includes a projection apparatus and a receiving apparatus. The projection apparatus includes an optical lens system and at least one light source, wherein the light source is disposed on an inside conjugation surface of the optical lens system. The receiving apparatus includes an optical lens system and an image sensor, wherein the image sensor is disposed on an inside conjugation surface of the optical lens system. The light from the light source of the projection apparatus is projected on a sensed object and is received by the receiving apparatus after a reflection, and is imaged on the image sensor. At least one optical lens system includes five lens elements, the five lens elements are, in order from an outside to an inside, a first lens element, a second lens element, a third lens element, a fourth lens element and a fifth lens element, and at least four lens elements of the five lens elements have Abbe numbers smaller than 38. In the optical lens system of each of the projection apparatus and the receiving apparatus, an axial distance between an outside surface of one of the lens elements closest to the outside and an inside surface of one of the lens elements closest to the inside is TD, a focal length of the optical lens system is f, an entrance pupil diameter of the optical lens system is EPD, and half of a maximum field of view of the optical lens system is HFOV, the following conditions are satisfied in the at least one of the optical lens systems:

0.80 mm<TD<7.0 mm;

f/EPD<3.0; and 30.0 degrees<HFOV.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
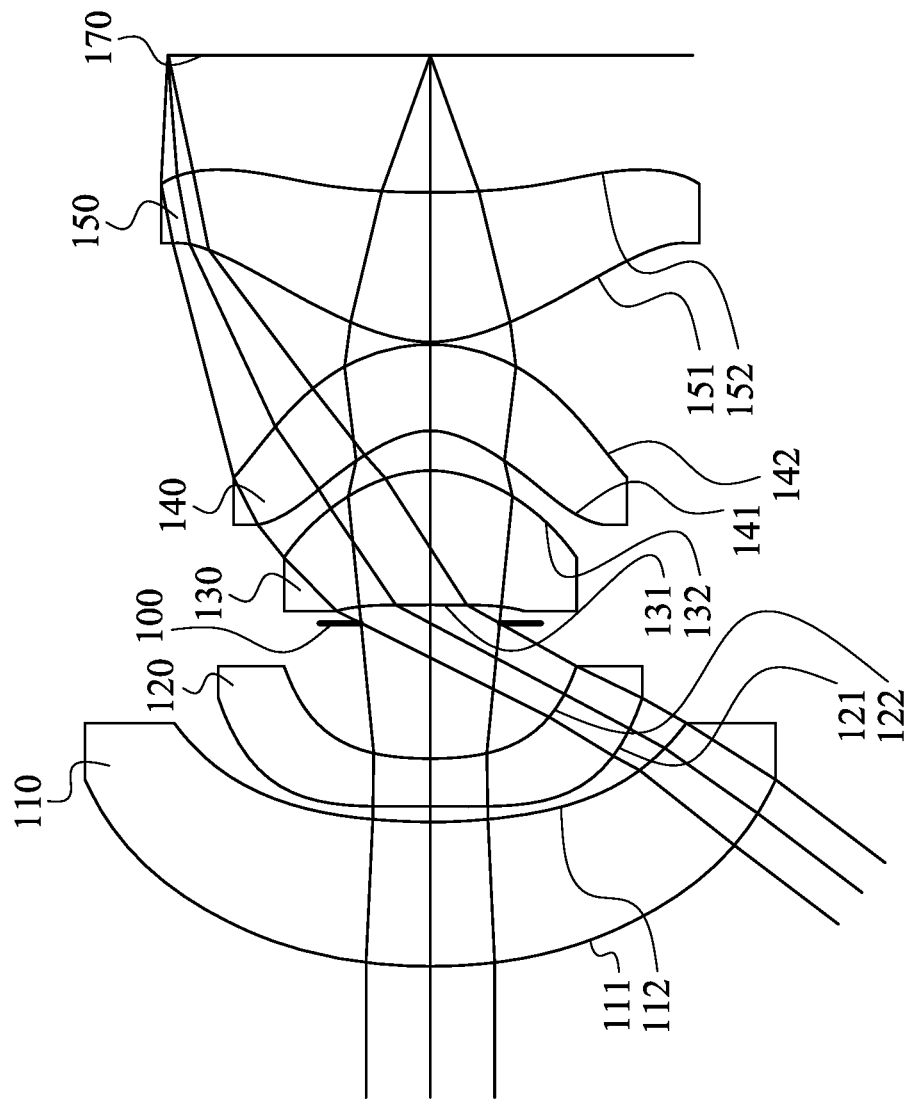
FIG. 1 is a schematic view of an electronic device according to the 1st embodiment of the present disclosure.

An electronic device includes at least one optical lens system, which can be applied to an infrared band, especially for the application of infrared projection and reception. Thus, it is favorable for adapting to three-dimensional image capturing technologies by obtaining high precision of projection ability and high image quality and also maintaining compactness.

The optical lens system includes five lens elements. High-accuracy projection capability and high image quality can be achieved, and an appropriate angle of view, aperture size, and volume can be achieved by adjusting the material of the lens and matching its components. The five lens elements are, in order from an outside to an inside, a first lens element, a second lens element, a third lens element, a fourth lens element and a fifth lens element.

According to the optical lens system of the present disclosure, there is an air gap between every adjacent lens elements of the first lens element, the second lens element, the third lens element, the fourth lens element and the fifth lens element. That is, each of the first through fifth lens elements is a single and non-cemented lens element. Moreover, the manufacturing process of the cemented lenses is more complex than the non-cemented lenses. In particular, a cementing surface of one lens element and a cementing surface of the following lens element need to have accurate curvature to ensure these two lens elements will be highly cemented. However, during the cementing process, those two lens elements might not be highly cemented due to displacements and it is thereby not favorable for image quality of the optical lens system. Therefore, according to the optical lens system of the present disclosure, having an air gap in a paraxial region between every adjacent lens elements of the first lens element, the second lens element, the third lens element, the fourth lens element and the fifth lens element of the present disclosure avoids the problems of the cemented lens elements, provide more flexible in the surface shape design of lens element, which is favorable for reducing the size thereof and correcting aberrations.

According to the optical lens system of the present disclosure, at least one of outside surfaces and inside surfaces of the first lens element, the second lens element, the third lens element, the fourth lens element and the fifth lens element is aspheric and includes at least one inflection point. Therefore, it is favorable for correcting aberrations and reducing the size thereof as well as adjusting the light path, so as to enhance the illumination of the image. Preferably, each of at least two of the outside surfaces and the inside surfaces of the first lens element, the second lens element, the third lens element, the fourth lens element and the fifth lens element is aspheric and includes at least one inflection point. More preferably, each of at least three of the outside surfaces and the inside surfaces of the first lens element, the second lens element, the third lens element, the fourth lens element and the fifth lens element is aspheric and includes at least one inflection point.

At least one of the outside surfaces and the inside surfaces of the first lens element, the second lens element, the third lens element, the fourth lens element and the fifth lens element includes at least one critical point in an off-axis region thereof. Therefore, it is favorable for correcting off-axis aberrations, decreasing the incident angle or exiting angle of light on an inside conjugation surface and enhancing the illumination of the peripheral image by adjusting the light path in a peripheral region. When the incident angle or exiting angle of light on the inside conjugation surface is smaller, it is favorable for improving the projection ability of the light source in the projection apparatus, and it is favorable for increasing the response efficiency of the image sensor in the receiving apparatus and the image capturing apparatus. Preferably, at least one of the outside surface and the inside surface of the fifth lens element includes at least one critical point in an off-axis region thereof. More preferably, the inside surface of the fifth lens element includes at least one critical point in an off-axis region thereof.

Furthermore, the fifth lens element has an inside surface being concave in a paraxial region thereof. Therefore, it is favorable for adjusting the back focus length and correcting astigmatism.

At least four lens elements of the first lens element, the second lens element, the third lens element, the fourth lens element and the fifth lens element have Abbe numbers smaller than 38. Therefore, it is favorable for correcting aberrations by utilizing the material with low Abbe number which generally has more excellent ability of light refraction. Especially, correction of chromatic aberrations is not that important when the optical lens system is applied to the infrared band, and it is favorable for correcting other kind of aberrations and reducing the size thereof so as to obtain compact optical lens system. Preferably, at least four lens elements of the first lens element, the second lens element, the third lens element, the fourth lens element and the fifth lens element have the Abbe numbers smaller than 35. More preferably, at least four lens elements of the first lens element, the second lens element, the third lens element, the fourth lens element and the fifth lens element have the Abbe numbers smaller than 32.

When an axial distance between the outside surface of one of the lens elements closest to the outside and the inside surface of one of the lens elements closest to the inside is TD, the following condition is satisfied: 0.80 mm<TD<7.0 mm. Therefore, it is favorable for wider application by reducing the size of the optical lens system and maintaining the compact size of the optical lens system. Preferably, the following condition can be satisfied: 1.0 mm<TD<6.0 mm.

When an axial distance between the outside surface of the first lens element and the inside conjugation surface of the optical lens system is TL, and a focal length of the optical lens system is f, the following condition is satisfied: 1.55<TL/f. Therefore, it is favorable for obtaining the balance between the size of the optical lens system and the field of view. Preferably, the following condition can be satisfied: 1.70<TL/f<10.0.

When a central thickness of the third lens element is CT3, an axial distance between the first lens element and the second lens element is T12, an axial distance between the second lens element and the third lens element is T23, and an axial distance between the third lens element and the fourth lens element is T34, the following condition is satisfied: 0<CT3/(T12+T23+T34)<10. Therefore, it is favorable for maintaining short total track length of the optical lens system and providing enough space between the lens elements to correct aberrations by appropriately adjusting the ratio of the thickness of the lens element to the space between the lens elements. Preferably, the following condition can be satisfied: 0.10<CT3/(T12+T23+T34)<6.5.

When half of a maximum field of view of the optical lens system is HFOV, the following condition is satisfied: 30.0 degrees<HFOV. Therefore, it is favorable for wider application by wide field of view of the optical lens system. Preferably, the following condition can be satisfied: 45.0 degrees<HFOV. More preferably, the following condition can be satisfied: 50.0 degrees<HFOV<80.0 degrees. Therefore, it is favorable for avoiding excessive distortions in a peripheral image.

When a central thickness of the second lens element is CT2, and the central thickness of the third lens element is CT3, the following condition is satisfied: 0.10<CT3/CT2<10. Therefore, it is favorable for correcting off-axis aberrations by matching the second lens element and the third lens element. Preferably, the following condition can be satisfied: 0.15<CT3/CT2<7.0.

When the focal length of the optical lens system is f, and an entrance pupil diameter of the optical lens system is EPD, the following condition is satisfied: f/EPD<3.0. Therefore, it is favorable for obtaining the balance between the size of the aperture and the field of view and enhancing the illumination of the image. Preferably, the following condition can be satisfied: 1.0<f/EPD<2.0.

When the measurement is made in accordance with the reference wavelength as the d-line, an Abbe number of the first lens element is Vd1, an Abbe number of the second lens element is Vd2, an Abbe number of the third lens element is Vd3, an Abbe number of the fourth lens element is Vd4, and an Abbe number of the fifth lens element is Vd5, the following condition is satisfied: 50.0<Vd1+Vd2+Vd3+Vd4+Vd5<200. Therefore, it is favorable for reducing the generation of aberrations by complementary effect through appropriately adjusting the material of the lens element. Preferably, the following condition can be satisfied: 70.0<Vd1+Vd2+Vd3+Vd4+Vd5<190. More preferably, the following condition can be satisfied: 90.0<Vd1+Vd2+Vd3+Vd4+Vd5<180. In detail, the Abbe numbers Vd1, Vd2, Vd3, Vd4 and Vd5 are calculated by Vd=(Nd−1)/(NF−NC), wherein Nd is the refractive index measured with a wavelength as helium d-line (587.6 nm), NF is the refractive index measured with a wavelength as hydrogen F-line (486.1 nm), and NC is the refractive index measured with a wavelength as hydrogen C-line (656.3 nm).

When an axial distance between the fourth lens element and the fifth lens element is T45, and a central thickness of the fifth lens element is CT5, the following condition is satisfied: 0<T45/CT5<1.50. Therefore, it is favorable for correcting off-axis aberrations and decreasing the incident angle or the exiting angle of light on the inside conjugation surface by adjusting arrangement of the lens elements of optical lens system. Preferably, the following condition can be satisfied: 0<T45/CT5<1.10.

When the axial distance between the outside surface of one of the lens elements closest to the outside and the inside surface of one of the lens elements closest to the inside is TD, and an axial distance between the inside surface of the fifth lens element and the inside conjugation surface of the optical lens system is BL, the following condition is satisfied: 2.50<TD/BL<30.0. Therefore, it is favorable for decreasing the incident angle or the exiting angle of light on the inside conjugation surface by adjusting the light path and reducing the total track length of the optical lens system through appropriate adjustment in the ratio of the space and the thickness of the lens element to the back focus of the optical lens system. Preferably, the following condition can be satisfied: 3.20<TD/BL<25.0.

When the axial distance between the outside surface of the first lens element and the inside conjugation surface of the optical lens system is TL, and a maximum optical effective radius of the inside conjugation surface of the optical lens system is YI, the following condition is satisfied: 0.80<TL/YI<5.5. Therefore, it is favorable for obtaining the balance between shortening the total track length of the optical lens system and increasing the area of the inside conjugate surface of the optical lens system. Preferably, the following condition can be satisfied: 1.0<TL/YI<4.0.

When the central thickness of the third lens element is CT3, and the central thickness of the fifth lens element is CT5, the following condition is satisfied: 0.10<CT3/CT5<6.0. Therefore, it is favorable for decreasing the incident angle or the exiting angle of light on the inside conjugation surface by adjusting the light path through the third lens element and the fifth lens element with appropriate thickness. Preferably, the following condition can be satisfied: 0.25<CT3/CT5<4.0.

When a curvature radius of the inside surface of the fourth lens element is R8, and a maximum optical effective radius of the inside surface of the fourth lens element is Y42, the following condition is satisfied: |R8|/Y42<1.25. Therefore, it is favorable for correcting off-axis astigmatism and field curvature by adjusting the surface shape of the fourth lens element.

When the focal length of the optical lens system is f, a focal length of the first lens element is f1, a focal length of the second lens element is f2, a focal length of the third lens element is f3, a focal length of the fourth lens element is f4, and a focal length of the fifth lens element is f5, the following conditions are satisfied: −1.5<f/f1<1.5; −2.0<f/f2<2.0; −1.8<f/f3<1.8; −2.0<f/f4<2.5; and −2.5<f/f5<1.5. Therefore, it is favorable for preventing aberrations when reducing the size of the optical lens system by providing appropriate strength of the refractive power. Preferably, the following conditions can be satisfied: −1.0<f/f1<1.0; −1.0<f/f2<1.5; −1.4<f/f3<1.4; −1.5<f/f4<2.0; and −2.0<f/f5<1.2.

When a displacement in parallel with an optical axis from an axial vertex on the outside surface of the fifth lens element to a maximum effective radius position on the outside surface of the fifth lens element is Sag51, and the central thickness of the fifth lens element is CT5, the following condition is satisfied: −0.50<Sag51/CT5<1.0. Therefore, it is favorable for correcting off-axis aberrations and decreasing the incident angle or exiting angle of light on the inside conjugation surface by adjusting the surface shape of the fifth lens element. Preferably, the following condition can be satisfied: −0.15<Sag51/CT5<0.85. Wherein, Sag51 is negative toward the outside and positive toward the inside.

When a maximum optical effective radius of the inside conjugation surface of the optical lens system is YI, and a maximum optical effective radius of the inside surface of the fifth lens element is Y52, the following condition is satisfied: 0.60<YI/Y52<1.10. Therefore, it is favorable for obtaining the balance between increasing the area of the inside conjugate surface of the optical lens system and compressing the size of the optical lens system.

At least one of the outside surfaces and the inside surfaces of the first lens element, the second lens element, the third lens element, the fourth lens element and the fifth lens element includes at least one critical point in an off-axis region thereof, a vertical distance between the critical point and the optical axis is Yc, and a maximum optical effective radius of the surface where the critical point located is Y, the following condition is satisfied: 0.10<Yc/Y<0.90. Therefore, it is favorable for increasing the effect of the critical point and improving the manufacturing and assembly yields by appropriately adjusting the surface shape of the lens element.

When a maximum value of central thicknesses of the lens elements of the optical lens system is CT max, and a minimum value of the central thicknesses of the lens elements of the optical lens system is CT min, the following condition is satisfied: 2.00<CT max/CT min<10.0. Therefore, it is favorable for maintaining short total track length of the optical lens system and avoiding over-thickness or thinness of the lens element which would cause reduction in forming yield by adjusting the thickness of each lens element. Preferably, the following condition can be satisfied: 2.90<CT max/CT min<7.50.

When a maximum value of absolute values of refractive power of the lens elements in the optical lens system is |P| max, the following condition is satisfied: |P| max<1.70. Therefore, it is favorable for reducing aberrations, such as spherical aberrations, and reducing sensitivity to increase yield by avoiding excessive refractive power of the single lens elements.

When the displacement in parallel with the optical axis from the axial vertex on the outside surface of the fifth lens element to the maximum effective radius position on the outside surface of the fifth lens element is Sag51, and a maximum optical effective radius of the outside surface of the fifth lens element is Y51, the following condition is satisfied: −0.20<Sag51/Y51<0.80. Therefore, it is favorable for reducing the curvature of the surface of the fifth lens element while correcting off-axis aberrations, so as to reduce the difficulty of manufacturing and assembly and increase the yield. Preferably, the following condition can be satisfied: −0.10<Sag51/Y51<0.60.

When a maximum optical effective radius of the outside surface of the first lens element is Y11, and a maximum optical effective radius of the inside surface of the fifth lens element is Y52, the following condition is satisfied: 0.10<Y11/Y52<1.6. Therefore, it is favorable for reducing the size of the optical lens system by appropriately adjusting the outer diameter of the lens element, also increasing field of view, and decreasing the incident angle or exiting angle of light on the inside conjugation surface by adjusting the light path.

The optical lens system can further include an aperture stop disposed on an outside of the third lens element, when an axial distance between the aperture stop and the inside conjugation surface of the optical lens system is SL, and the axial distance between the outside surface of the first lens element and the inside conjugation surface of the optical lens system is TL, the following condition is satisfied: 0.40<SL/TL<1.1. Therefore, it is favorable for decreasing the incident angle or exiting angle of light on the inside conjugation surface and maintaining an appropriate field of view for the optical lens system by adjusting the aperture position.

The optical lens system can be applied to the infrared band within a wavelength ranged from 750 nm to 1500 nm so as to decrease the interference from the background light for obtaining higher projection quality or higher image quality. The optical lens system can be applied to the visible light band and the infrared band at the same time, so that the application range of the electronic device can be expanded and the demand of compact size can be obtained by reducing the used number of optical lens system.

The electronic device can include a receiving apparatus, which can include an imaging lens system and an image sensor, wherein the image sensor is disposed on the inside conjugation surface of the imaging lens system. Preferably, the imaging lens system of the receiving apparatus can be applied to an infrared band, wherein the image sensor can be utilized for detecting the light within the infrared band. The receiving apparatus can further include other element with filter function. The imaging lens system can be the same or different from the optical lens system of the present disclosure.

The electronic device can include a projection apparatus, which can include a projection lens system and at least one light source, wherein the light source is disposed on the inside conjugation surface of the projection lens system. The projection lens system of the projection apparatus can project the light from the light source onto the outside conjugation surface. Preferably, the light from the light source can be within the infrared band, and the projection lens system of the projection apparatus can be applied to an infrared band. The projection lens system can be the same or different from the optical lens system of the present disclosure.

The aforementioned projection apparatus can include a high directivity (low divergence) and a high intensity light source, wherein the light source can be a laser, SLED, Micro-LED, RCLED, a vertical cavity surface emitting laser (VCSEL), etc., and the light source can be a single light source or multiple light sources disposed on the inside conjugation surface of the projection lens system, so as to provide high projection quality. When the light source of the projection apparatus according to the present disclosure is a vertical cavity surface emitting laser and disposed on the inside conjugation surface of the projection lens system, it is favorable for providing a high directivity, a low divergence and a high intensity light source by proper light arrangement, so as to increase the illuminance of the outside conjugation surface of the projection lens system.

The aforementioned light source can be composed by a laser array, which can be formed into a structured light through the projection lens system, and projected on a sensed object. The structured light can utilize the structure, such as dot, spot or stripe, etc., but is not limited thereto.

Furthermore, the aforementioned projection apparatus can further include a diffraction element, a focus tunable component, an adjustable aperture or a reflective element. By the arrangement of the diffraction element, it is favorable for projecting the light onto the projection surface evenly, or diffracting the light to increase the angle of projection and increase the area of light projection. By the arrangement of the focus tunable component, it is favorable for adjusting the focus of the projection lens system for different environmental factors, so that the picture can be clearly presented. By the arrangement of the adjustable aperture, it is favorable for appropriately adjusting the light input or light output according to environmental changes, so as to expand the application range. By the arrangement of the reflective element (like prism or mirror), it is favorable for increasing the flexibility of space configuration. According to the present disclosure, the diffraction element can be a diffuser, a raster or a combination thereof. The surface of the diffraction element can have a microstructure (such as a grating, but not limited thereto), which can scatter the light beam and reproduce the generated speckle pattern, so as to expand the projection angle of the projection apparatus.

The electronic device can include sensing module, which can include the aforementioned projection apparatus and the aforementioned receiving apparatus. In the sensing module, the light from the light source of the projection apparatus is projected on a sensed object through the projection lens system and is received by the receiving apparatus after a reflection, and is imaged on the image sensor of the imaging lens system. The received information can be analyzed by the processor to obtain the relative distances of various parts of the sensed object, and then the three-dimensional shape change of the surface of the sensed object can be obtained.

The electronic device can include an image capturing apparatus, which can include an image capturing lens assembly and an image sensor, wherein the image sensor is disposed on the inside conjugation surface of the image capturing lens assembly. The image capturing apparatus can be used for photography, and the light can be imaged on the image sensor through the image capturing lens assembly. The image capturing apparatus can be matched with the sensing module to achieve wider applications. The image capturing lens assembly can be the same or different from the optical lens system of the present disclosure.

According to the electronic device of the present disclosure, the outside refers to outside of mechanism, the inside refers to inside of mechanism. Taking the receiving apparatus as an example, the inside direction refers to an image-side direction, the inside surface refers to an image-side surface, the outside direction refers to an object-side direction, the outside surface refers to an object-side surface. Taking the projection apparatus as an example, the inside direction is a light source direction, that is, a reduction side, the inside surface is a light incident surface, the outside direction is a projection direction, that is, a magnification side, the outside surface is a light exiting surface. The inside conjugation surface is located on the focus surface inside of the mechanism, that is, the image surface of the image capturing apparatus, and the conjugation surface of the reduction side of the projection apparatus. YI represents the maximum radius of the optical effective region of the inside conjugation surface of the optical lens system, that is, the maximum image height of the receiving apparatus, and the maximum radius of the light source of the projection apparatus.

According to the present disclosure, the electronic device can further include but not limited to a control unit, a display, a storage unit, a random access memory unit (RAM) or a combination thereof.

In the electronic device of the present disclosure, the optical lens system can be applied to the visible light band, the infrared band, or both of the visible light band and the infrared band.

In the optical lens system, the projection apparatus, the receiving apparatus, the sensing module, the image capturing apparatus and the electronic device of the present disclosure, if the parameter values are not specifically defined, the parameter values can be determined according to the operating wavelength. If the operating wavelength is visible light (for example, its major wavelength range is 350 nm to 750 nm), the value of each parameter is based on the d-line wavelength (587.6 nm). If the operating wavelength is near infrared light (for example, its major wavelength range is 750 nm to 1500 nm), the value of each parameter is based on the 940 nm wavelength.

According to the optical lens system of the present disclosure, the lens elements thereof can be made of plastic or glass materials. When the lens elements are made of glass materials, the distribution of the refractive power of the optical lens assembly may be more flexible to design, wherein the glass lens elements can be made by techniques such as grinding or molding. When the lens elements are made of plastic materials, manufacturing costs can be effectively reduced. Furthermore, surfaces of each lens element can be arranged to be aspheric, which can be made by plastic injection molding or molding glass lens elements, since the aspheric surface of the lens element is easy to form a shape other than a spherical surface so as to have more controllable variables for eliminating aberrations thereof, and to further decrease the required amount of lens elements in the optical lens system. Therefore, the total track length of the optical lens system can also be reduced.

According to the optical lens system of the present disclosure, when a lens surface is aspheric, which refers that the lens surface has an aspheric shape throughout its optically effective area, or a portion(s) thereof.

According to the optical lens system of the present disclosure, each of an outside surface and an inside surface has a paraxial region and an off-axis region. The paraxial region refers to the region of the surface where light rays travel close to the optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the optical lens system of the present disclosure, the refractive power or the focal length of a lens element being positive or negative may refer to the refractive power or the focal length in a paraxial region of the lens element.

According to the optical lens system of the present disclosure, the optical lens system can include at least one stop, such as an aperture stop, a glare stop or a field stop for eliminating the stray light and thereby improving the image resolution thereof.

According to the optical lens system of the present disclosure, the inside conjugation surface of the optical lens system, based on the corresponding image sensor or light source, can be flat or curved. In particular, the inside conjugation surface can be a concave curved surface facing towards the outside. According to the optical lens system of the present disclosure, at least one correcting element (such as a field flattener) can be selectively disposed between the lens element closest to the inside of the optical lens system and the inside conjugation surface so as to correct the image (such as the field curvature). Properties of the correcting element, such as curvature, thickness, refractive index, position, surface shape (convex/concave, spherical/aspheric/diffractive/Fresnel etc.) can be adjusted according to the requirements of the apparatus. In general, the correcting element is preferably a thin plano-concave element having a concave surface toward the outside and is disposed close to the inside conjugation surface.

According to the optical lens system of the present disclosure, an aperture stop can be configured as a front stop or a middle stop. A front stop disposed between an outside conjugation surface and the first lens element can provide a longer distance between an exit pupil of the optical lens assembly and the inside conjugation surface, and thereby obtains a telecentric effect and improves the image-sensing efficiency of the image sensor, such as CCD or CMOS, or improves the projective efficiency. A middle stop disposed between the first lens element and the inside conjugation surface is favorable for enlarging the field of view of the optical lens assembly and thereby provides a wider field of view for the same.

According to the optical lens assembly system of the present disclosure, a critical point is a non-axial point of the lens surface where its tangent is perpendicular to the optical axis.

According to the optical lens system of the present disclosure, the inflection point is defined as a transition point of a curvature center of a curve from the outside to the inside (or from the inside to the outside), wherein the curve is from the paraxial region to the off-axis of the surface of the lens element.

Each of the aforementioned features of the electronic device and the optical lens system thereof can be utilized in various combinations for achieving the corresponding effects.

According to the above description of the present disclosure, the following specific embodiments are provided for further explanation.

1st Embodiment

Figure 2:
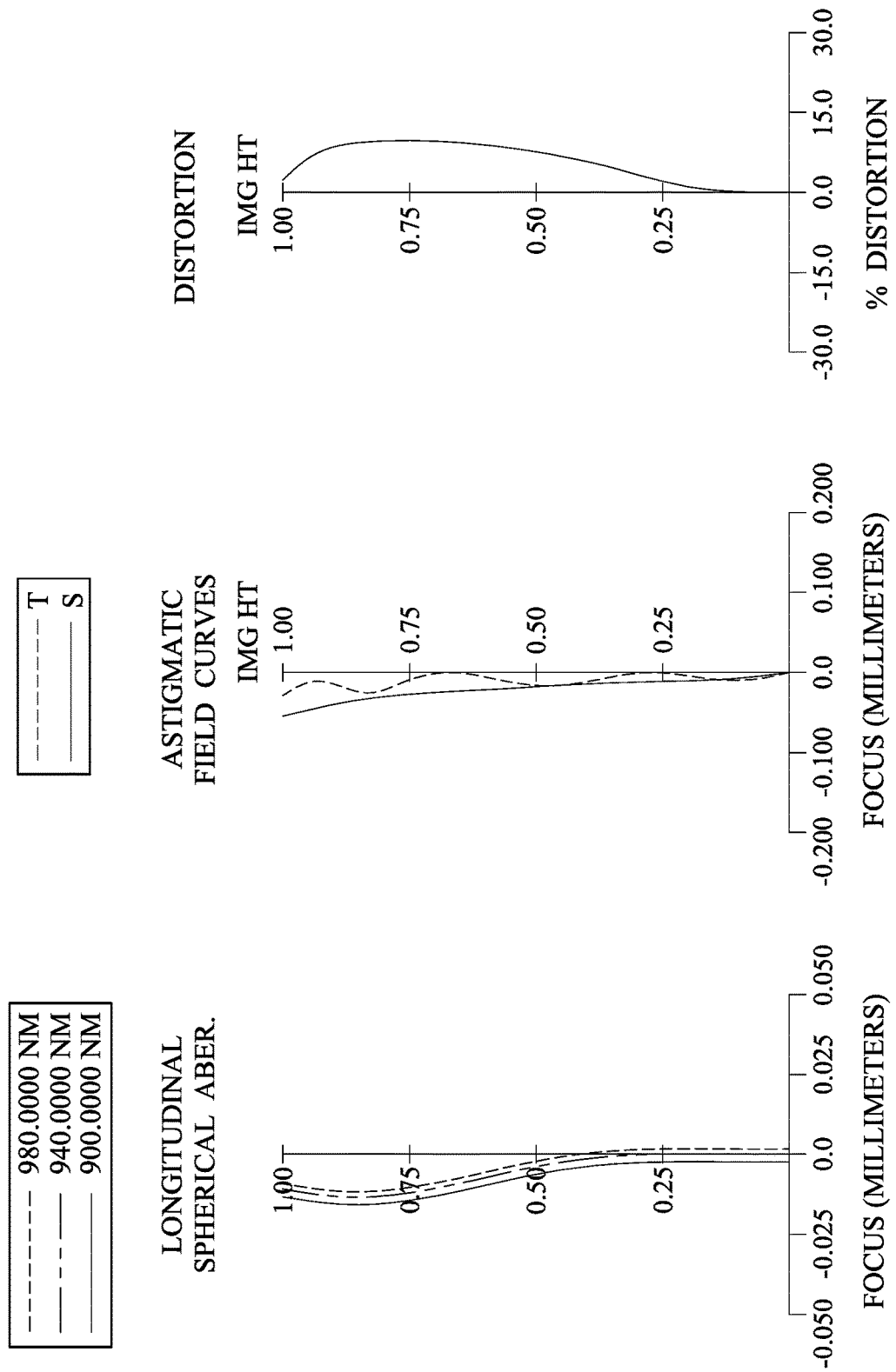
FIG. 2 shows spherical aberration curves, astigmatic field curves and a distortion curve of the electronic device according to the 1st embodiment.

FIG. 1 is a schematic view of an electronic device according to the 1st embodiment of the present disclosure. FIG. 2 shows spherical aberration curves, astigmatic field curves and a distortion curve of the electronic device according to the 1st embodiment. In FIG. 1, the electronic device includes an optical lens system (its reference numeral is omitted), wherein the optical lens system includes, in order from an outside to an inside, a first lens element 110, a second lens element 120, an aperture stop 100, a third lens element 130, a fourth lens element 140, a fifth lens element 150 and an inside conjugation surface 170. The optical lens system includes five lens elements (110, 120, 130, 140 and 150) without additional one or more lens elements inserted between the first lens element 110 and the fifth lens element 150, and there is an air gap in a paraxial region between every adjacent lens element of the five lens elements.

The first lens element 110 with positive refractive power has an outside surface 111 being convex in a paraxial region thereof and an inside surface 112 being concave in a paraxial region thereof. The first lens element 110 is made of a plastic material, and has the outside surface 111 and the inside surface 112 being both aspheric.

The second lens element 120 with negative refractive power has an outside surface 121 being concave in a paraxial region thereof and an inside surface 122 being concave in a paraxial region thereof. The second lens element 120 is made of a plastic material, and has the outside surface 121 and the inside surface 122 being both aspheric. Furthermore, the outside surface 121 of the second lens element 120 includes at least one inflection point IP21 (shown in FIG.

21), and the outside surface 121 of the second lens element 120 includes at least one critical point CP21 (shown in FIG. 21) in an off-axis region thereof.

The third lens element 130 with positive refractive power has an outside surface 131 being convex in a paraxial region thereof and an inside surface 132 being convex in a paraxial region thereof. The third lens element 130 is made of a plastic material, and has the outside surface 131 and the inside surface 132 being both aspheric. Furthermore, the outside surface 131 of the third lens element 130 includes at least one inflection point IP31 (shown in FIG. 21), and the outside surface 131 of the third lens element 130 includes at least one critical point CP31 (shown in FIG. 21) in an off-axis region thereof.

The fourth lens element 140 with negative refractive power has an outside surface 141 being concave in a paraxial region thereof and an inside surface 142 being convex in a paraxial region thereof. The fourth lens element 140 is made of a plastic material, and has the outside surface 141 and the inside surface 142 being both aspheric. Furthermore, each of the outside surface 141 and the inside surface 142 of the fourth lens element 140 includes at least one inflection point IP41, IP42 (shown in FIG. 21).

The fifth lens element 150 with positive refractive power has an outside surface 151 being convex in a paraxial region thereof and an inside surface 152 being concave in a paraxial region thereof. The fifth lens element 150 is made of a plastic material, and has the outside surface 151 and the inside surface 152 being both aspheric. Furthermore, each of the outside surface 151 and the inside surface 152 of the fifth lens element 150 includes at least one inflection point IP51, IP52 (shown in FIG. 21), and each of the outside surface 151 and the inside surface 152 of the fifth lens element 150 includes at least one critical point CP51, CP52 (shown in FIG. 21) in an off-axis region thereof.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical lens system according to the 1st embodiment, when a focal length of the optical lens system is f, an f-number of the optical lens system is Fno, and half of a maximum field of view of the optical lens system is HFOV, these parameters have the following values: f=0.73 mm; Fno=1.50; and HFOV=52.8 degrees.

In the optical lens system according to the 1st embodiment, when a measurement is made in accordance with a reference wavelength as a d-line (587.6 nm), an Abbe number of the first lens element 110 is Vd1, an Abbe number of the second lens element 120 is Vd2, an Abbe number of the third lens element 130 is Vd3, an Abbe number of the fourth lens element 140 is Vd4, and an Abbe number of the fifth lens element 150 is Vd5, the following conditions are satisfied: Vd1=19.5; Vd2=56.0; Vd3=26.0; Vd4=26.0; Vd5=26.0; and Vd1+Vd2+Vd3+Vd4+Vd5=153.4.

In the optical lens system according to the 1st embodiment, when a central thickness of the second lens element 120 is CT2, a central thickness of the third lens element 130 is CT3, a central thickness of the fifth lens element 150 is CT5, an axial distance between the first lens element 110 and the second lens element 120 is T12, an axial distance between the second lens element 120 and the third lens element 130 is T23, and an axial distance between the third lens element 130 and the fourth lens element 140 is T34, the following conditions are satisfied: CT3/CT2=2.81; CT3/CT5=0.90; and CT3/(T12+T23+T34)=0.64.

In the optical lens system according to the 1st embodiment, when a central thickness of the first lens element 110 is CT1, the central thickness of the second lens element 120 is CT2, the central thickness of the third lens element 130 is CT3, a central thickness of the fourth lens element 140 is CT4, the central thickness of the fifth lens element 150 is CT5, a maximum value of central thicknesses of the lens elements of the optical lens system is CT max (in the 1st embodiment, CTmax=CT5), and a minimum value of the central thicknesses of the lens elements of the optical lens system is CT min (in the 1st embodiment, CT min=CT2), the following condition is satisfied: CT max/CT min=3.13.

In the optical lens system according to the 1st embodiment, when an axial distance between the aperture stop 100 and the inside conjugation surface 170 of the optical lens system is SL, and an axial distance between the outside surface 111 of the first lens element 110 and the inside conjugation surface 170 of the optical lens system is TL, the following condition is satisfied: SL/TL=0.62.

In the optical lens system according to the 1st embodiment, when an axial distance between the fourth lens element 140 and the fifth lens element 150 is T45, and the central thickness of the fifth lens element 150 is CT5, the following condition is satisfied: T45/CT5=0.02.

In the optical lens system according to the 1st embodiment, when an axial distance between an outside surface of one of the lens elements closest to the outside (that is, the outside surface 111 of the first lens element 110 in the 1st embodiment) and an inside surface of one of the lens elements closest to the inside (that is, the inside surface 152 of the fifth lens element 150 in the 1st embodiment) is TD, and an axial distance between the inside surface 152 of the fifth lens element 150 and the inside conjugation surface 170 of the optical lens system is BL, the following conditions are satisfied: TD=2.95 mm; and TD/BL=5.64.

Figure 21:
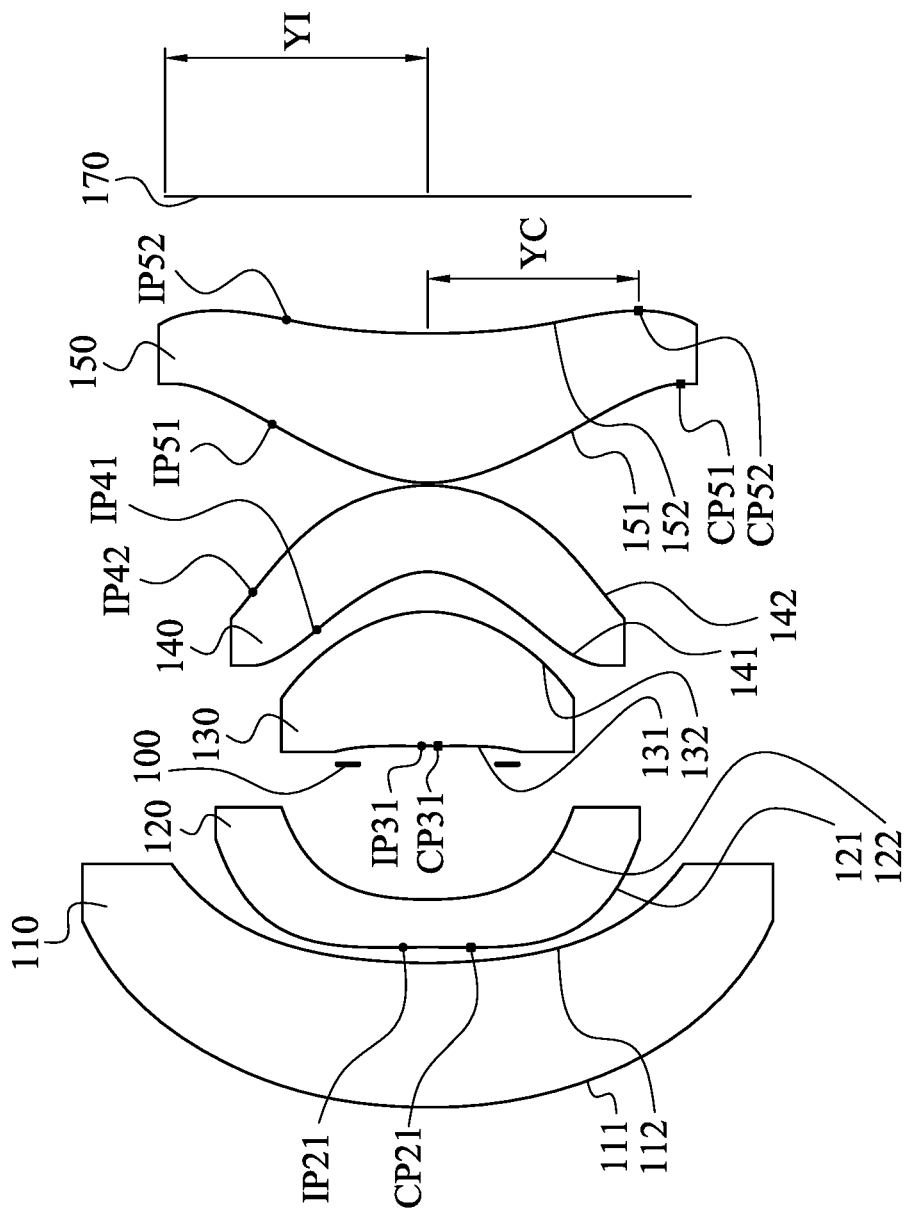
FIG. 21 is a schematic view of parameters, inflection points and critical points of the optical lens system according to the 1st embodiment of FIG. 1.

FIG. 21 is a schematic view of parameters, inflection points and critical points of the optical lens system according to the 1st embodiment of FIG. 1. As shown in FIG. 21, in the optical lens system according to the 1st embodiment, when a maximum optical effective radius of the inside conjugation surface 170 of the optical lens system is YI, the axial distance between the outside surface 111 of the first lens element 110 and the inside conjugation surface 170 of the optical lens system is TL, and the focal length of the optical lens system is f, the following conditions are satisfied: TL/f=4.73; and TL/YI=3.47.

Figure 22C:
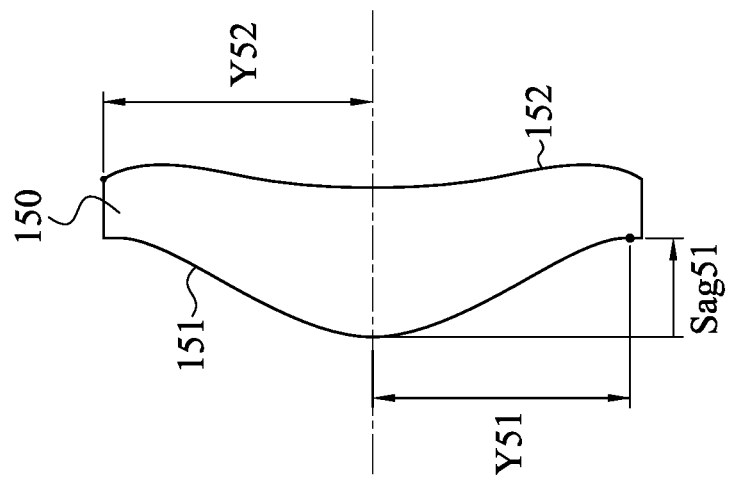
FIG. 22C is a schematic view of parameters of a fifth lens element according to the 1st embodiment of FIG. 1.
Figure 22B:
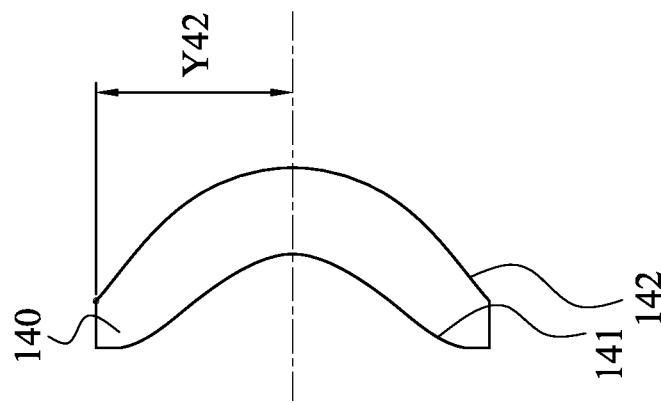
FIG. 22B is a schematic view of parameters of a fourth lens element according to the 1st embodiment of FIG. 1.

FIG. 22B is a schematic view of parameters of a fourth lens element 140 according to the 1st embodiment of FIG. 1. As shown in FIG. 22B, in the optical lens system according to the 1st embodiment, when a maximum optical effective radius of the inside surface 142 of the fourth lens element 140 is Y42, and a curvature radius of the inside surface 142 of the fourth lens element is R8, the following condition is satisfied: |R8|/Y42=0.90.

In the optical lens system according to the 1st embodiment, the focal length of the optical lens system is f, and an entrance pupil diameter of the optical lens system is EPD, the following condition is satisfied: f/EPD=1.50.

In the optical lens system according to the 1st embodiment, when the focal length of the optical lens system is f, a focal length of the first lens element 110 is f1, a focal length of the second lens element 120 is f2, a focal length of the third lens element 130 is f3, a focal length of the fourth lens element 140 is f4, and a focal length of the fifth lens element 150 is f5, the following conditions are satisfied: f/f1=0.03; f/f2=−0.31; f/f3=0.92; f/f4=−0.69; and f/f5=0.80.

In the optical lens system according to the 1st embodiment, a refractive power of the first lens element 110 is P1 (that is, a ratio f/f1 of the focal length of the optical lens system f to the focal length of the first lens element 110 f1), a refractive power of the second lens element 120 is P2 (that is, a ratio f/f2 of the focal length of the optical lens system f to the focal length of the second lens element 120 f2), a refractive power of the third lens element 130 is P3 (that is, a ratio f/f3 of the focal length of the optical lens system f to the focal length of the third lens element 130 f3), a refractive power of the fourth lens element 140 is P4 (that is, a ratio f/f4 of the focal length of the optical lens system f to the focal length of the fourth lens element 140 f4), a refractive power of the fifth lens element 150 is P5 (that is, a ratio f/f5 of the focal length of the optical lens system f to the focal length of the fifth lens element 150 f5), and a maximum value of absolute values of refractive power of the lens elements in the optical lens system is |P| max (that is, a maximum value of |P1|, |P2|, |P3|, |P4|, and |P5|, |P| max=|P3| in the 1st embodiment), the following condition is satisfied: |P| max=0.92.

FIG. 22C is a schematic view of parameters of a fifth lens element 150 according to the 1st embodiment of FIG. 1. As shown in FIG. 22C, in the optical lens system according to the 1st embodiment, when a displacement in parallel with an optical axis from an axial vertex on the outside surface 151 of the fifth lens element 150 to a maximum effective radius position on the outside surface 151 of the fifth lens element 150 is Sag51, a maximum optical effective radius of the outside surface 151 of the fifth lens element 150 is Y51, and the central thickness of the fifth lens element 150 is CT5, the following conditions are satisfied: Sag51/CT5=0.66; and Sag51/Y51=0.38.

Figure 22A:
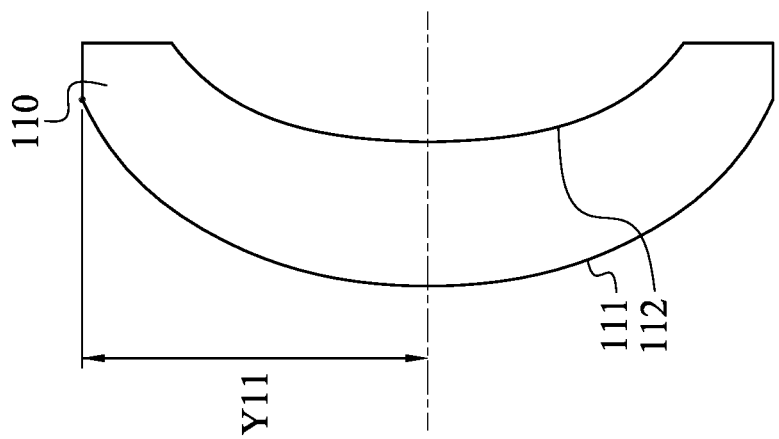
FIG. 22A is a schematic view of parameters of a first lens element according to the 1st embodiment of FIG. 1.

FIG. 22A is a schematic view of parameters of a first lens element 110 according to the 1st embodiment of FIG. 1. As shown in FIGS. 21, 22A and 22C, in the optical lens system according to the 1st embodiment, a maximum optical effective radius of the outside surface 111 of the first lens element 110 is Y11, a maximum optical effective radius of the inside surface 152 of the fifth lens element 150 is Y52, and the maximum optical effective radius of the inside conjugation surface 170 of the optical lens system is YI, the following conditions are satisfied: Y11/Y52=1.28; and YI/Y52=0.98.

The detailed optical data of the 1st embodiment is shown in Table 1, and the aspheric surface data are shown in Table 2 below.

TABLE 1

1st Embodiment
f= 0.73 mm, Fno = 1.50, HFOV = 52.8 deg.

| Surface # | | Curvature Radius | | Thickness | Material | Index | Abbe # | Focal Length |
|---|---|---|---|---|---|---|---|---|
| 0 | Outside conjugation surface | Plano | | Infinity | | | | |
| 1 | Lens 1 | 2.217 | ASP | 0.550 | Plastic | 1.641 | 19.5 | 21.40 |
| 2 | | 2.388 | ASP | 0.060 | | | | |
| 3 | Lens 2 | −9.018 | ASP | 0.182 | Plastic | 1.535 | 56.0 | −2.37 |
| 4 | | 1.489 | ASP | 0.516 | | | | |
| 5 | Ape. Stop | Plano | | 0.070 | | | | |
| 6 | Lens 3 | 126.317 | ASP | 0.512 | Plastic | 1.594 | 26.0 | 0.80 |
| 7 | | −0.475 | ASP | 0.152 | | | | |
| 8 | Lens 4 | −0.267 | ASP | 0.329 | Plastic | 1.594 | 26.0 | −1.07 |
| 9 | | −0.672 | ASP | 0.010 | | | | |
| 10 | Lens 5 | 0.508 | ASP | 0.570 | Plastic | 1.594 | 26.0 | 0.92 |
| 11 | | 4.305 | ASP | 0.523 | | | | |
| 12 | Inside conjugation surface | Plano | | — | | | | |

Reference wavelength (infrared light) is 940.0 nm

TABLE 2

Aspheric Coefficients

| | Surface # | | | | |
|---|---|---|---|---|---|
| | 1 | 2 | 3 | 4 | 6 |
| k = | 1.9266E−01 | 3.0338E+00 | 9.5526E+01 | −6.2717E−02 | −9.9000E+01 |
| A4 = | 1.4723E−01 | 3.4252E−03 | 1.0811E+00 | 2.2527E+00 | −1.2285E+00 |
| A6 = | −1.3614E−01 | 2.2085E−01 | −1.0739E+00 | −4.0918E+00 | 5.7109E+00 |
| A8 = | 5.9312E−02 | −8.5589E−02 | 1.6562E+00 | 1.6138E+01 | −1.0084E+02 |
| A10 = | | | | | 3.1395E+02 |

TABLE 2-continued

Aspheric Coefficients

| Surface # | | | | |
|---|---|---|---|---|
| 7 | 8 | 9 | 10 | 11 |
| k = −8.9422E−01 | −2.6011E+00 | −7.5366E−01 | −4.2023E+00 | −8.7516E+01 |
| A4 = 1.2899E+00 | 2.1770E−01 | −4.3537E−01 | 1.9967E−01 | 6.1715E−01 |
| A6 = −9.7248E+00 | −1.1885E+01 | 1.2972E+00 | −2.8715E−02 | −1.3647E+00 |
| A8 = 3.8018E+01 | 6.4982E+01 | −8.5803E+00 | −8.5522E−01 | 1.3958E+00 |
| A10 = −5.9261E+01 | −1.3194E+02 | 2.5760E+01 | 1.1009E+00 | −1.9817E+00 |
| A12 = −8.9557E+01 | 1.1776E+02 | −3.2418E+01 | −4.6560E−01 | 3.0166E+00 |
| A14 = 2.6284E+02 | −3.7366E+01 | 1.6291E+01 | | −2.4155E+00 |
| A16 = | | | | 7.1036E−01 |

In Table 1, the detailed optical data of the 1st embodiment in FIG. 1 are stated, wherein the curvature radii, the thicknesses and the focal lengths are shown in millimeters (mm), the measurement of Abbe number is made in accordance with the reference wavelength as the d-line, and surface numbers 0-12 represent the surfaces sequentially arranged from the outside to the inside along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

In the 1st embodiment, the numbers of the inflection points of the outside surfaces and the inside surfaces of the first lens element 110, the second lens element 120, the third lens element 130, the fourth lens element 140 and the fifth lens element 150 are listed in the table below.

| 1st Embodiment - numbers of the inflection points | | | | | |
|---|---|---|---|---|---|
| | 110 | 120 | 130 | 140 | 150 |
| outside surface | — | 1 | 1 | 1 | 1 |
| inside surface | — | — | — | 1 | 1 |

In the optical lens system according to the 1st embodiment, each of the outside surface 121 of the second lens element 120, the outside surface 131 of the third lens element 130, and the outside surface 151 and the inside surface 152 of the fifth lens element 150 includes one critical point in an off-axis region thereof. The vertical distance between the critical point and the optical axis is Yc, and the maximum optical effective radius of the surface where the critical point located is Y. The critical point located on the outside surface 121 of the second lens element 120 satisfies: Yc/Y=0.20. The critical point located on the outside surface 131 of the third lens element 130 satisfies: Yc/Y=0.11. The critical point located on the outside surface 151 of the fifth lens element 150 satisfies: Yc/Y=0.98. The critical point located on the inside surface 152 of the fifth lens element 150 satisfies: Yc/Y=0.78.

2nd Embodiment

Figure 3:
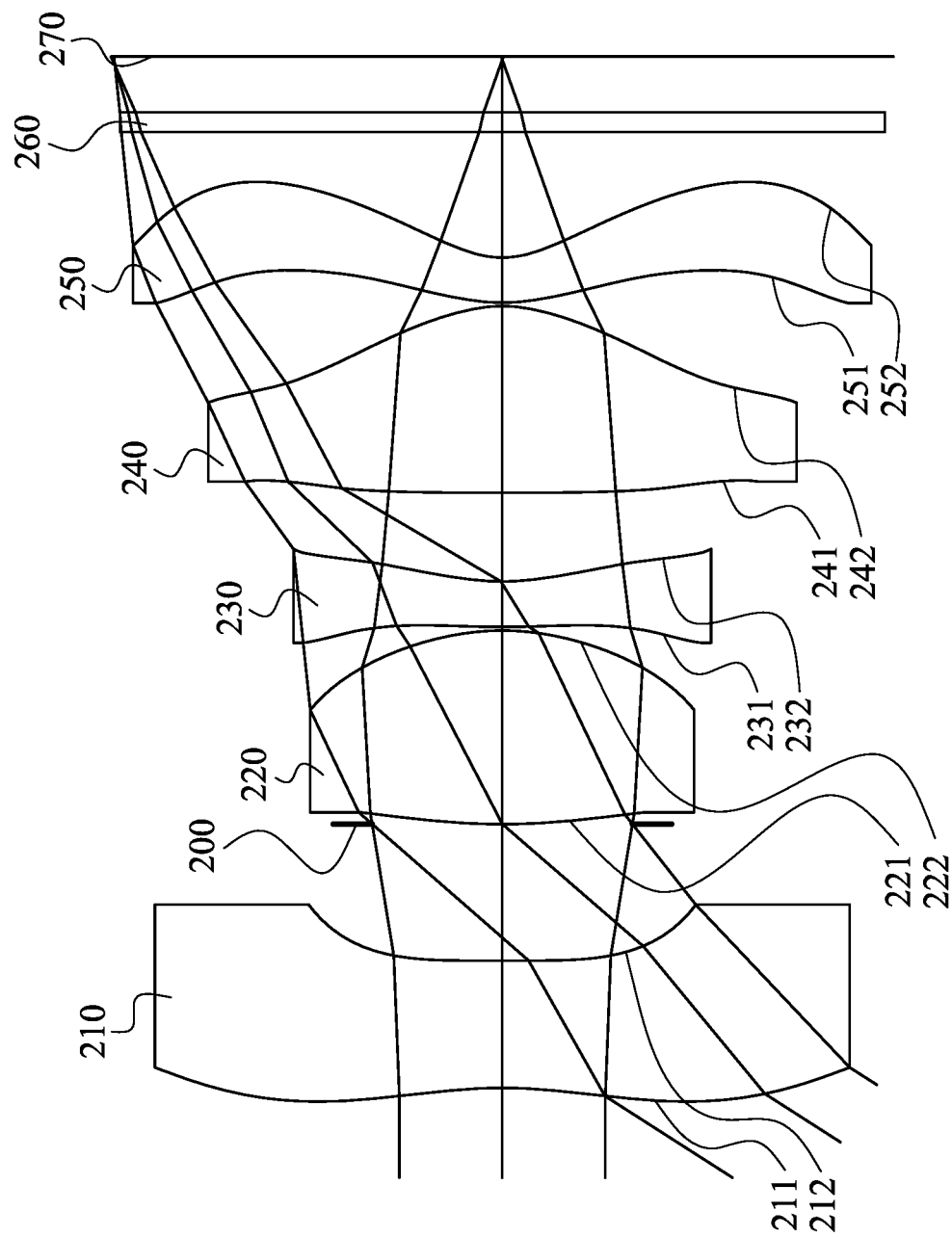
FIG. 3 is a schematic view of an electronic device according to the 2nd embodiment of the present disclosure.
Figure 4:
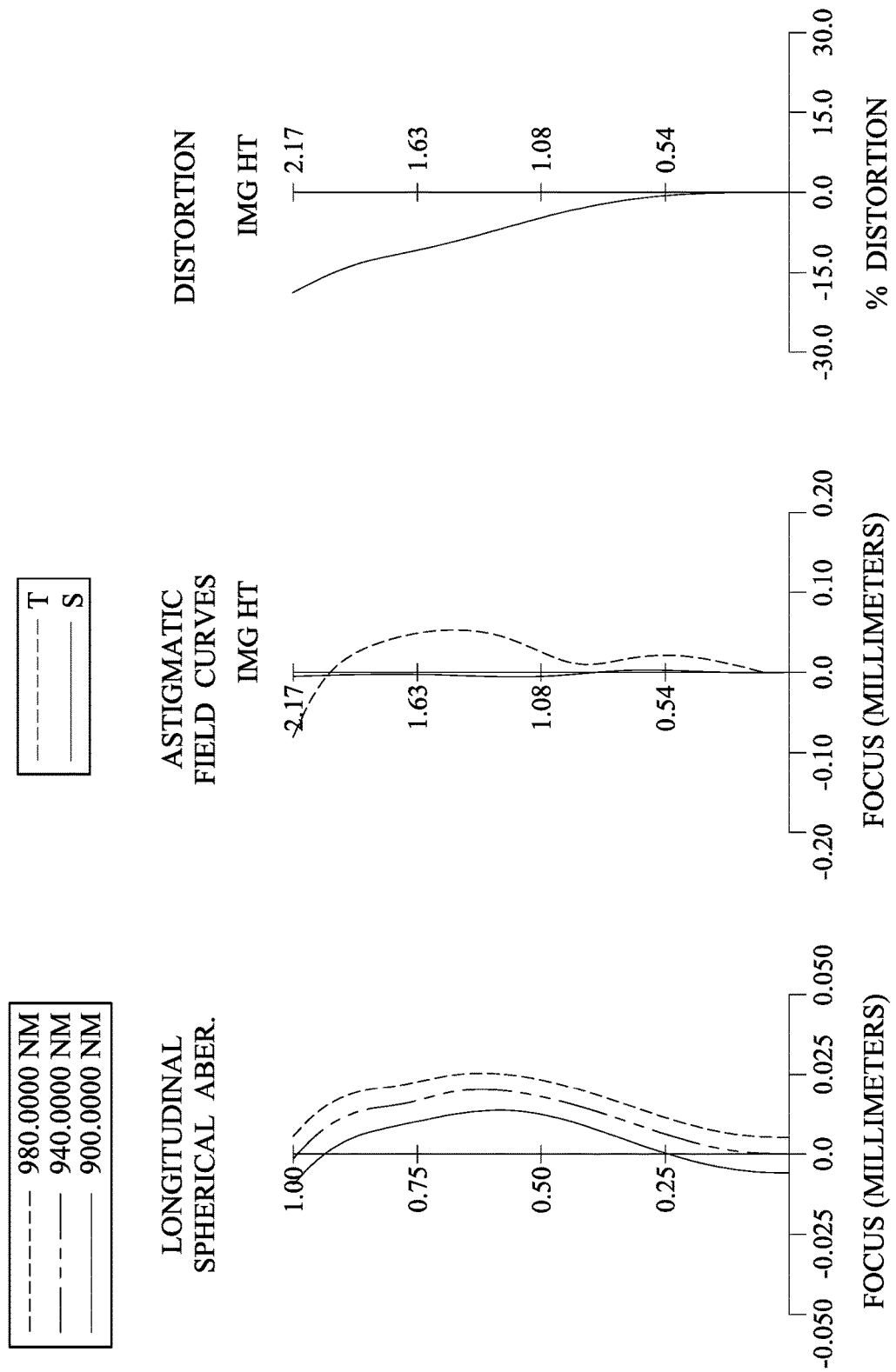
FIG. 4 shows spherical aberration curves, astigmatic field curves and a distortion curve of the electronic device according to the 2nd embodiment.

FIG. 3 is a schematic view of an electronic device according to the 2nd embodiment of the present disclosure. FIG. 4 shows spherical aberration curves, astigmatic field curves and a distortion curve of the electronic device according to the 2nd embodiment. In FIG. 3, the electronic device includes an optical lens system (its reference numeral is omitted), wherein the optical lens system includes, in order from an outside to an inside, a first lens element 210, an aperture stop 200, a second lens element 220, a third lens element 230, a fourth lens element 240, a fifth lens element 250, a filter 260 and an inside conjugation surface 270. The optical lens system includes five lens elements (210, 220, 230, 240 and 250) without additional one or more lens elements inserted between the first lens element 210 and the fifth lens element 250, and there is an air gap in a paraxial region between every adjacent lens element of the five lens elements.

The first lens element 210 with negative refractive power has an outside surface 211 being concave in a paraxial region thereof and an inside surface 212 being convex in a paraxial region thereof. The first lens element 210 is made of a plastic material, and has the outside surface 211 and the inside surface 212 being both aspheric. Furthermore, each of the outside surface 211 and the inside surface 212 of the first lens element 210 includes at least one inflection point, and each of the outside surface 211 and the inside surface 212 of the first lens element 210 includes at least one critical point in an off-axis region thereof.

The second lens element 220 with positive refractive power has an outside surface 221 being convex in a paraxial region thereof and an inside surface 222 being convex in a paraxial region thereof. The second lens element 220 is made of a plastic material, and has the outside surface 221 and the inside surface 222 being both aspheric. Furthermore, the outside surface 221 of the second lens element 220 includes at least one inflection point.

The third lens element 230 with negative refractive power has an outside surface 231 being convex in a paraxial region thereof and an inside surface 232 being concave in a paraxial region thereof. The third lens element 230 is made of a plastic material, and has the outside surface 231 and the inside surface 232 being both aspheric. Furthermore, each of the outside surface 231 and the inside surface 232 of the third lens element 230 includes at least one inflection point, and the outside surface 231 of the third lens element 230 includes at least one critical point in an off-axis region thereof.

The fourth lens element 240 with positive refractive power has an outside surface 241 being convex in a paraxial region thereof and an inside surface 242 being convex in a paraxial region thereof. The fourth lens element 240 is made of a plastic material, and has the outside surface 241 and the inside surface 242 being both aspheric. Furthermore, each of the outside surface 241 and the inside surface 242 of the fourth lens element 240 includes at least one inflection point, and the outside surface 241 of the fourth lens element 240 includes at least one critical point in an off-axis region thereof.

The fifth lens element 250 with negative refractive power has an outside surface 251 being convex in a paraxial region thereof and an inside surface 252 being concave in a paraxial region thereof. The fifth lens element 250 is made of a plastic material, and has the outside surface 251 and the inside surface 252 being both aspheric. Furthermore, each of the outside surface 251 and the inside surface 252 of the fifth lens element 250 includes at least one inflection point, and each of the outside surface 251 and the inside surface 252 of the fifth lens element 250 includes at least one critical point in an off-axis region thereof.

The filter 260 is made of a glass material and located between the fifth lens element 250 and the inside conjugation surface 270, and will not affect the focal length of the optical lens system.

The detailed optical data of the 2nd embodiment is shown in Table 3, and the aspheric surface data are shown in Table 4 below.

TABLE 3

2nd Embodiment
f = 1.71 mm, Fno = 1.49, HFOV = 57.4 deg.

| Surface # | | Curvature Radius | | Thickness | Material | Index | Abbe # | Focal Length |
|---|---|---|---|---|---|---|---|---|
| 0 | Outside conjugation surface | Plano | | Infinity | | | | |
| 1 | Lens 1 | −2.675 | ASP | 0.710 | Plastic | 1.536 | 56.1 | −5.22 |
| 2 | | −65.860 | ASP | 0.762 | | | | |
| 3 | Ape. Stop | Plano | | 0.000 | | | | |
| 4 | Lens 2 | 4.185 | ASP | 1.079 | Plastic | 1.641 | 19.5 | 1.79 |
| 5 | | −1.419 | ASP | 0.020 | | | | |
| 6 | Lens 3 | 4.748 | ASP | 0.254 | Plastic | 1.641 | 19.5 | −3.26 |
| 7 | | 1.421 | ASP | 0.494 | | | | |
| 8 | Lens 4 | 42.287 | ASP | 1.041 | Plastic | 1.641 | 19.5 | 1.21 |
| 9 | | −0.782 | ASP | 0.020 | | | | |
| 10 | Lens 5 | 1.156 | ASP | 0.251 | Plastic | 1.641 | 19.5 | −1.55 |
| 11 | | 0.489 | ASP | 0.700 | | | | |
| 12 | Filter | Plano | | 0.110 | Glass | 1.508 | 64.2 | — |
| 13 | | Plano | | 0.311 | | | | |
| 14 | Inside conjugation surface | Plano | | — | | | | |

Reference wavelength (infrared light) is 940.0 nm

TABLE 4

Aspheric Coefficients

| Surface # | 1 | 2 | 4 | 5 | 6 |
|---|---|---|---|---|---|
| k= | −2.1444E+01 | 8.9558E+01 | 1.1103E+01 | −2.4865E−01 | 1.3938E+01 |
| A4= | 6.5464E−02 | 2.6641E−01 | −1.7039E−02 | 1.1763E−01 | −3.8444E−01 |
| A6= | −1.7888E−02 | −1.0545E−01 | 9.7114E−03 | −1.1928E−01 | 4.7481E−01 |
| A8= | 3.2814E−03 | 2.7165E−02 | −1.0667E−01 | 5.4843E−02 | −6.0527E−01 |
| A10= | 6.2937E−05 | 9.6735E−02 | | −2.7342E−02 | 4.2177E−01 |
| A12= | −1.4662E−04 | −6.8008E−02 | | | −1.0775E−01 |
| A14= | 1.5981E−05 | 1.4039E−02 | | | |

| Surface # | 7 | 8 | 9 | 10 | 11 |
|---|---|---|---|---|---|
| k= | −4.8792E+00 | −4.5050E+01 | −6.4806E+00 | −1.7170E+00 | −3.5140E+00 |
| A4= | −3.6324E−01 | 1.0305E−02 | −1.4755E−01 | −4.4551E−01 | −1.7804E−01 |
| A6= | 6.9313E−01 | 4.1107E−02 | 1.2643E−01 | 3.8466E−01 | 1.2132E−01 |
| A8= | −9.8433E−01 | −3.4763E−02 | −2.4505E−02 | −2.1159E−01 | −5.6221E−02 |
| A10= | 8.5609E−01 | 1.5007E−02 | 1.7328E−03 | 7.1142E−02 | 1.3023E−02 |
| A12= | −4.0653E−01 | −6.3796E−03 | −4.0879E−03 | −1.4481E−02 | −8.7583E−04 |
| A14= | 8.5622E−02 | 1.2144E−03 | 1.8055E−03 | 1.6699E−03 | −1.8488E−04 |
| A16= | | | −2.2314E−04 | −8.3591E−05 | 2.7433E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.71 | TD/BL | 4.13 |
| Fno | 1.49 | TL/f | 3.36 |
| HFOV [deg.] | 57.4 | TL/YI | 2.65 |
| Vd1 | 56.1 | |R8|/Y42 | 0.48 |
| Vd2 | 19.5 | f/EPD | 1.49 |
| Vd3 | 19.5 | f/f1 | −0.33 |
| Vd4 | 19.5 | f/f2 | 0.96 |
| Vd5 | 19.5 | f/f3 | −0.52 |
| Vd1 + Vd2 + Vd3 + Vd4 + Vd5 | 133.9 | f/f4 | 1.41 |
| CT3/CT2 | 0.24 | f/f5 | −1.10 |
| CT3/CT5 | 1.01 | |P|max | 1.41 |
| CT3/(T12 + T23 + T34) | 0.20 | Sag51/CT5 | −0.01 |
| CTmax/CTmin | 4.30 | Sag51/Y51 | 0.00 |
| SL/TL | 0.74 | Y11/Y52 | 0.94 |
| T45/CT5 | 0.08 | YI/Y52 | 1.06 |
| TD [mm] | 4.63 | | |

In the 2nd embodiment, the numbers of the inflection points of the outside surfaces and the inside surfaces of the first lens element 210, the second lens element 220, the third lens element 230, the fourth lens element 240 and the fifth lens element 250 are listed in the table below.

| 2nd Embodiment - numbers of the inflection points | | | | | |
|---|---|---|---|---|---|
| | 210 | 220 | 230 | 240 | 250 |
| outside surface | 2 | 1 | 2 | 1 | 2 |
| inside surface | 1 | — | 2 | 2 | 2 |

In the optical lens system according to the 2nd embodiment, each of the outside surface 211 and the inside surface 212 of the first lens element 210, the outside surface 231 of the third lens element 230, the outside surface 241 of the fourth lens element 240, and the outside surface 251 and the inside surface 252 of the fifth lens element 250 includes one critical point in an off-axis region thereof. The critical point located on the outside surface 211 of the first lens element 210 satisfies: Yc/Y=0.53. The critical point located on the inside surface 212 of the first lens element 210 satisfies: Yc/Y=0.11. The critical point located on the outside surface 231 of the third lens element 230 satisfies: Yc/Y=0.40. The critical point located on the outside surface 241 of the fourth lens element 240 satisfies: Yc/Y=0.92. The critical point located on the outside surface 251 of the fifth lens element 250 satisfies: Yc/Y=0.61. The critical point located on the inside surface 252 of the fifth lens element 250 satisfies: Yc/Y=0.66.

3rd Embodiment

Figure 5:
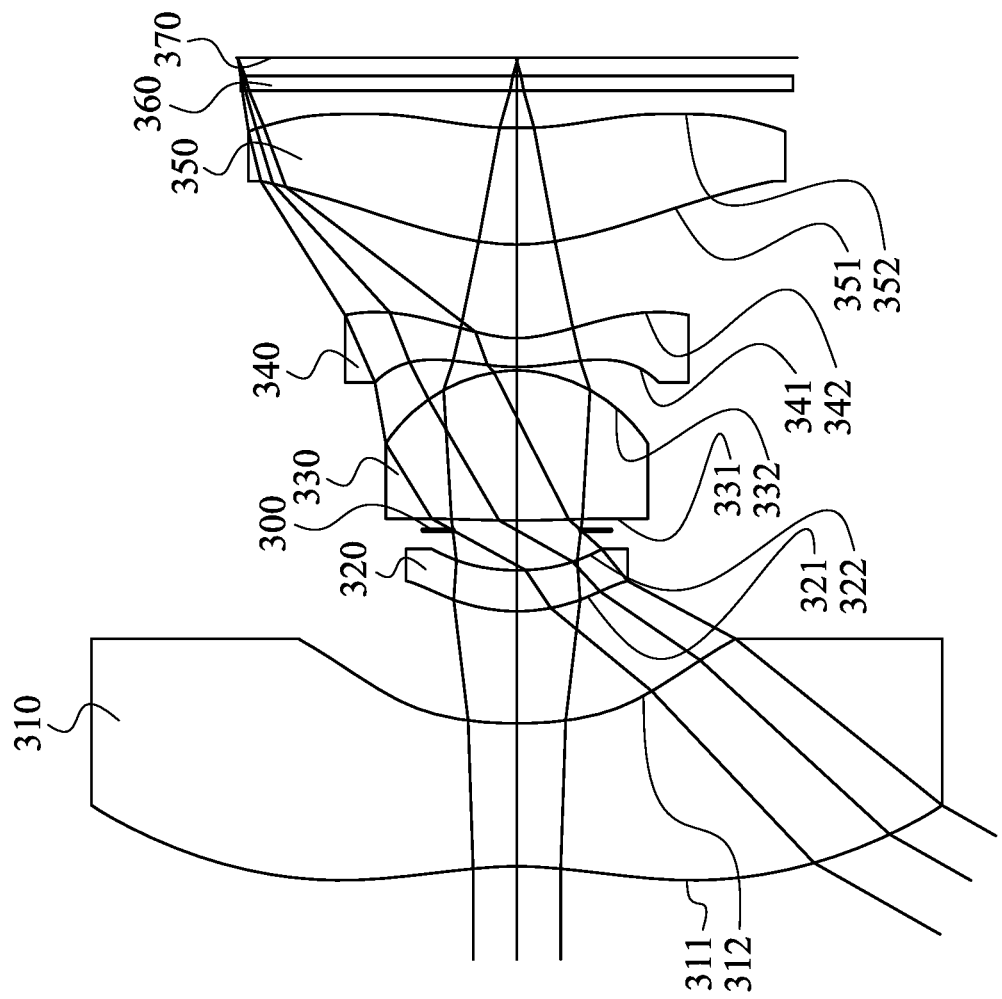
FIG. 5 is a schematic view of an electronic device according to the 3rd embodiment of the present disclosure.
Figure 6:
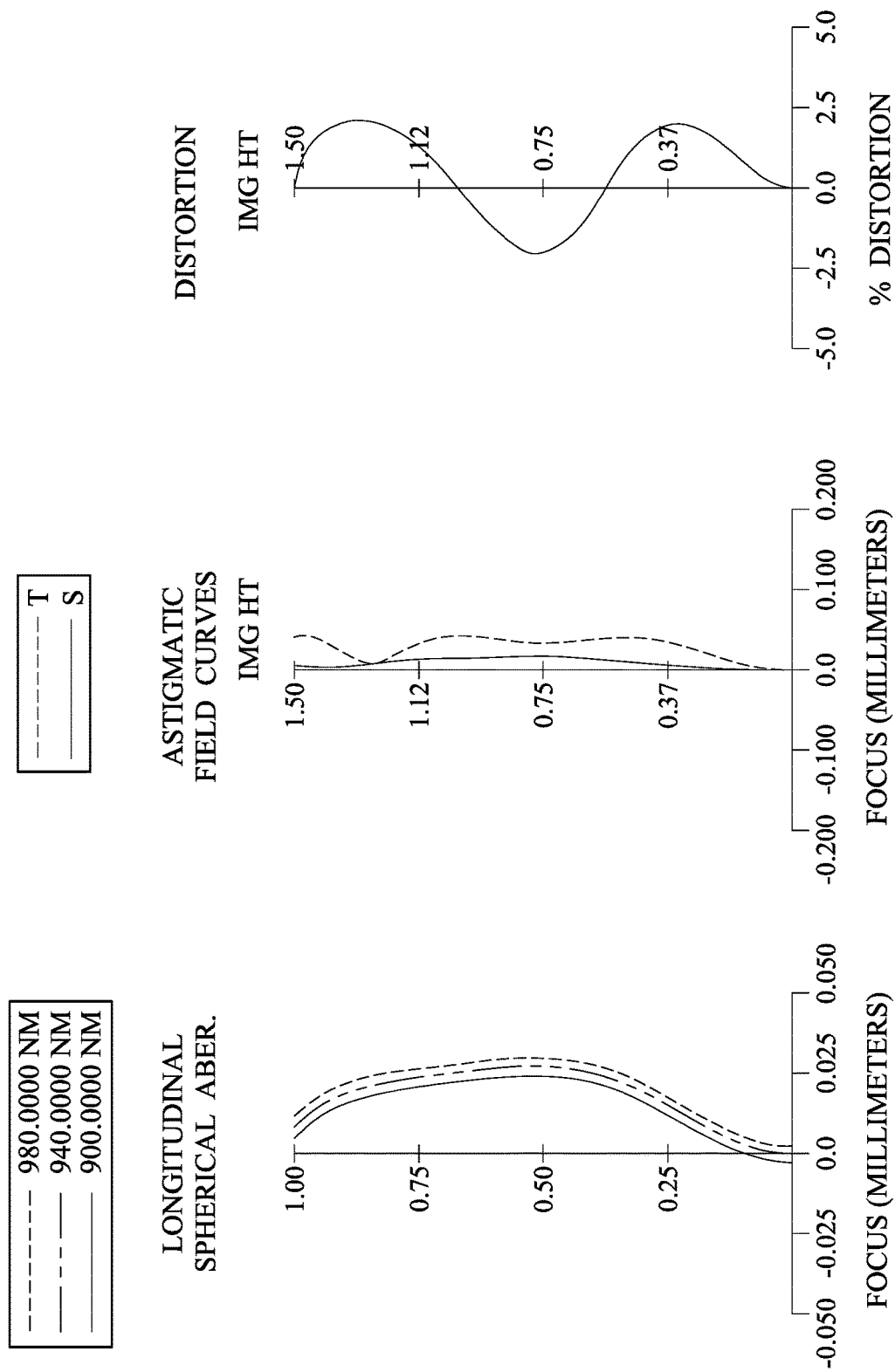
FIG. 6 shows spherical aberration curves, astigmatic field curves and a distortion curve of the electronic device according to the 3rd embodiment.

FIG. 5 is a schematic view of an electronic device according to the 3rd embodiment of the present disclosure. FIG. 6 shows spherical aberration curves, astigmatic field curves and a distortion curve of the electronic device according to the 3rd embodiment. In FIG. 5, the electronic device includes an optical lens system (its reference numeral is omitted), wherein the optical lens system includes, in order from an outside to an inside, a first lens element 310, a second lens element 320, an aperture stop 300, a third lens element 330, a fourth lens element 340, a fifth lens element 350, a filter 360 and an inside conjugation surface 370. The optical lens system includes five lens elements (310, 320, 330, 340 and 350) without additional one or more lens elements inserted between the first lens element 310 and the fifth lens element 350, and there is an air gap in a paraxial region between every adjacent lens element of the five lens elements.

The first lens element 310 with negative refractive power has an outside surface 311 being concave in a paraxial region thereof and an inside surface 312 being concave in a paraxial region thereof. The first lens element 310 is made of a plastic material, and has the outside surface 311 and the inside surface 312 being both aspheric. Furthermore, each of the outside surface 311 and the inside surface 312 of the first lens element 310 includes at least one inflection point, and the outside surface 311 of the first lens element 310 includes at least one critical point in an off-axis region thereof.

The second lens element 320 with positive refractive power has an outside surface 321 being convex in a paraxial region thereof and an inside surface 322 being concave in a paraxial region thereof. The second lens element 320 is made of a plastic material, and has the outside surface 321 and the inside surface 322 being both aspheric. Furthermore, each of the outside surface 321 and the inside surface 322 of the second lens element 320 includes at least one inflection point.

The third lens element 330 with positive refractive power has an outside surface 331 being convex in a paraxial region thereof and an inside surface 332 being convex in a paraxial region thereof. The third lens element 330 is made of a glass material, and has the outside surface 331 and the inside surface 332 being both aspheric. Furthermore, the outside surface 331 of the third lens element 330 includes at least one inflection point, and the outside surface 331 of the third lens element 330 includes at least one critical point in an off-axis region thereof.

The fourth lens element 340 with negative refractive power has an outside surface 341 being convex in a paraxial region thereof and an inside surface 342 being concave in a paraxial region thereof. The fourth lens element 340 is made of a plastic material, and has the outside surface 341 and the inside surface 342 being both aspheric. Furthermore, each of the outside surface 341 and the inside surface 342 of the fourth lens element 340 includes at least one inflection point, and each of the outside surface 341 and the inside surface 342 of the fourth lens element 340 includes at least one critical point in an off-axis region thereof.

The fifth lens element 350 with positive refractive power has an outside surface 351 being convex in a paraxial region thereof and an inside surface 352 being concave in a paraxial region thereof. The fifth lens element 350 is made of a plastic material, and has the outside surface 351 and the inside surface 352 being both aspheric. Furthermore, each of the outside surface 351 and the inside surface 352 of the fifth lens element 350 includes at least one inflection point, and the inside surface 352 of the fifth lens element 350 includes at least one critical point in an off-axis region thereof.

The filter 360 is made of a glass material and located between the fifth lens element 350 and the inside conjugation surface 370, and will not affect the focal length of the optical lens system.

The detailed optical data of the 3rd embodiment is shown in Table 5, and the aspheric surface data are shown in Table 6 below.

TABLE 5

3rd Embodiment
f = 0.85 mm, Fno = 1.80, HFOV = 60.4 deg.

| Surface # | | Curvature Radius | | Thickness | Material | Index | Abbe # | Focal Length |
|---|---|---|---|---|---|---|---|---|
| 0 | Outside conjugation surface | Plano | | Infinity | | | | |
| 1 | Lens 1 | −1.992 | ASP | 0.768 | Plastic | 1.526 | 61.5 | −2.02 |
| 2 | | 2.574 | ASP | 0.602 | | | | |
| 3 | Lens 2 | 0.941 | ASP | 0.220 | Plastic | 1.641 | 19.5 | 7.07 |
| 4 | | 1.079 | ASP | 0.215 | | | | |
| 5 | Ape. Stop | Plano | | 0.053 | | | | |
| 6 | Lens 3 | 6.551 | ASP | 0.806 | Glass | 1.700 | 29.2 | 0.97 |
| 7 | | −0.722 | ASP | 0.020 | | | | |
| 8 | Lens 4 | 1.113 | ASP | 0.154 | Plastic | 1.641 | 19.5 | −2.55 |
| 9 | | 0.627 | ASP | 0.503 | | | | |
| 10 | Lens 5 | 1.280 | ASP | 0.626 | Plastic | 1.641 | 19.5 | 3.71 |
| 11 | | 2.241 | ASP | 0.200 | | | | |
| 12 | Filter | Plano | | 0.080 | Glass | 1.508 | 64.2 | — |
| 13 | | Plano | | 0.097 | | | | |
| 14 | Inside conjugation surface | Plano | | — | | | | |

Reference wavelength (infrared light) is 940.0 nm

TABLE 6

Aspheric Coefficients

| | Surface # | | | | |
|---|---|---|---|---|---|
| | 1 | 2 | 3 | 4 | 6 |
| k = | −2.6581E+01 | 2.5605E+00 | −3.3423E+00 | −2.0526E−01 | 4.2275E+01 |
| A4 = | 8.3732E−02 | 3.3347E−01 | 5.0456E−01 | 3.8739E−01 | −6.4296E−02 |
| A6 = | −2.8745E−02 | −1.4129E−01 | −1.7220E+00 | −4.1328E−01 | −3.4414E−01 |
| A8 = | 6.5652E−03 | −1.7666E−01 | 8.1107E+00 | 1.3294E+01 | −2.8684E+00 |
| A10 = | −8.6668E−04 | 1.2223E−01 | −3.0272E+01 | −5.9826E+01 | 1.3846E+01 |
| A12 = | 4.9505E−05 | −1.9431E−02 | 3.0184E+01 | | −2.1619E+01 |

| | Surface # | | | | |
|---|---|---|---|---|---|
| | 7 | 8 | 9 | 10 | 11 |
| k = | −6.8545E−01 | −3.1221E+01 | −8.0509E+00 | −3.4596E+00 | 2.7351E−01 |
| A4 = | 3.8158E−01 | −2.0304E−01 | −1.6909E−01 | −7.2611E−02 | 2.3167E−01 |
| A6 = | −1.7917E+00 | −1.0408E+00 | −1.3128E−01 | −1.2433E−01 | −1.9086E+00 |
| A8 = | 3.2222E+00 | 1.1780E+00 | −9.3849E−03 | 3.8112E−01 | 3.3987E+00 |
| A10 = | −3.3615E+00 | −1.8332E−01 | 3.8215E−01 | −4.0606E−01 | −3.0023E+00 |
| A12 = | 7.1968E−01 | −3.2662E+00 | −4.0394E−01 | 2.0618E−01 | 1.4291E+00 |
| A14 = | | 3.7988E+00 | 1.3762E−01 | −4.8047E−02 | −3.5013E−01 |
| A16 = | | | | 3.7471E−03 | 3.4611E−02 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 0.85 | TD/BL | 10.52 |
| Fno | 1.80 | TL/f | 5.13 |
| HFOV [deg.] | 60.4 | TL/YI | 2.90 |
| Vd1 | 61.5 | |R8|/Y42 | 0.68 |
| Vd2 | 19.5 | f/EPD | 1.80 |
| Vd3 | 29.2 | f/f1 | −0.42 |
| Vd4 | 19.5 | f/f2 | 0.12 |
| Vd5 | 19.5 | f/f3 | 0.87 |
| Vd1 + Vd2 + Vd3 + Vd4 + Vd5 | 149.1 | f/f4 | −0.33 |
| CT3/CT2 | 3.66 | f/f5 | 0.23 |
| CT3/CT5 | 1.29 | |P|max | 0.87 |
| CT3/(T12 + T23 + T34) | 0.91 | Sag51/CT5 | 0.54 |
| CTmax/CTmin | 5.23 | Sag51/Y51 | 0.25 |
| SL/TL | 0.58 | Y11/Y52 | 1.58 |
| T45/CT5 | 0.80 | YI/Y52 | 1.04 |
| TD [mm] | 3.97 | | |

In the 3rd embodiment, the numbers of the inflection points of the outside surfaces and the inside surfaces of the first lens element 310, the second lens element 320, the third lens element 330, the fourth lens element 340 and the fifth lens element 350 are listed in the table below.

| 3rd Embodiment - numbers of the inflection points | | | | | |
|---|---|---|---|---|---|
| | 310 | 320 | 330 | 340 | 350 |
| outside surface | 1 | 1 | 1 | 1 | 1 |
| inside surface | 2 | 1 | — | 1 | 1 |

In the optical lens system according to the 3rd embodiment, each of the outside surface 311 of the first lens element 310, the outside surface 331 of the third lens element 330, the outside surface 341 and the inside surface 342 of the fourth lens element 340, and the inside surface 352 of the fifth lens element 350 includes one critical point in an off-axis region thereof. The critical point located on the outside surface 311 of the first lens element 310 satisfies: Yc/Y=0.41. The critical point located on the outside surface 331 of the third lens element 330 satisfies: Yc/Y=0.96. The critical point located on the outside surface 341 of the fourth lens element 340 satisfies: Yc/Y=0.60. The critical point located on the inside surface 342 of the fourth lens element 340 satisfies: Yc/Y=0.82. The critical point located on the inside surface 352 of the fifth lens element 350 satisfies: Yc/Y=0.58.

4th Embodiment

Figure 7:
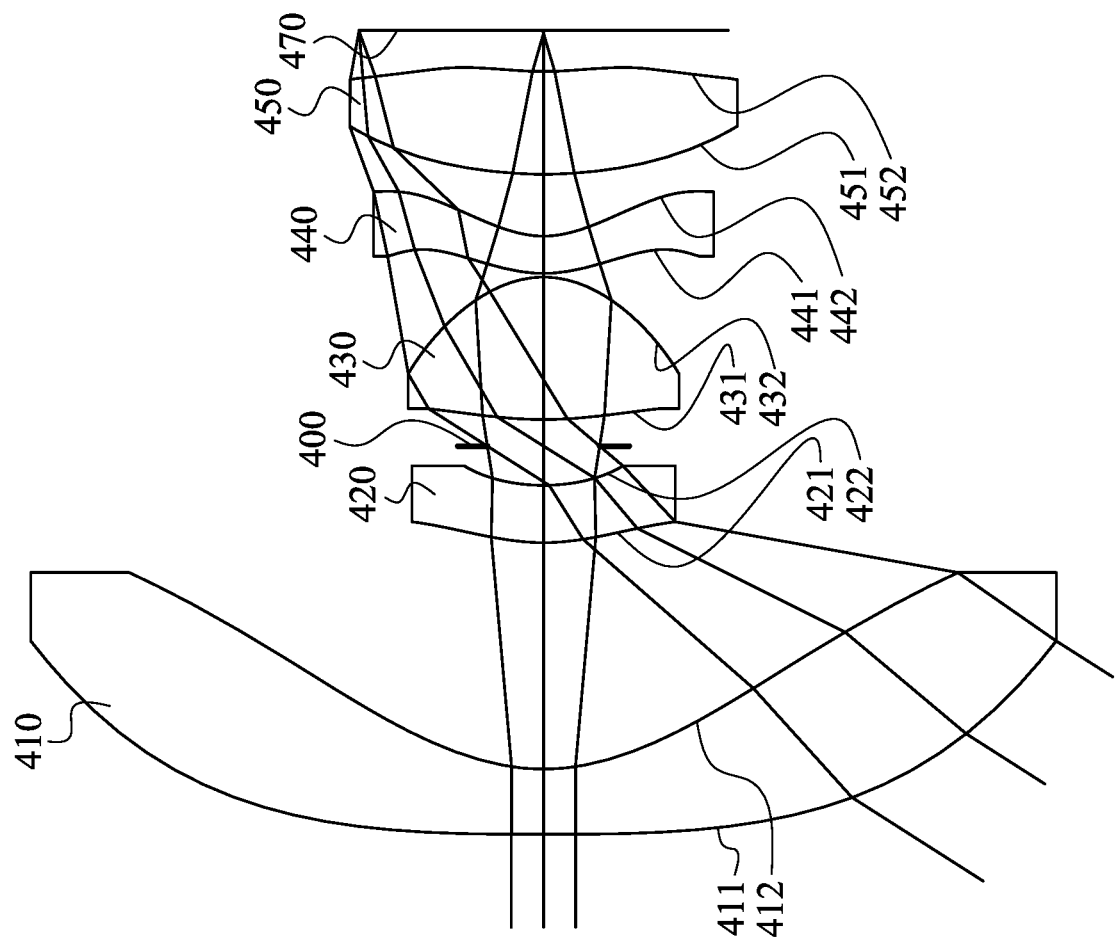
FIG. 7 is a schematic view of an electronic device according to the 4th embodiment of the present disclosure.
Figure 8:
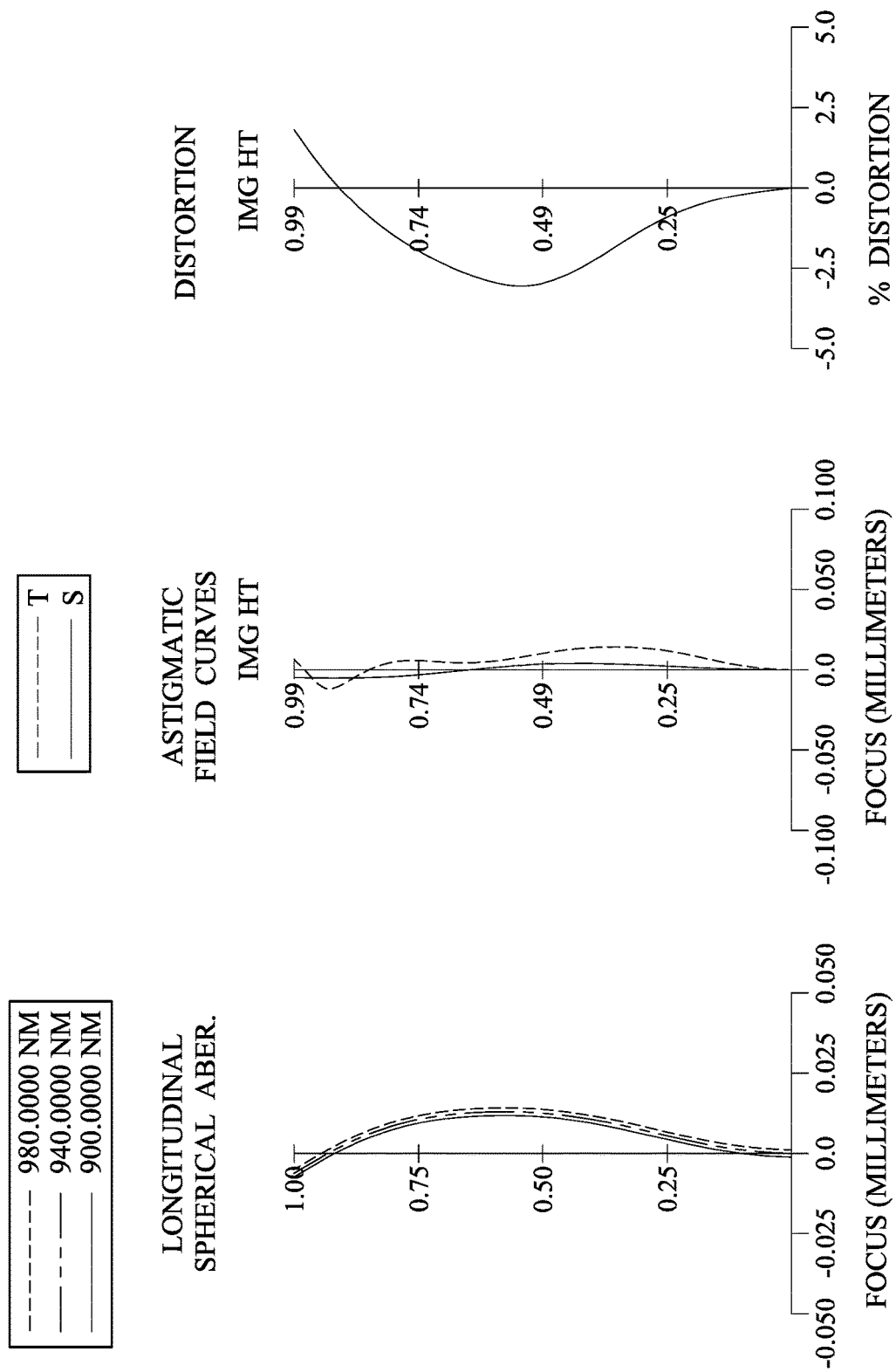
FIG. 8 shows spherical aberration curves, astigmatic field curves and a distortion curve of the electronic device according to the 4th embodiment.

FIG. 7 is a schematic view of an electronic device according to the 4th embodiment of the present disclosure. FIG. 8 shows spherical aberration curves, astigmatic field curves and a distortion curve of the electronic device according to the 4th embodiment. In FIG. 7, the electronic device includes an optical lens system (its reference numeral is omitted), wherein the optical lens system includes, in order from an outside to an inside, a first lens element 410, a second lens element 420, an aperture stop 400, a third lens element 430, a fourth lens element 440, a fifth lens element 450 and an inside conjugation surface 470. The optical lens system includes five lens elements (410, 420, 430, 440 and 450) without additional one or more lens elements inserted between the first lens element 410 and the fifth lens element 450, and there is an air gap in a paraxial region between every adjacent lens element of the five lens elements.

The first lens element 410 with negative refractive power has an outside surface 411 being convex in a paraxial region thereof and an inside surface 412 being concave in a paraxial region thereof. The first lens element 410 is made of a plastic material, and has the outside surface 411 and the inside surface 412 being both aspheric. Furthermore, the inside surface 412 of the first lens element 410 includes at least one inflection point.

The second lens element 420 with negative refractive power has an outside surface 421 being convex in a paraxial region thereof and an inside surface 422 being concave in a paraxial region thereof. The second lens element 420 is made of a plastic material, and has the outside surface 421 and the inside surface 422 being both aspheric. Furthermore, the outside surface 421 of the second lens element 420 includes at least one inflection point.

The third lens element 430 with positive refractive power has an outside surface 431 being convex in a paraxial region thereof and an inside surface 432 being convex in a paraxial region thereof. The third lens element 430 is made of a plastic material, and has the outside surface 431 and the inside surface 432 being both aspheric. Furthermore, the outside surface 431 of the third lens element 430 includes at least one inflection point.

The fourth lens element 440 with negative refractive power has an outside surface 441 being convex in a paraxial region thereof and an inside surface 442 being concave in a paraxial region thereof. The fourth lens element 440 is made of a plastic material, and has the outside surface 441 and the inside surface 442 being both aspheric. Furthermore, each of the outside surface 441 and the inside surface 442 of the fourth lens element 440 includes at least one inflection point, and each of the outside surface 441 and the inside surface 442 of the fourth lens element 440 includes at least one critical point in an off-axis region thereof.

The fifth lens element 450 with negative refractive power has an outside surface 451 being convex in a paraxial region thereof and an inside surface 452 being concave in a paraxial region thereof. The fifth lens element 450 is made of a plastic material, and has the outside surface 451 and the inside surface 452 being both aspheric. Furthermore, each of the outside surface 451 and the inside surface 452 of the fifth lens element 450 includes at least one inflection point, and the inside surface 452 of the fifth lens element 450 includes at least one critical point in an off-axis region thereof.

The detailed optical data of the 4th embodiment is shown in Table 7, and the aspheric surface data are shown in Table 8 below.

TABLE 7

4th Embodiment
f = 0.62 mm, Fno = 1.79, HFOV = 57.5 deg.

| Surface # | | Curvature Radius | | Thickness | Material | Index | Abbe # | Focal Length |
|---|---|---|---|---|---|---|---|---|
| 0 | Outside conjugation surface | Plano | | Infinity | | | | |
| 1 | Lens 1 | 24.862 | ASP | 0.351 | Plastic | 1.631 | 21.3 | −1.93 |
| 2 | | 1.154 | ASP | 1.216 | | | | |
| 3 | Lens 2 | 1.163 | ASP | 0.308 | Plastic | 1.641 | 19.5 | −33.47 |
| 4 | | 0.989 | ASP | 0.211 | | | | |
| 5 | Ape. Stop | Plano | | 0.143 | | | | |
| 6 | Lens 3 | 2.219 | ASP | 0.765 | Plastic | 1.535 | 56.0 | 0.88 |
| 7 | | −0.529 | ASP | 0.020 | | | | |
| 8 | Lens 4 | 0.745 | ASP | 0.200 | Plastic | 1.641 | 19.5 | −3.80 |
| 9 | | 0.511 | ASP | 0.332 | | | | |
| 10 | Lens 5 | 2.143 | ASP | 0.553 | Plastic | 1.567 | 28.2 | −61.77 |
| 11 | | 1.831 | ASP | 0.221 | | | | |

TABLE 7-continued

4th Embodiment
f = 0.62 mm, Fno = 1.79, HFOV = 57.5 deg.

| Surface # | | Curvature Radius | Thickness | Material | Index | Abbe # | Focal Length |
|---|---|---|---|---|---|---|---|
| 12 | Inside conjugation surface | Plano | | | — | | |

Reference wavelength (infrared light) is 940.0 nm

TABLE 8

Aspheric Coefficients

| | Surface # | | | | |
|---|---|---|---|---|---|
| | 1 | 2 | 3 | 4 | 6 |
| k = | 5.5870E+01 | −2.3253E+00 | −8.9408E+00 | −5.1335E−01 | −2.1981E+01 |
| A4 = | 2.5847E−02 | 4.0296E−03 | 3.7876E−02 | −2.5223E−02 | −3.2925E−02 |
| A6 = | −3.8685E−03 | −7.6994E−03 | −1.4400E+00 | 3.8499E+00 | 8.0594E−02 |
| A8 = | 4.7948E−04 | 1.7496E−03 | 4.9836E+00 | −4.8742E+00 | −3.4908E+00 |
| A10 = | −1.8089E−05 | −1.6697E−04 | −8.0387E+00 | 1.0992E+01 | −1.4673E−01 |
| A12 = | −4.5986E−07 | 5.9688E−06 | 5.0130E+00 | | 3.5327E−01 |

| | Surface # | | | | |
|---|---|---|---|---|---|
| | 7 | 8 | 9 | 10 | 11 |
| k = | −9.0191E−01 | −5.9772E+00 | −3.5127E+00 | 1.3772E+00 | 1.0766E+00 |
| A4 = | 1.9331E−01 | −3.0013E−02 | −2.1029E−01 | −2.3673E−01 | −1.0591E+00 |
| A6 = | −6.6642E−03 | −8.7705E−01 | 2.7146E−01 | 3.8384E−01 | 5.1790E−01 |
| A8 = | −2.4362E+00 | 1.7281E+00 | −1.0522E+00 | 1.9740E+00 | 2.9257E+00 |
| A10 = | 6.8626E+00 | −4.6036E+00 | 8.2068E−01 | −8.7111E−01 | −7.3576E+00 |
| A12 = | −6.4605E+00 | 6.2652E+00 | 1.7667E−01 | 3.4971E−01 | 7.9494E+00 |
| A14 = | | −2.7298E+00 | −2.1883E−01 | 3.5914E−01 | −4.2436E+00 |
| A16 = | | | | −2.2208E−01 | 8.9232E−01 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 0.62 | TD/BL | 18.56 |
| Fno | 1.79 | TL/f | 7.00 |
| HFOV [deg.] | 57.5 | TL/YI | 4.36 |
| Vd1 | 21.3 | |R8|/Y42 | 0.56 |
| Vd2 | 19.5 | f/EPD | 1.79 |
| Vd3 | 56.0 | f/f1 | −0.32 |
| Vd4 | 19.5 | f/f2 | −0.02 |
| Vd5 | 28.2 | f/f3 | 0.70 |
| Vd1 + Vd2 + Vd3 + Vd4 + Vd5 | 144.4 | f/f4 | −0.16 |
| CT3/CT2 | 2.48 | f/f5 | −0.01 |
| CT3/CT5 | 1.38 | |P|max | 0.70 |
| CT3/(T12 + T23 + T34) | 0.48 | Sag51/CT5 | 0.47 |
| CTmax/CTmin | 3.83 | Sag51/Y51 | 0.25 |
| SL/TL | 0.52 | Y11/Y52 | 2.65 |
| T45/CT5 | 0.60 | YI/Y52 | 0.95 |
| TD [mm] | 4.10 | | |

In the 4th embodiment, the numbers of the inflection points of the outside surfaces and the inside surfaces of the first lens element 410, the second lens element 420, the third lens element 430, the fourth lens element 440 and the fifth lens element 450 are listed in the table below.

| 4th Embodiment - numbers of the inflection points | | | | | |
|---|---|---|---|---|---|
| | 410 | 420 | 430 | 440 | 450 |
| outside surface | — | 1 | 1 | 2 | 1 |
| inside surface | 1 | — | — | 2 | 3 |

In the optical lens system according to the 4th embodiment, each of the outside surface 441 and the inside surface 442 of the fourth lens element 440, and the inside surface 452 of the fifth lens element 450 includes one critical point in an off-axis region thereof. The critical point located on the outside surface 441 of the fourth lens element 440 satisfies: Yc/Y=0.77. The critical point located on the inside surface 442 of the fourth lens element 440 satisfies: Yc/Y 0.91. The critical point located on the inside surface 452 of the fifth lens element 450 satisfies: Yc/Y=0.41.

5th Embodiment

Figure 9:
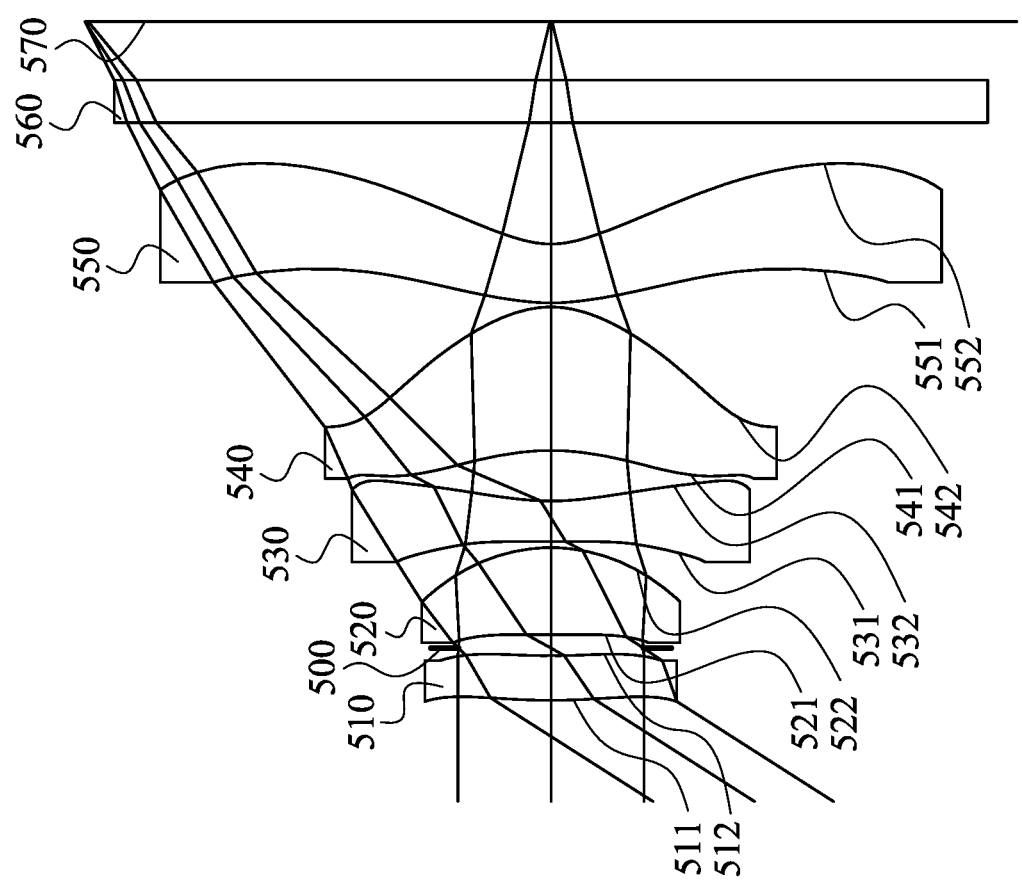
FIG. 9 is a schematic view of an electronic device according to the 5th embodiment of the present disclosure.
Figure 10:
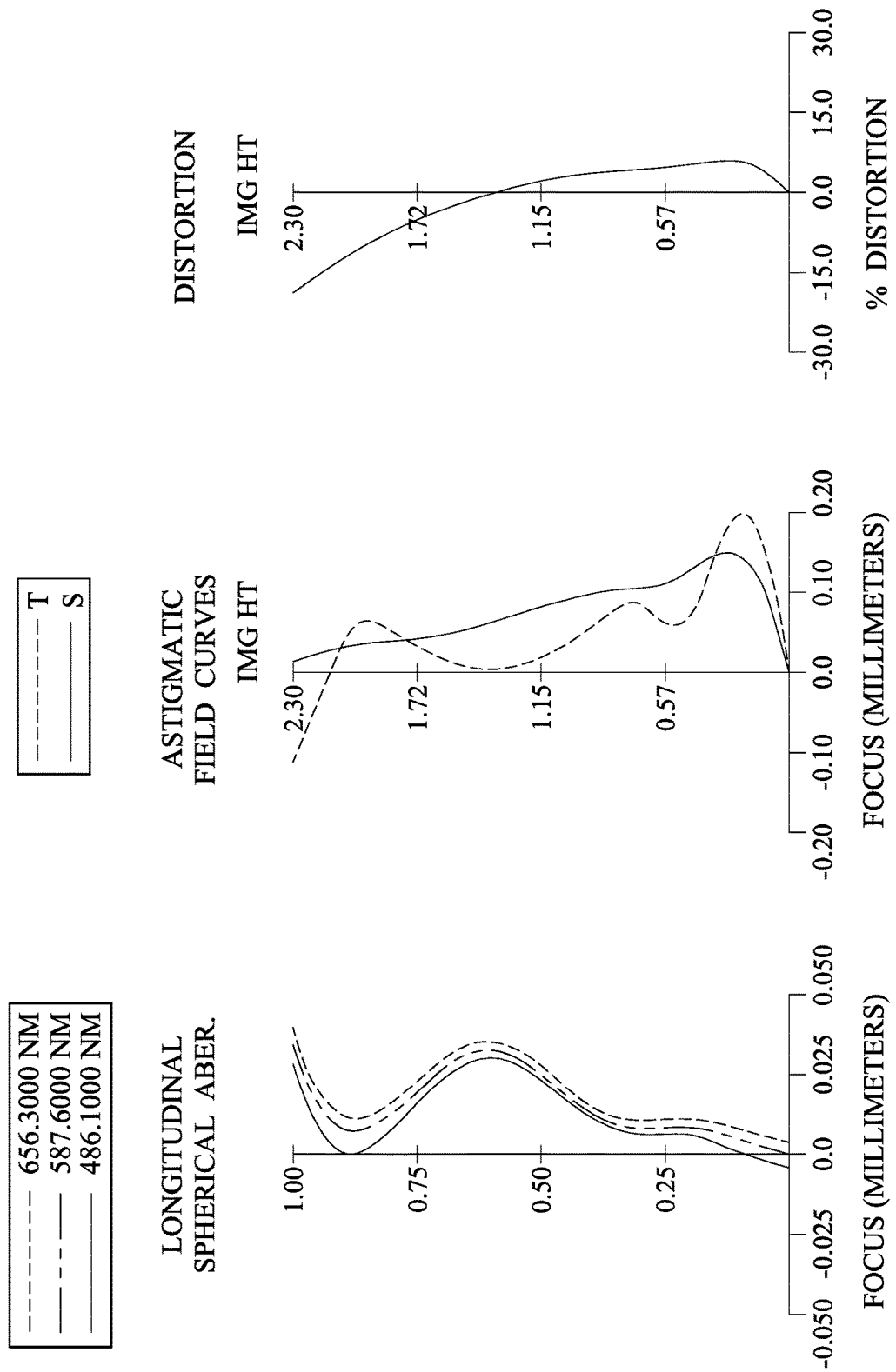
FIG. 10 shows spherical aberration curves, astigmatic field curves and a distortion curve of the electronic device according to the 5th embodiment.

FIG. 9 is a schematic view of an electronic device according to the 5th embodiment of the present disclosure. FIG. 10 shows spherical aberration curves, astigmatic field curves and a distortion curve of the electronic device according to the 5th embodiment. In FIG. 9, the electronic device includes an optical lens system (its reference numeral is omitted), wherein the optical lens system includes, in order from an outside to an inside, a first lens element 510, an aperture stop 500, a second lens element 520, a third lens element 530, a fourth lens element 540, a fifth lens element 550, a filter 560 and an inside conjugation surface 570. The optical lens system includes five lens elements (510, 520, 530, 540 and 550) without additional one or more lens elements inserted between the first lens element 510 and the fifth lens element 550, and there is an air gap in a paraxial region between every adjacent lens element of the five lens elements.

The first lens element 510 with positive refractive power has an outside surface 511 being convex in a paraxial region thereof and an inside surface 512 being concave in a paraxial region thereof. The first lens element 510 is made of a plastic material, and has the outside surface 511 and the inside surface 512 being both aspheric. Furthermore, each of the outside surface 511 and the inside surface 512 of the first lens element 510 includes at least one inflection point, and each of the outside surface 511 and the inside surface 512 of the first lens element 510 includes at least one critical point in an off-axis region thereof.

The second lens element 520 with positive refractive power has an outside surface 521 being concave in a paraxial region thereof and an inside surface 522 being convex in a paraxial region thereof. The second lens element 520 is made of a plastic material, and has the outside surface 521 and the inside surface 522 being both aspheric.

The third lens element 530 with negative refractive power has an outside surface 531 being concave in a paraxial region thereof and an inside surface 532 being concave in a paraxial region thereof. The third lens element 530 is made of a plastic material, and has the outside surface 531 and the inside surface 532 being both aspheric. Furthermore, the inside surface 532 of the third lens element 530 includes at least one inflection point, and the inside surface 532 of the third lens element 530 includes at least one critical point in an off-axis region thereof.

The fourth lens element 540 with positive refractive power has an outside surface 541 being concave in a paraxial region thereof and an inside surface 542 being convex in a paraxial region thereof. The fourth lens element 540 is made of a plastic material, and has the outside surface 541 and the inside surface 542 being both aspheric. Furthermore, each of the outside surface 541 and the inside surface 542 of the fourth lens element 540 includes at least one inflection point, and the outside surface 541 of the fourth lens element 540 includes at least one critical point in an off-axis region thereof.

The fifth lens element 550 with negative refractive power has an outside surface 551 being convex in a paraxial region thereof and an inside surface 552 being concave in a paraxial region thereof. The fifth lens element 550 is made of a plastic material, and has the outside surface 551 and the inside surface 552 being both aspheric. Furthermore, each of the outside surface 551 and the inside surface 552 of the fifth lens element 550 includes at least one inflection point, and each of the outside surface 551 and the inside surface 552 of the fifth lens element 550 includes at least one critical point in an off-axis region thereof.

The filter 560 is made of a glass material and located between the fifth lens element 550 and the inside conjugation surface 570, and will not affect the focal length of the optical lens system.

The detailed optical data of the 5th embodiment is shown in Table 9, and the aspheric surface data are shown in Table 10 below.

TABLE 9

5th Embodiment
f = 1.83 mm, Fno = 1.99, HFOV = 57.4 deg.

| Surface # | | Curvature Radius | | Thickness | Material | Index | Abbe # | Focal Length |
|---|---|---|---|---|---|---|---|---|
| 0 | Outside conjugation surface | Plano | | Infinity | | | | |
| 1 | Lens 1 | 3.145 | ASP | 0.221 | Plastic | 1.580 | 56.0 | 28.76 |
| 2 | | 3.776 | ASP | 0.037 | | | | |
| 3 | Ape. Stop | Plano | | 0.067 | | | | |
| 4 | Lens 2 | −200.000 | ASP | 0.430 | Plastic | 1.566 | 37.4 | 1.42 |
| 5 | | −0.801 | ASP | 0.030 | | | | |
| 6 | Lens 3 | −200.000 | ASP | 0.200 | Plastic | 1.669 | 19.5 | −2.02 |
| 7 | | 1.361 | ASP | 0.249 | | | | |
| 8 | Lens 4 | −1.268 | ASP | 0.709 | Plastic | 1.566 | 37.4 | 1.19 |
| 9 | | −0.530 | ASP | 0.020 | | | | |
| 10 | Lens 5 | 0.905 | ASP | 0.291 | Plastic | 1.669 | 19.5 | −1.68 |
| 11 | | 0.437 | ASP | 0.600 | | | | |
| 12 | filter | Plano | | 0.210 | Glass | 1.517 | 64.2 | — |
| 13 | | Plano | | 0.289 | | | | |
| 14 | Inside conjugation surface | Plano | | — | | | | |

Reference wavelength (d-line, visible) is 587.6 nm

TABLE 10

| Aspheric Coefficients | | | | | |
|---|---|---|---|---|---|
| | Surface # | | | | |
| | 1 | 2 | 4 | 5 | 6 |
| k = | −2.2305E+01 | −8.8493E+01 | −9.9000E+01 | −1.6734E−01 | 9.0000E+01 |
| A4 = | 1.1780E−02 | −4.0721E−01 | 2.0204E−01 | 6.5636E−01 | −5.9360E−02 |
| A6 = | −3.5444E+00 | 9.4206E−01 | −1.5932E+01 | −2.1381E+00 | −4.1040E+00 |
| A8 = | 2.2746E+01 | −1.8347E+01 | 1.7212E+02 | −7.9476E+00 | 1.4870E+01 |
| A10 = | −8.6105E+01 | 6.3651E+01 | −1.1167E+03 | 6.5866E+01 | −1.9069E+01 |
| A12 = | 1.5380E+02 | −6.7180E+01 | 3.6343E+03 | −1.3351E+02 | 7.3728E+00 |
| A14 = | −1.0331E+02 | | −4.5961E−03 | 8.4445E+01 | 3.9446E−01 |
| | Surface # | | | | |
| | 7 | 8 | 9 | 10 | 11 |
| k = | 2.5235E−01 | −2.0886E+01 | −1.0000E+00 | −3.5572E+01 | −5.7086E+00 |
| A4 = | −8.0587E−01 | −7.1001E−01 | 6.0725E−01 | 4.0567E−01 | 6.4811E−02 |
| A6 = | 1.0753E+00 | 2.3351E+00 | 1.2494E+00 | −1.0962E+00 | −2.8540E−01 |
| A8 = | −9.6301E−01 | −2.0630E+00 | −1.2281E+01 | 1.3508E+00 | 3.1335E−01 |
| A10 = | −1.2026E−03 | −1.9373E+00 | 3.7523E+01 | −9.7326E−01 | −1.8490E−01 |
| A12 = | 1.3428E+00 | 5.8866E+00 | −6.3101E+01 | 4.2561E−01 | 6.3548E−02 |
| A14 = | −1.4649E+00 | −4.5293E+00 | 6.4609E+01 | −1.1050E−01 | −1.2669E−02 |
| A16 = | 3.8113E−01 | 8.7843E−01 | −3.9777E+01 | 1.5583E−02 | 1.3524E−03 |
| A18 = | | 1.7134E−01 | 1.3442E+01 | −9.1279E−04 | −5.9664E−05 |
| A20 = | | | −1.9072E+00 | −5.7190E−07 | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.83 | TD/BL | 2.05 |
| Fno | 1.99 | TL/f | 1.84 |
| HFOV [deg.] | 57.4 | TL/YI | 1.46 |
| Vd1 | 56.0 | |R8|/Y42 | 0.48 |
| Vd2 | 37.4 | f/EPD | 1.99 |
| Vd3 | 19.5 | f/f1 | 0.06 |
| Vd4 | 37.4 | f/f2 | 1.29 |
| Vd5 | 19.5 | f/f3 | −0.90 |
| Vd1 + Vd2 + Vd3 + Vd4 + Vd5 | 169.8 | f/f4 | 1.53 |
| CT3/CT2 | 0.47 | f/f5 | −1.08 |
| CT3/CT5 | 0.69 | |P|max | 1.53 |
| CT3/(T12 + T23 + T34) | 0.52 | Sag51/CT5 | 0.35 |
| CTmax/CTmin | 3.55 | Sag51/Y51 | 0.06 |
| SL/TL | 0.92 | Y11/Y52 | 0.32 |
| T45/CT5 | 0.07 | YI/Y52 | 1.19 |
| TD [mm] | 2.25 | | |

In the 5th embodiment, the numbers of the inflection points of the outside surfaces and the inside surfaces of the first lens element 510, the second lens element 520, the third lens element 530, the fourth lens element 540 and the fifth lens element 550 are listed in the table below.

| 5th Embodiment - numbers of the inflection points | | | | | |
|---|---|---|---|---|---|
| | 510 | 520 | 530 | 540 | 550 |
| outside surface | 1 | — | — | 2 | 1 |
| inside surface | 1 | — | 1 | 1 | 1 |

In the optical lens system according to the 5th embodiment, each of the outside surface 511 and the inside surface 512 of the first lens element 510, the inside surface 532 of the third lens element 530, and the outside surface 551 and the inside surface 552 of the fifth lens element 550 includes one critical point in an off-axis region thereof. The outside surface 541 of the fourth lens element 540 includes two critical points in an off-axis region thereof. The critical point located on the outside surface 511 of the first lens element 510 satisfies: Yc/Y=0.72. The critical point located on the inside surface 512 of the first lens element 510 satisfies: Yc/Y=0.59. The critical point located on the inside surface 532 of the third lens element 530 satisfies: Yc/Y=0.88. The two critical points located on the outside surface 541 of the fourth lens element 540 satisfy: Yc/Y=0.79, 0.92, respectively. The critical point located on the outside surface 551 of the fifth lens element 550 satisfies: Yc/Y=0.70. The critical point located on the inside surface 552 of the fifth lens element 550 satisfies: Yc/Y=0.74.

6th Embodiment

Figure 11:
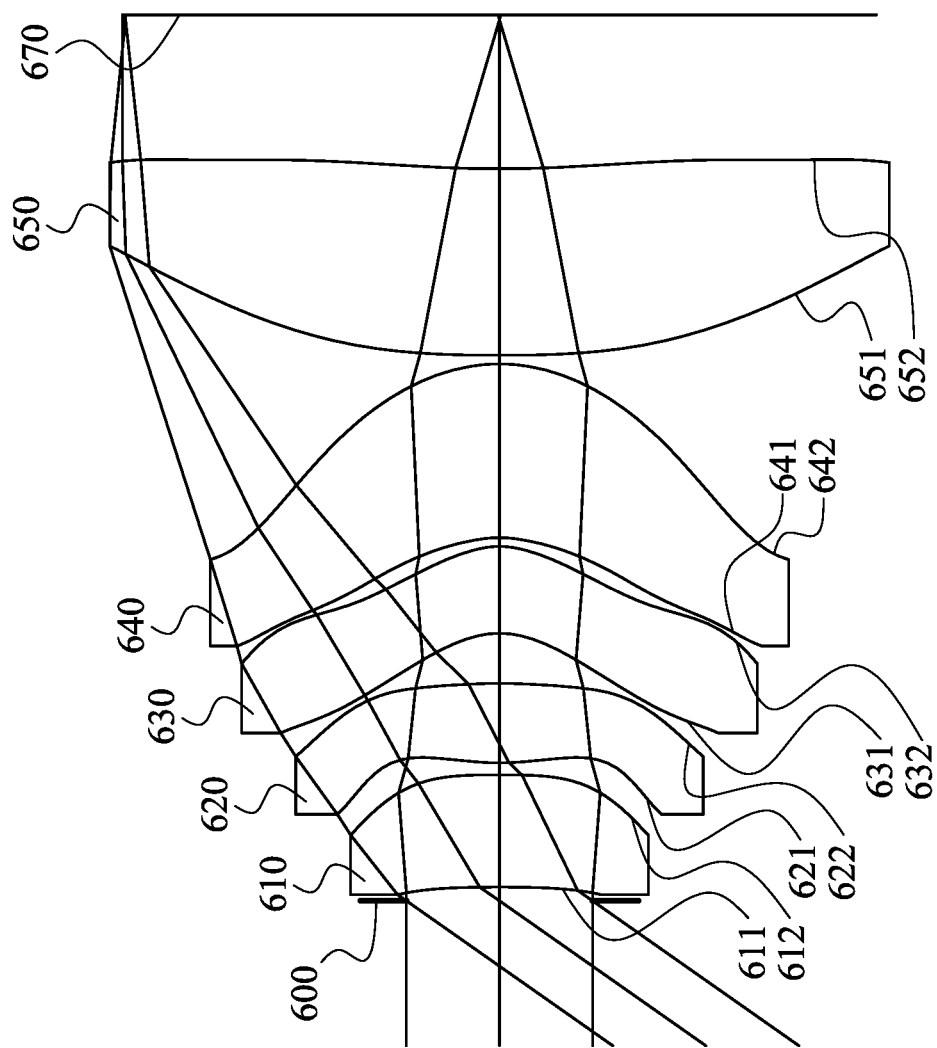
FIG. 11 is a schematic view of an electronic device according to the 6th embodiment of the present disclosure.
Figure 12:
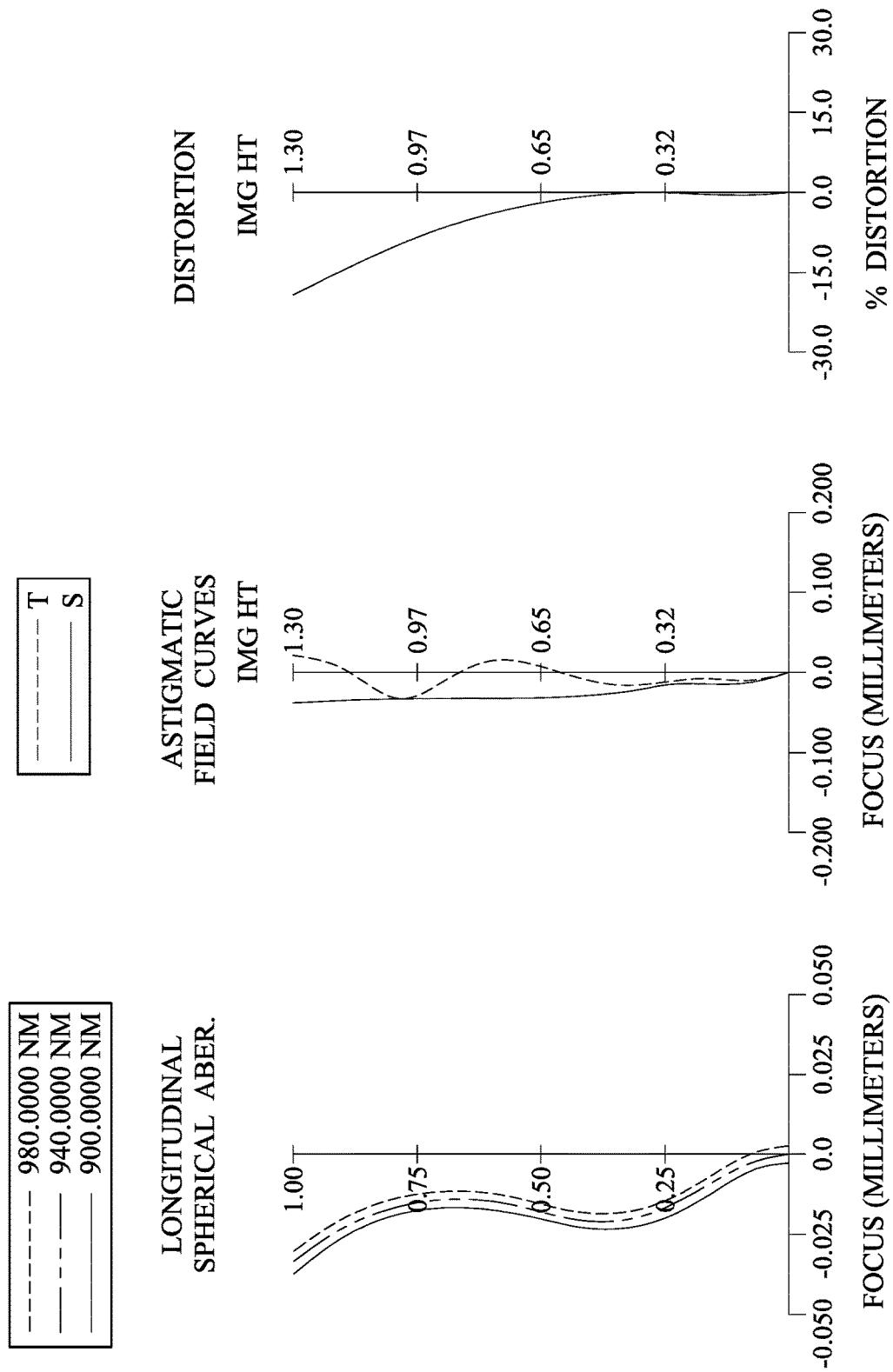
FIG. 12 shows spherical aberration curves, astigmatic field curves and a distortion curve of the electronic device according to the 6th embodiment.

FIG. 11 is a schematic view of an electronic device according to the 6th embodiment of the present disclosure. FIG. 12 shows spherical aberration curves, astigmatic field curves and a distortion curve of the electronic device according to the 6th embodiment. In FIG. 11, the electronic device includes an optical lens system (its reference numeral is omitted), wherein the optical lens system includes, in order from an outside to an inside, an aperture stop 600, a first lens element 610, a second lens element 620, a third lens element 630, a fourth lens element 640, a fifth lens element 650 and an inside conjugation surface 670. The optical lens system includes five lens elements (610, 620, 630, 640 and 650) without additional one or more lens elements inserted between the first lens element 610 and the fifth lens element 650, and there is an air gap in a paraxial region between every adjacent lens element of the five lens elements.

The first lens element 610 with negative refractive power has an outside surface 611 being concave in a paraxial region thereof and an inside surface 612 being convex in a paraxial region thereof. The first lens element 610 is made of a plastic material, and has the outside surface 611 and the inside surface 612 being both aspheric. Furthermore, the inside surface 612 of the first lens element 610 includes at least one inflection point.

The second lens element 620 with positive refractive power has an outside surface 621 being convex in a paraxial region thereof and an inside surface 622 being convex in a paraxial region thereof. The second lens element 620 is made of a plastic material, and has the outside surface 621 and the inside surface 622 being both aspheric. Furthermore, each of the outside surface 621 and the inside surface 622 of the second lens element 620 includes at least one inflection point, and the outside surface 621 of the second lens element 620 includes at least one critical point in an off-axis region thereof.

The third lens element 630 with positive refractive power has an outside surface 631 being concave in a paraxial region thereof and an inside surface 632 being convex in a paraxial region thereof. The third lens element 630 is made of a plastic material, and has the outside surface 631 and the inside surface 632 being both aspheric. Furthermore, each of the outside surface 631 and the inside surface 632 of the third lens element 630 includes at least one inflection point.

The fourth lens element 640 with positive refractive power has an outside surface 641 being concave in a paraxial region thereof and an inside surface 642 being convex in a paraxial region thereof. The fourth lens element 640 is made of a plastic material, and has the outside surface 641 and the inside surface 642 being both aspheric. Furthermore, each of the outside surface 641 and the inside surface 642 of the fourth lens element 640 includes at least one inflection point.

The fifth lens element 650 with negative refractive power has an outside surface 651 being convex in a paraxial region thereof and an inside surface 652 being concave in a paraxial region thereof. The fifth lens element 650 is made of a plastic material, and has the outside surface 651 and the inside surface 652 being both aspheric. Furthermore, each of the outside surface 651 and the inside surface 652 of the fifth lens element 650 includes at least one inflection point, and the inside surface 652 of the fifth lens element 650 includes at least one critical point in an off-axis region thereof.

The detailed optical data of the 6th embodiment is shown in Table 11, and the aspheric surface data are shown in Table 12 below.

TABLE 11

6th Embodiment
f= 1.14 mm, Fno = 1.77, HFOV = 54.9 deg.

| Surface # | | Curvature Radius | | Thickness | Material | Index | Abbe # | Focal Length |
|---|---|---|---|---|---|---|---|---|
| 0 | Outside conjugation surface | Plano | | Infinity | | | | |
| 1 | Ape. Stop | Plano | | 0.048 | | | | |
| 2 | Lens 1 | −4.356 | ASP | 0.387 | Plastic | 1.634 | 20.4 | −19.22 |
| 3 | | −7.013 | ASP | 0.042 | | | | |
| 4 | Lens 2 | 1.002 | ASP | 0.274 | Plastic | 1.634 | 20.4 | 1.07 |
| 5 | | −1.878 | ASP | 0.173 | | | | |
| 6 | Lens 3 | −0.311 | ASP | 0.300 | Plastic | 1.634 | 20.4 | 1.13 |
| 7 | | −0.298 | ASP | 0.030 | | | | |
| 8 | Lens 4 | −0.416 | ASP | 0.600 | Plastic | 1.634 | 20.4 | 8.50 |
| 9 | | −0.602 | ASP | 0.030 | | | | |
| 10 | Lens 5 | 6.629 | ASP | 0.644 | Plastic | 1.634 | 20.4 | −22.39 |
| 11 | | 4.349 | ASP | 0.531 | | | | |
| 12 | Inside conjugation surface | Plano | | — | | | | |

Reference wavelength (infrared light) is 940.0 nm

TABLE 12

Aspheric Coefficients

| | Surface # | | | | |
|---|---|---|---|---|---|
| | 2 | 3 | 4 | 5 | 6 |
| k = | −6.6286E+01 | 8.5105E+01 | 1.1924E+00 | −1.3753E+01 | −1.9860E+00 |
| A4 = | −6.6146E−01 | −4.7728E+00 | −3.5176E+00 | 1.6431E+00 | 1.3978E+00 |
| A6 = | 2.8590E−01 | 1.2980E+01 | −5.0153E+00 | −1.5554E+01 | −5.7526E+00 |
| A8 = | −2.4770E+01 | −3.4354E+01 | 6.3931E+01 | 3.7706E+01 | 1.7781E+01 |
| A10 = | 3.9796E+01 | 5.7651E+01 | −6.4942E+02 | −4.0759E+01 | −2.8142E+01 |
| A12 = | | | 2.4086E+03 | 2.0889E+01 | 2.0967E+01 |
| A14 = | | | −2.7434E+03 | −4.1286E+00 | −7.0341E+00 |
| A16 = | | | | | 8.4370E−01 |

TABLE 12-continued

Aspheric Coefficients

| Surface # | | | | |
|---|---|---|---|---|
| 7 | 8 | 9 | 10 | 11 |
| k = −4.4107E+00 | −1.1618E+01 | −4.2348E+00 | 9.9160E+00 | 4.3008E+00 |
| A4 = −1.0957E+00 | −2.0417E+00 | −1.6276E+00 | 3.7306E−01 | −7.1179E−02 |
| A6 = 7.5730E+00 | 2.1846E+00 | 4.0717E+00 | −5.4487E−01 | −3.9304E−01 |
| A8 = −1.5103E+01 | 1.9978E+01 | −8.7697E+00 | 4.8146E−01 | 1.1478E+00 |
| A10 = 1.1592E+01 | −6.7018E+01 | 1.2395E+01 | −2.5336E−01 | −1.7498E+00 |
| A12 = −3.0304E+00 | 8.4291E+01 | −9.1051E+00 | 7.5232E−02 | 1.7238E+00 |
| A14 = | −4.6780E+01 | 3.1802E+00 | −1.1673E−02 | −1.0877E+00 |
| A16 = | 9.2267E+00 | −4.2001E−01 | 7.0586E−04 | 4.1481E−01 |
| A18 = | | | | −8.6158E−02 |
| A20 = | | | | 7.4326E−03 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.14 | TD/BL | 4.67 |
| Fno | 1.77 | TL/f | 2.65 |
| HFOV [deg.] | 54.9 | TL/YI | 2.32 |
| Vd1 | 20.4 | \|R8\|/Y42 | 0.60 |
| Vd2 | 20.4 | f/EPD | 1.77 |
| Vd3 | 20.4 | f/f1 | −0.06 |
| Vd4 | 20.4 | f/f2 | 1.06 |
| Vd5 | 20.4 | f/f3 | 1.01 |
| Vd1 + Vd2 + Vd3 + Vd4 + Vd5 | 102.0 | f/f4 | 0.13 |
| CT3/CT2 | 1.09 | f/f5 | −0.05 |
| CT3/CT5 | 0.47 | \|P\|max | 1.06 |
| CT3/(T12 + T23 + T34) | 1.22 | Sag51/CT5 | 0.58 |
| CTmax/CTmin | 2.35 | Sag51/Y51 | 0.28 |
| SL/TL | 1.02 | Y11/Y52 | 0.26 |
| T45/CT5 | 0.05 | YI/Y52 | 0.97 |
| TD [mm] | 2.48 | | |

In the 6th embodiment, the numbers of the inflection points of the outside surfaces and the inside surfaces of the first lens element 610, the second lens element 620, the third lens element 630, the fourth lens element 640 and the fifth lens element 650 are listed in the table below.

| 6th Embodiment - numbers of the inflection points | | | | | |
|---|---|---|---|---|---|
| | 610 | 620 | 630 | 640 | 650 |
| outside surface | — | 2 | 2 | 3 | 1 |
| inside surface | 1 | 1 | 2 | 1 | 3 |

In the optical lens system according to the 6th embodiment, the outside surface 621 of the second lens element 620 includes one critical point in an off-axis region thereof, and the inside surface 652 of the fifth lens element 650 includes three critical points in an off-axis region thereof. The critical point located on the outside surface 621 of the second lens element 620 satisfies: Yc/Y=0.48. The three critical points located on the inside surface 652 of the fifth lens element 650 satisfy: Yc/Y=0.61, 0.71, 0.87, respectively.

7th Embodiment

Figure 13:
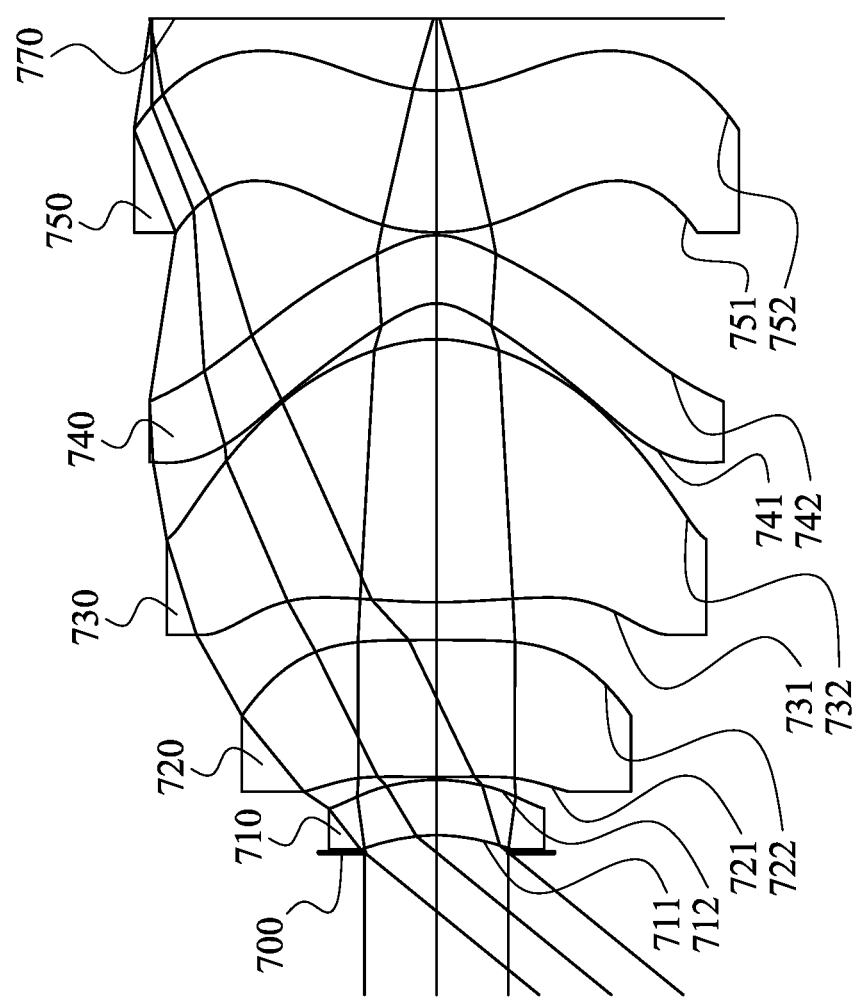
FIG. 13 is a schematic view of an electronic device according to the 7th embodiment of the present disclosure.
Figure 14:
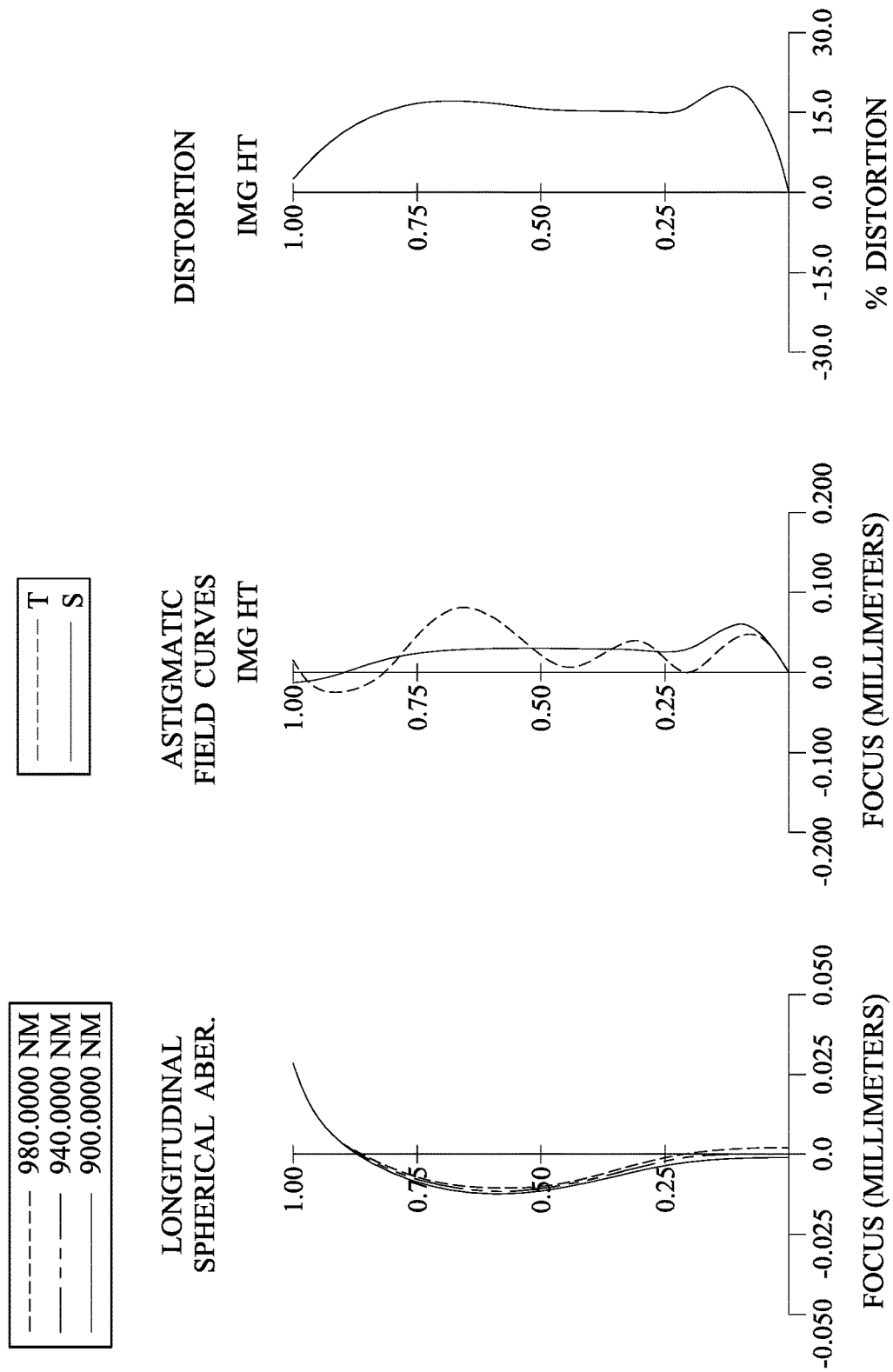
FIG. 14 shows spherical aberration curves, astigmatic field curves and a distortion curve of the electronic device according to the 7th embodiment.

FIG. 13 is a schematic view of an electronic device according to the 7th embodiment of the present disclosure. FIG. 14 shows spherical aberration curves, astigmatic field curves and a distortion curve of the electronic device according to the 7th embodiment. In FIG. 13, the electronic device includes an optical lens system (its reference numeral is omitted), wherein the optical lens system includes, in order from an outside to an inside, an aperture stop 700, a first lens element 710, a second lens element 720, a third lens element 730, a fourth lens element 740, a fifth lens element 750 and an inside conjugation surface 770. The optical lens system includes five lens elements (710, 720, 730, 740 and 750) without additional one or more lens elements inserted between the first lens element 710 and the fifth lens element 750, and there is an air gap in a paraxial region between every adjacent lens element of the five lens elements.

The first lens element 710 with positive refractive power has an outside surface 711 being concave in a paraxial region thereof and an inside surface 712 being convex in a paraxial region thereof. The first lens element 710 is made of a glass material, and has the outside surface 711 and the inside surface 712 being both aspheric. Furthermore, the inside surface 712 of the first lens element 710 includes at least one inflection point.

The second lens element 720 with positive refractive power has an outside surface 721 being convex in a paraxial region thereof and an inside surface 722 being concave in a paraxial region thereof. The second lens element 720 is made of a plastic material, and has the outside surface 721 and the inside surface 722 being both aspheric. Furthermore, each of the outside surface 721 and the inside surface 722 of the second lens element 720 includes at least one inflection point, and each of the outside surface 721 and the inside surface 722 of the second lens element 720 includes at least one critical point in an off-axis region thereof.

The third lens element 730 with positive refractive power has an outside surface 731 being convex in a paraxial region thereof and an inside surface 732 being convex in a paraxial region thereof. The third lens element 730 is made of a plastic material, and has the outside surface 731 and the inside surface 732 being both aspheric. Furthermore, each of the outside surface 731 and the inside surface 732 of the third lens element 730 includes at least one inflection point, and the outside surface 731 of the third lens element 730 includes at least one critical point in an off-axis region thereof.

The fourth lens element 740 with positive refractive power has an outside surface 741 being concave in a paraxial region thereof and an inside surface 742 being convex in a paraxial region thereof. The fourth lens element 740 is made of a plastic material, and has the outside surface 741 and the inside surface 742 being both aspheric. Furthermore, each of the outside surface 741 and the inside surface 742 of the fourth lens element 740 includes at least one inflection point, and the outside surface 741 of the fourth lens element 740 includes at least one critical point in an off-axis region thereof.

The fifth lens element 750 with positive refractive power has an outside surface 751 being convex in a paraxial region thereof and an inside surface 752 being concave in a paraxial region thereof. The fifth lens element 750 is made of a plastic material, and has the outside surface 751 and the inside surface 752 being both aspheric. Furthermore, each of the outside surface 751 and the inside surface 752 of the fifth lens element 750 includes at least one inflection point, and each of the outside surface 751 and the inside surface 752 of the fifth lens element 750 includes at least one critical point in an off-axis region thereof.

The detailed optical data of the 7th embodiment is shown in Table 13, and the aspheric surface data are shown in Table 14 below.

TABLE 13

7th Embodiment
f = 0.81 mm, Fno = 1.60, HFOV = 50.8 deg.

| Surface # | | Curvature Radius | Thickness | Material | Index | Abbe # | Focal Length |
|---|---|---|---|---|---|---|---|
| 0 | Outside conjugation surface | Plano | Infinity | | | | |
| 1 | Ape. Stop | Plano | 0.061 | | | | |
| 2 | Lens 1 | −0.637 | ASP 0.195 | Glass | 1.674 | 33.7 | 7.47 |
| 3 | | −0.636 | ASP 0.010 | | | | |
| 4 | Lens 2 | 22.241 | ASP 0.481 | Plastic | 1.564 | 30.2 | 80.95 |
| 5 | | 42.996 | ASP 0.133 | | | | |
| 6 | Lens 3 | 2.133 | ASP 0.924 | Plastic | 1.535 | 56.0 | 0.98 |
| 7 | | −0.590 | ASP 0.126 | | | | |
| 8 | Lens 4 | −0.172 | ASP 0.240 | Plastic | 1.564 | 30.2 | 3.86 |
| 9 | | −0.240 | ASP 0.010 | | | | |
| 10 | Lens 5 | 0.732 | ASP 0.498 | Plastic | 1.634 | 20.4 | 34.91 |
| 11 | | 0.557 | ASP 0.253 | | | | |
| 12 | Inside conjugation surface | Plano | — | | | | |

Reference wavelength (infrared light) is 940.0 nm

TABLE 14

Aspheric Coefficients

| Surface # | 2 | 3 | 4 | 5 | 6 |
|---|---|---|---|---|---|
| k= | −1.9641E+00 | 4.7587E−01 | −9.9000E+01 | 9.9000E+01 | 1.8384E+00 |
| A4= | 2.9078E+00 | 3.5569E+00 | 1.3165E+00 | −1.9610E+00 | −1.2021E+00 |
| A6= | −8.3154E+01 | −6.0743E+01 | −5.3652E+01 | 1.1090E+01 | 4.7107E+00 |
| A8= | 1.0157E+03 | 4.3720E+02 | 3.6525E+02 | −7.3878E+01 | −2.1593E+01 |
| A10= | −4.4900E+03 | −7.6792E+02 | −1.0502E+03 | 2.3271E+02 | 4.1295E+01 |
| A12= | | | 1.1931E+03 | −3.4495E+02 | −3.1950E+01 |
| A14= | | | | 1.9599E+02 | 8.1792E+00 |

| Surface # | 7 | 8 | 9 | 10 | 11 |
|---|---|---|---|---|---|
| k= | −9.1457E−01 | −2.6983E+00 | −3.3359E+00 | −2.6627E+00 | −1.1347E+01 |
| A4= | 8.8694E−01 | 2.1049E−01 | 1.6409E+00 | 2.1891E+00 | 3.2791E+00 |
| A6= | −2.0301E+00 | −2.5655E+00 | −1.4680E+01 | −1.5648E+01 | −2.7641E+01 |
| A8= | −1.2346E+00 | 5.9305E+00 | 5.1308E+01 | 4.5500E+01 | 1.0728E+02 |
| A10= | 1.0655E+01 | −4.3139E+00 | −9.6372E+01 | −8.1707E+01 | −2.5552E+02 |
| A12= | −1.4481E+01 | 3.9589E−01 | 1.0264E+02 | 8.9378E+01 | 3.9042E+02 |
| A14= | 6.4411E+00 | 4.5890E−01 | −5.8107E+01 | −5.4213E+01 | −3.8273E+02 |
| A16= | | | 1.3549E+01 | 1.3918E+01 | 2.3237E+02 |
| A18= | | | | | −7.9473E+01 |
| A20= | | | | | 1.1700E+01 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 0.81 | TD/BL | 10.35 |
| Fno | 1.60 | TL/f | 3.54 |
| HFOV [deg.] | 50.8 | TL/YI | 2.87 |
| Vd1 | 33.7 | |R8|/Y42 | 0.24 |
| Vd2 | 30.2 | f/EPD | 1.60 |
| Vd3 | 56.0 | f/f1 | 0.11 |
| Vd4 | 30.2 | f/f2 | 0.01 |
| Vd5 | 20.4 | f/f3 | 0.83 |
| Vd1 + Vd2 + Vd3 + Vd4 + Vd5 | 170.6 | f/f4 | 0.21 |
| CT3/CT2 | 1.92 | f/f5 | 0.02 |
| CT3/CT5 | 1.86 | |P|max | 0.83 |
| CT3/(T12 + T23 + T34) | 3.43 | Sag51/CT5 | 0.00 |
| CTmax/CTmin | 4.74 | Sag51/Y51 | 0.00 |
| SL/TL | 1.02 | Y11/Y52 | 0.25 |
| T45/CT5 | 0.02 | YI/Y52 | 0.94 |
| TD [mm] | 2.62 | | |

In the 7th embodiment, the numbers of the inflection points of the outside surfaces and the inside surfaces of the first lens element 710, the second lens element 720, the third lens element 730, the fourth lens element 740 and the fifth lens element 750 are listed in the table below.

| 7th Embodiment - numbers of the inflection points | | | | | |
|---|---|---|---|---|---|
| | 710 | 720 | 730 | 740 | 750 |
| outside surface | — | 2 | 2 | 1 | 1 |
| inside surface | 1 | 1 | 1 | 1 | 1 |

In the optical lens system according to the 7th embodiment, each of the outside surface 721 and the inside surface 722 of the second lens element 720, the outside surface 741 of the fourth lens element 740, and the outside surface 751 and the inside surface 752 of the fifth lens element 750 includes one critical point in an off-axis region thereof. The outside surface 731 of the third lens element 730 includes two critical points in an off-axis region thereof. The critical point located on the outside surface 721 of the second lens element 720 satisfies: Yc/Y=0.36. The critical point located on the inside surface 722 of the second lens element 720 satisfies: Yc/Y=0.08. The two critical points located on the outside surface 731 of the third lens element 730 satisfy: Yc/Y=0.46, 0.98, respectively. The critical point located on the outside surface 741 of the fourth lens element 740 satisfies: Yc/Y=0.96. The critical point located on the outside surface 751 of the fifth lens element 750 satisfies: Yc/Y=0.69. The critical point located on the inside surface 752 of the fifth lens element 750 satisfies: Yc/Y=0.58.

8th Embodiment

Figure 15:
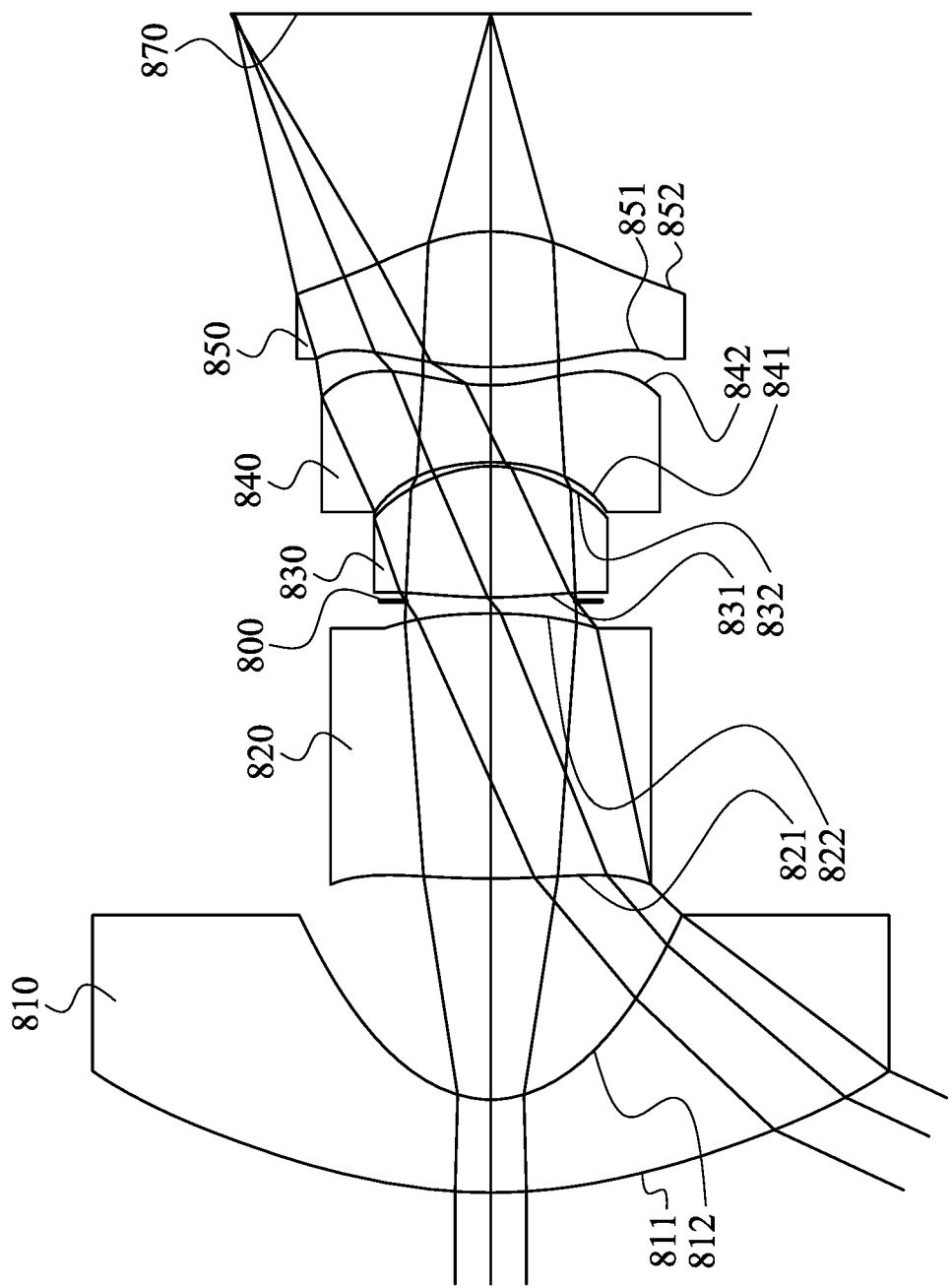
FIG. 15 is a schematic view of an electronic device according to the 8th embodiment of the present disclosure.
Figure 16:
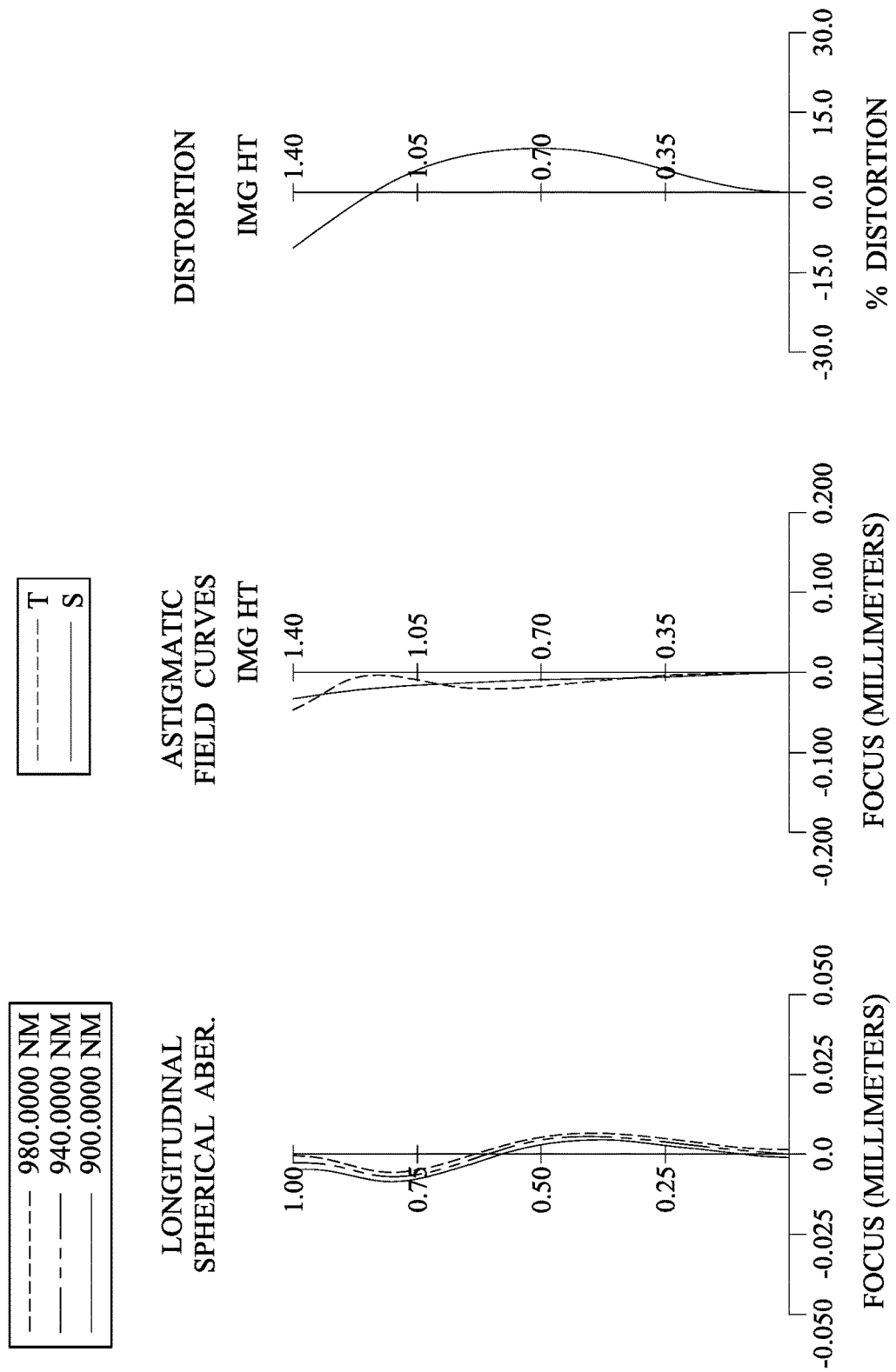
FIG. 16 shows spherical aberration curves, astigmatic field curves and a distortion curve of the electronic device according to the 8th embodiment.

FIG. 15 is a schematic view of an electronic device according to the 8th embodiment of the present disclosure. FIG. 16 shows spherical aberration curves, astigmatic field curves and a distortion curve of the electronic device according to the 8th embodiment. In FIG. 15, the electronic device includes an optical lens system (its reference numeral is omitted), wherein the optical lens system includes, in order from an outside to an inside, a first lens element 810, a second lens element 820, an aperture stop 800, a third lens element 830, a fourth lens element 840, a fifth lens element 850 and an inside conjugation surface 870. The optical lens system includes five lens elements (810, 820, 830, 840 and 850) without additional one or more lens elements inserted between the first lens element 810 and the fifth lens element 850, and there is an air gap in a paraxial region between every adjacent lens element of the five lens elements.

The first lens element 810 with negative refractive power has an outside surface 811 being convex in a paraxial region thereof and an inside surface 812 being concave in a paraxial region thereof. The first lens element 810 is made of a plastic material, and has the outside surface 811 and the inside surface 812 being both aspheric.

The second lens element 820 with positive refractive power has an outside surface 821 being convex in a paraxial region thereof and an inside surface 822 being convex in a paraxial region thereof. The second lens element 820 is made of a plastic material, and has the outside surface 821 and the inside surface 822 being both aspheric. Furthermore, the outside surface 821 of the second lens element 820 includes at least one inflection point, and the outside surface 821 of the second lens element 820 includes at least one critical point in an off-axis region thereof.

The third lens element 830 with positive refractive power has an outside surface 831 being convex in a paraxial region thereof and an inside surface 832 being convex in a paraxial region thereof. The third lens element 830 is made of a plastic material, and has the outside surface 831 and the inside surface 832 being both aspheric. Furthermore, the outside surface 831 of the third lens element 830 includes at least one inflection point.

The fourth lens element 840 with negative refractive power has an outside surface 841 being concave in a paraxial region thereof and an inside surface 842 being concave in a paraxial region thereof. The fourth lens element 840 is made of a plastic material, and has the outside surface 841 and the inside surface 842 being both aspheric. Furthermore, the inside surface 842 of the fourth lens element 840 includes at least one inflection point, and the inside surface 842 of the fourth lens element 840 includes at least one critical point in an off-axis region thereof.

The fifth lens element 850 with positive refractive power has an outside surface 851 being convex in a paraxial region thereof and an inside surface 852 being convex in a paraxial region thereof. The fifth lens element 850 is made of a plastic material, and has the outside surface 851 and the inside surface 852 being both aspheric. Furthermore, each of the outside surface 851 and the inside surface 852 of the fifth lens element 850 includes at least one inflection point, and the outside surface 851 of the fifth lens element 850 includes at least one critical point in an off-axis region thereof.

The detailed optical data of the 8th embodiment is shown in Table 15, and the aspheric surface data are shown in Table 16 below.

TABLE 15

8th Embodiment
f = 0.74 mm, Fno = 1.90, HFOV = 65.0 deg.

| Surface # | | Curvature Radius | | Thickness | Material | Index | Abbe # | Focal Length |
|---|---|---|---|---|---|---|---|---|
| 0 | Outside conjugation surface | Plano | | Infinity | | | | |
| 1 | Lens 1 | 2.995 | ASP | 0.507 | Plastic | 1.641 | 19.5 | −1.29 |
| 2 | | 0.606 | ASP | 1.206 | | | | |
| 3 | Lens 2 | 4.583 | ASP | 1.446 | Plastic | 1.641 | 19.5 | 3.42 |
| 4 | | −3.676 | ASP | 0.068 | | | | |
| 5 | Ape. Stop | Plano | | 0.020 | | | | |
| 6 | Lens 3 | 2.498 | ASP | 0.716 | Plastic | 1.567 | 28.2 | 1.07 |
| 7 | | −0.716 | ASP | 0.021 | | | | |
| 8 | Lens 4 | −1.331 | ASP | 0.421 | Plastic | 1.641 | 19.5 | −0.81 |
| 9 | | 0.961 | ASP | 0.099 | | | | |
| 10 | Lens 5 | 1.873 | ASP | 0.739 | Plastic | 1.535 | 56.0 | 1.27 |
| 11 | | −0.920 | ASP | 1.188 | | | | |
| 12 | Inside conjugation surface | Plane | | — | | | | |

Reference wavelength (infrared light) is 940.0 nm

TABLE 16

Aspheric Coefficients

| Surface # | 1 | 2 | 3 | 4 | 6 |
|---|---|---|---|---|---|
| k= | −4.0419E+00 | −1.8729E+00 | 2.0463E+01 | −7.0053E+01 | −7.3994E+00 |
| A4= | −7.0793E−04 | 5.2447E−01 | −1.4968E−01 | −7.2665E−01 | −4.9888E−01 |
| A6= | 4.0931E−04 | −3.5985E−01 | −9.2746E−02 | 1.1324E+00 | 1.1182E+00 |
| A8= | −4.4892E−05 | 2.7573E−01 | −7.5139E−02 | 6.9249E−02 | −4.7676E−01 |
| A10= | 2.3976E−05 | −1.0468E−01 | 2.6124E−02 | −1.8511E+00 | −7.0356E+00 |
| A12= | | | 4.7892E−03 | | 1.6406E+01 |
| A14= | | | | | −1.6718E+01 |

| Surface # | 7 | 8 | 9 | 10 | 11 |
|---|---|---|---|---|---|
| k= | −6.8229E−01 | 2.1175E+00 | −7.2034E+00 | 1.9780E+00 | −1.0023E+00 |
| A4= | 7.7370E−01 | −4.5533E−01 | −5.9351E−01 | −2.1266E−01 | 2.0321E−01 |
| A6= | −3.3035E+00 | 7.8637E−02 | 1.1314E+00 | 1.1499E−01 | −4.1130E−02 |
| A8= | 1.2496E+01 | 2.0470E+00 | −2.9623E+00 | −6.9089E−01 | 6.6517E−01 |
| A10= | −3.5353E+01 | −1.9677E+00 | 4.4137E+00 | 9.6324E−01 | −1.3150E+00 |
| A12= | 4.5285E+01 | −2.1298E+01 | −4.0322E+00 | −7.9438E−01 | 1.0597E+00 |
| A14= | −2.2837E+01 | 2.8679E+01 | 1.9848E+00 | 2.7962E−01 | −4.1166E−01 |
| A16= | | −3.8229E−01 | | −3.6881E−02 | 6.3205E−02 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 0.74 | TD/BL | 4.41 |
| Fno | 1.90 | TL/f | 8.73 |
| HFOV [deg.] | 65.0 | TL/YI | 4.60 |
| Vd1 | 19.5 | |R8|/Y42 | 1.04 |
| Vd2 | 19.5 | f/EPD | 1.90 |
| Vd3 | 28.2 | f/f1 | −0.57 |
| Vd4 | 19.5 | f/f2 | 0.22 |
| Vd5 | 56.0 | f/f3 | 0.69 |
| Vd1 + Vd2 + Vd3 + Vd4 + Vd5 | 142.5 | f/f4 | −0.91 |
| CT3/CT2 | 0.50 | f/f5 | 0.58 |
| CT3/CT5 | 0.97 | |P|max | 0.91 |
| CT3/(T12 + T23 + T34) | 0.54 | Sag51/CT5 | 0.06 |
| CTmax/CTmin | 3.43 | Sag51/Y51 | 0.05 |
| SL/TL | 0.50 | Y11/Y52 | 2.05 |
| T45/CT5 | 0.13 | YI/Y52 | 1.32 |
| TD [mm] | 5.24 | | |

In the 8th embodiment, the numbers of the inflection points of the outside surfaces and the inside surfaces of the first lens element 810, the second lens element 820, the third lens element 830, the fourth lens element 840 and the fifth lens element 850 are listed in the table below.

| 8th Embodiment - numbers of the inflection points | | | | | |
|---|---|---|---|---|---|
| | 810 | 820 | 830 | 840 | 850 |
| outside surface | — | 1 | 1 | — | 1 |
| inside surface | — | — | — | 1 | 2 |

In the optical lens system according to the 8th embodiment, each of the outside surface 821 of the second lens element 820, the inside surface 842 of the fourth lens element 840, and the outside surface 851 of the fifth lens element 850 includes one critical point in an off-axis region thereof. The critical point located on the outside surface 821 of the second lens element 820 satisfies: Yc/Y=0.65. The critical point located on the inside surface 842 of the fourth lens element 840 satisfies: Yc/Y=0.65. The critical point located on the outside surface 851 of the fifth lens element 850 satisfies: Yc/Y=0.81.

9th Embodiment

Figure 17:
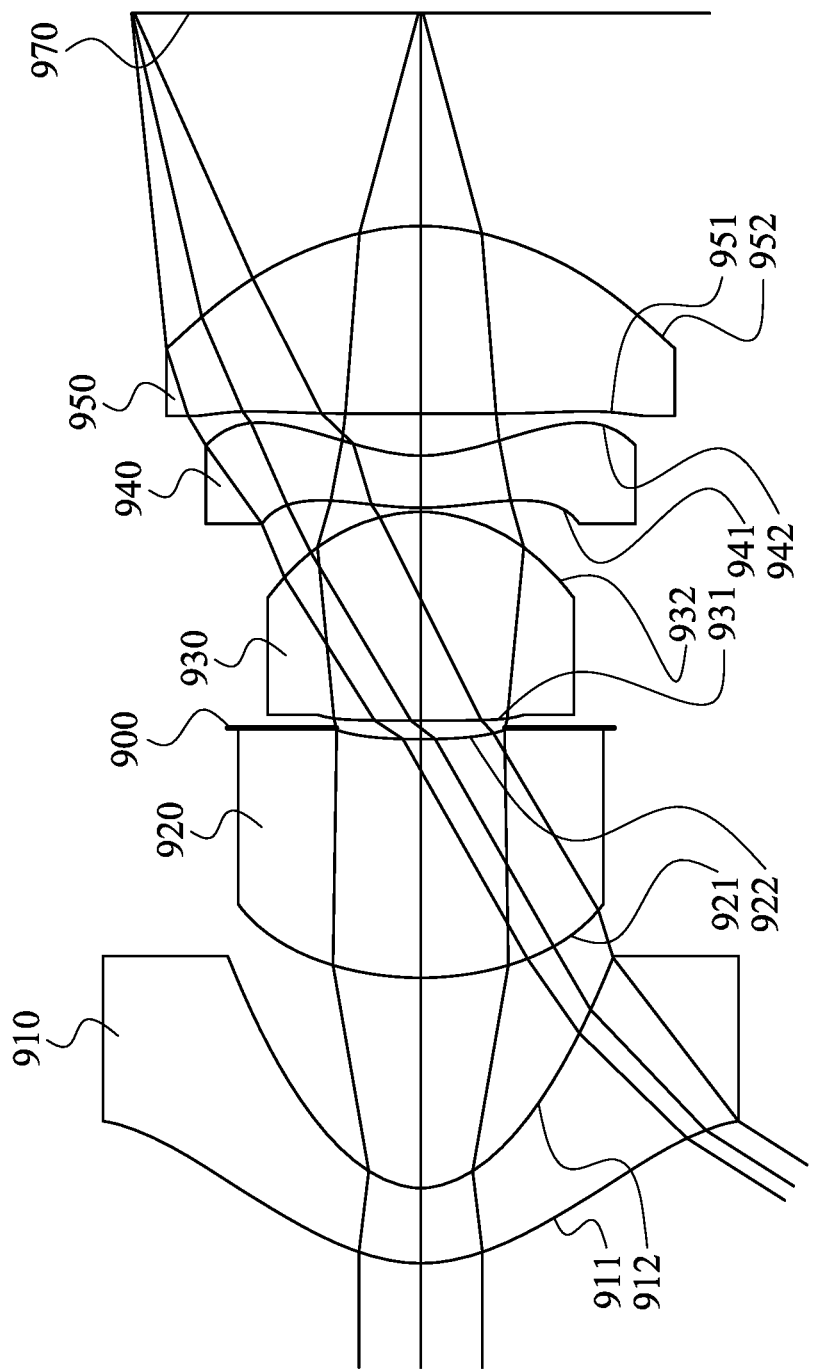
FIG. 17 is a schematic view of an electronic device according to the 9th embodiment of the present disclosure.
Figure 18:
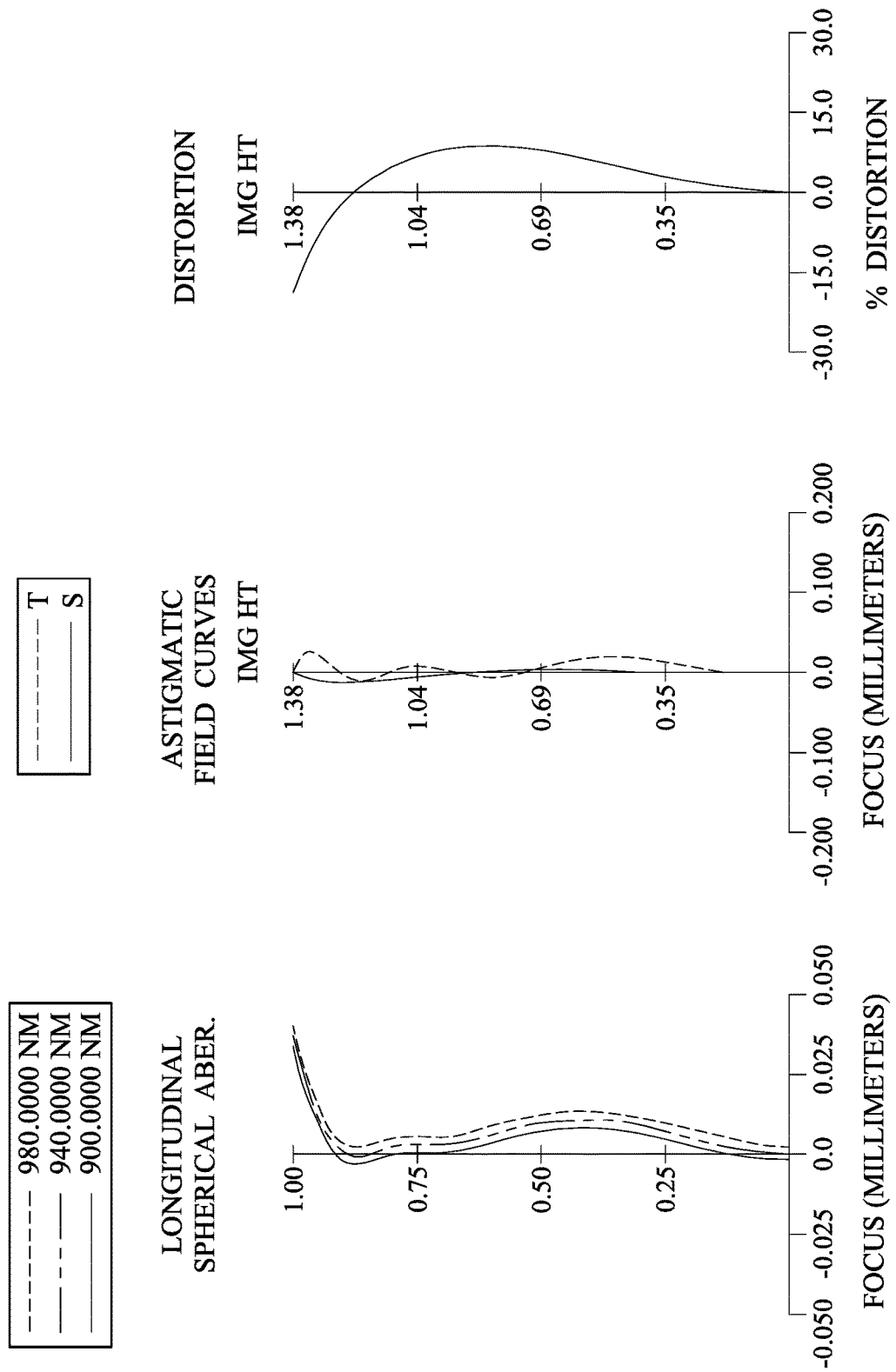
FIG. 18 shows spherical aberration curves, astigmatic field curves and a distortion curve of the electronic device according to the 9th embodiment.

FIG. 17 is a schematic view of an electronic device according to the 9th embodiment of the present disclosure. FIG. 18 shows spherical aberration curves, astigmatic field curves and a distortion curve of the electronic device according to the 9th embodiment. In FIG. 17, the electronic device includes an optical lens system (its reference numeral is omitted), wherein the optical lens system includes, in order from an outside to an inside, a first lens element 910, a second lens element 920, an aperture stop 900, a third lens element 930, a fourth lens element 940, a fifth lens element 950 and an inside conjugation surface 970. The optical lens system includes five lens elements (910, 920, 930, 940 and 950) without additional one or more lens elements inserted between the first lens element 910 and the fifth lens element 950, and there is an air gap in a paraxial region between every adjacent lens element of the five lens elements.

The first lens element 910 with negative refractive power has an outside surface 911 being convex in a paraxial region thereof and an inside surface 912 being concave in a paraxial region thereof. The first lens element 910 is made of a plastic material, and has the outside surface 911 and the inside surface 912 being both aspheric. Furthermore, each of the outside surface 911 and the inside surface 912 of the first lens element 910 includes at least one inflection point.

The second lens element 920 with positive refractive power has an outside surface 921 being convex in a paraxial region thereof and an inside surface 922 being concave in a paraxial region thereof. The second lens element 920 is made of a plastic material, and has the outside surface 921 and the inside surface 922 being both aspheric.

The third lens element 930 with positive refractive power has an outside surface 931 being convex in a paraxial region thereof and an inside surface 932 being convex in a paraxial region thereof. The third lens element 930 is made of a plastic material, and has the outside surface 931 and the inside surface 932 being both aspheric. Furthermore, each of the outside surface 931 and the inside surface 932 of the third lens element 930 includes at least one inflection point.

The fourth lens element 940 with negative refractive power has an outside surface 941 being convex in a paraxial region thereof and an inside surface 942 being concave in a paraxial region thereof. The fourth lens element 940 is made of a plastic material, and has the outside surface 941 and the inside surface 942 being both aspheric. Furthermore, each of the outside surface 941 and the inside surface 942 of the fourth lens element 940 includes at least one inflection point, and each of the outside surface 941 and the inside surface 942 of the fourth lens element 940 includes at least one critical point in an off-axis region thereof.

The fifth lens element 950 with positive refractive power has an outside surface 951 being concave in a paraxial region thereof and an inside surface 952 being convex in a paraxial region thereof. The fifth lens element 950 is made of a glass material, and has the outside surface 951 and the inside surface 952 being both aspheric. Furthermore, each of the outside surface 951 and the inside surface 952 of the fifth lens element 950 includes at least one inflection point, and the outside surface 951 of the fifth lens element 950 includes at least one critical point in an off-axis region thereof.

The detailed optical data of the 9th embodiment is shown in Table 17, and the aspheric surface data are shown in Table 18 below.

TABLE 17

9th Embodiment
f= 1.12 mm, Fno= 1.89, HFOV = 57.6 deg.

| Surface # | | Curvature Radius | | Thickness | Material | Index | Abbe # | Focal Length |
|---|---|---|---|---|---|---|---|---|
| 0 | Outside conjugation surface | Plano | | Infinity | | | | |
| 1 | Lens 1 | 0.785 | ASP | 0.360 | Plastic | 1.553 | 37.4 | −1.84 |
| 2 | | 0.371 | ASP | 1.008 | | | | |
| 3 | Lens 2 | 1.524 | ASP | 1.143 | Plastic | 1.641 | 19.5 | 3.81 |
| 4 | | 2.869 | ASP | 0.054 | | | | |
| 5 | Ape. Stop | Plano | | 0.036 | | | | |
| 6 | Lens 3 | 53.959 | ASP | 1.000 | Plastic | 1.553 | 37.4 | 1.34 |
| 7 | | −0.748 | ASP | 0.020 | | | | |
| 8 | Lens 4 | 1.471 | ASP | 0.250 | Plastic | 1.641 | 19.5 | −2.96 |
| 9 | | 0.774 | ASP | 0.201 | | | | |
| 10 | Lens 5 | −200.000 | ASP | 0.899 | Glass | 1.556 | 61.1 | 2.22 |
| 11 | | −1.231 | ASP | 1.021 | | | | |
| 12 | Inside conjugation surface | Plano | | — | | | | |

Reference wavelength (infrared light) is 940.0 nm
Effective radius of Surface 1 is 1.521 mm
Effective radius of Surface 8 is 0.760 mm

TABLE 18

| Aspheric Coefficients | | | | | |
|---|---|---|---|---|---|
| Surface # | 1 | 2 | 3 | 4 | 6 |
| k= | −2.3460E+00 | −1.8212E+00 | 1.2773E+00 | 3.9792E+01 | −9.0000E+01 |
| A4= | −8.5593E−03 | 1.2740E+00 | −3.3256E−02 | 1.6849E−01 | 1.1130E−01 |
| A6= | −3.6392E−03 | −1.7952E+00 | 1.4854E−01 | −6.9548E−01 | −4.7322E−01 |
| A8= | −4.8111E−03 | 2.0594E+00 | −3.2363E−01 | 1.1747E+01 | 2.6482E+01 |
| A10= | 8.7059E−04 | −1.0856E+00 | 5.1793E−01 | −3.3808E+01 | −2.6962E+02 |
| A12= | | 8.3929E−02 | −2.6632E−01 | | 1.3842E+03 |
| A14= | | | | | −2.4799E+03 |

| Surface # | 7 | 8 | 9 | 10 | 11 |
|---|---|---|---|---|---|
| k= | −3.3000E−01 | 1.6553E+00 | −1.8410E+00 | −9.0000E+01 | −6.4454E−02 |
| A4= | −4.1544E−02 | −1.2461E+00 | −1.0622E+00 | −6.3217E−02 | 1.6463E−01 |
| A6= | 1.7057E+00 | 2.4588E+00 | 2.7483E+00 | 9.7758E−01 | −7.1458E−01 |
| A8= | −7.8336E+00 | −6.6224E+00 | −6.3085E+00 | −3.2111E+00 | 3.8252E+00 |
| A10= | 2.1070E+01 | 9.3728E+00 | 9.5419E+00 | 5.2529E+00 | −1.1032E+01 |
| A12= | −3.3976E+01 | −6.6266E+00 | −8.8482E+00 | −4.8791E+00 | 1.9017E+01 |
| A14= | 2.4079E+01 | −4.5039E−01 | 4.3218E+00 | 2.3971E+00 | −2.0385E+01 |
| A16= | | −8.2481E−01 | −4.7430E−01 | | 1.3332E+01 |
| A18= | | | | | −4.8515E+00 |
| A20= | | | | | 7.5114E−01 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.12 | TD/BL | 4.87 |
| Fno | 1.89 | TL/f | 5.36 |
| HFOV [deg.] | 57.6 | TL/YI | 4.34 |
| Vd1 | 37.4 | |R8|/Y42 | 0.75 |
| Vd2 | 19.5 | f/EPD | 1.89 |
| Vd3 | 37.4 | f/f1 | −0.61 |
| Vd4 | 19.5 | f/f2 | 0.29 |
| Vd5 | 61.1 | f/f3 | 0.83 |
| Vd1 + Vd2 + Vd3 + Vd4 + Vd5 | 174.9 | f/f4 | −0.38 |
| CT3/CT2 | 0.87 | f/f5 | 0.50 |
| CT3/CT5 | 1.11 | |P|max | 0.83 |
| CT3/(T12 + T23 + T34) | 0.89 | Sag51/CT5 | −0.01 |
| CTmax/CTmin | 4.57 | Sag51/Y51 | −0.01 |
| SL/TL | 0.57 | Y11/Y52 | 1.25 |
| T45/CT5 | 0.22 | YI/Y52 | 1.14 |
| TD [mm] | 4.97 | | |

In the 9th embodiment, the numbers of the inflection points of the outside surfaces and the inside surfaces of the first lens element 910, the second lens element 920, the third lens element 930, the fourth lens element 940 and the fifth lens element 950 are listed in the table below.

| 9th Embodiment - numbers of the inflection points | | | | | |
|---|---|---|---|---|---|
| | 910 | 920 | 930 | 940 | 950 |
| outside surface | 1 | — | 1 | 1 | 3 |
| inside surface | 1 | — | 1 | 1 | 1 |

In the optical lens system according to the 9th embodiment, each of the outside surface 941 and the inside surface 942 of the fourth lens element 940 includes one critical point in an off-axis region thereof, and the outside surface 951 of the fifth lens element 950 includes three critical points in an off-axis region thereof. The critical point located on the outside surface 941 of the fourth lens element 940 satisfies: Yc/Y=0.63. The critical point located on the inside surface 942 of the fourth lens element 940 satisfies: Yc/Y=0.75. The three critical points located on the outside surface 951 of the fifth lens element 950 satisfy: Yc/Y=0.25, 0.72, 0.98, respectively.

10th Embodiment

Figure 19:
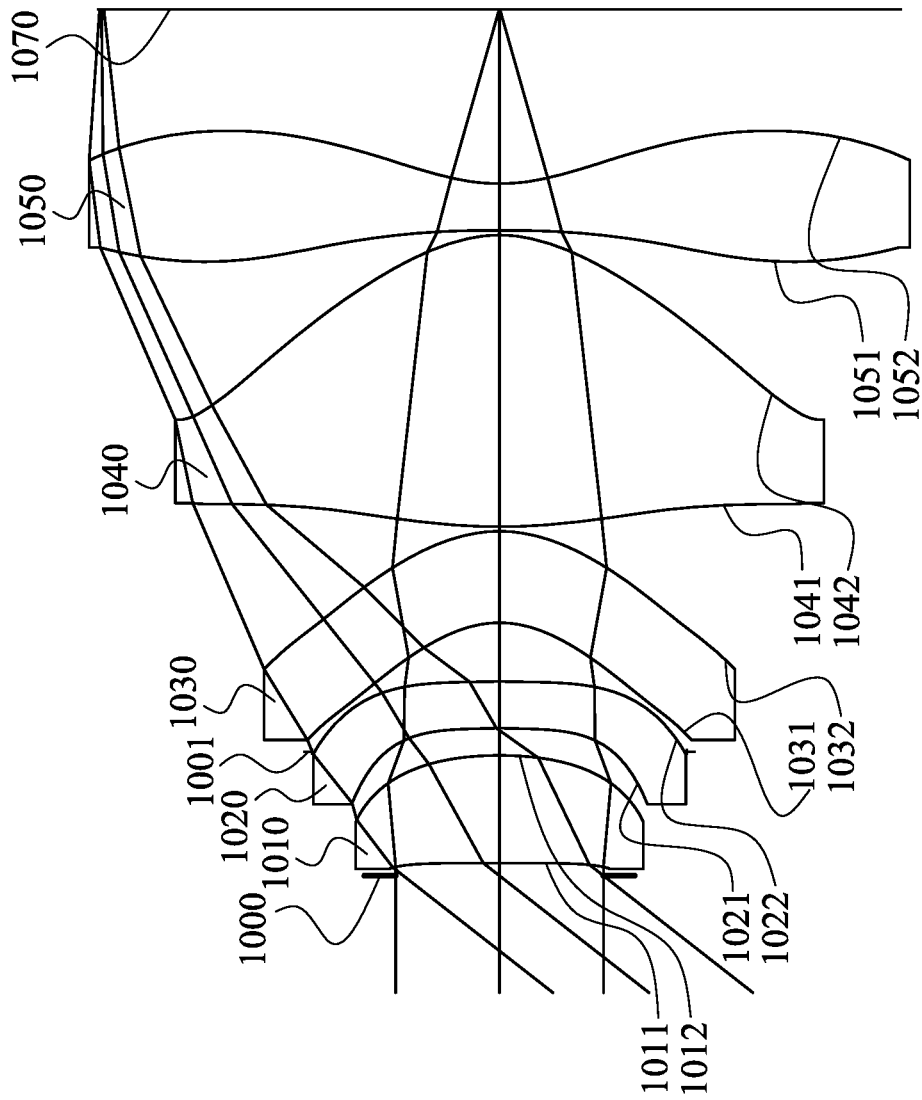
FIG. 19 is a schematic view of an electronic device according to the 10th embodiment of the present disclosure.
Figure 20:
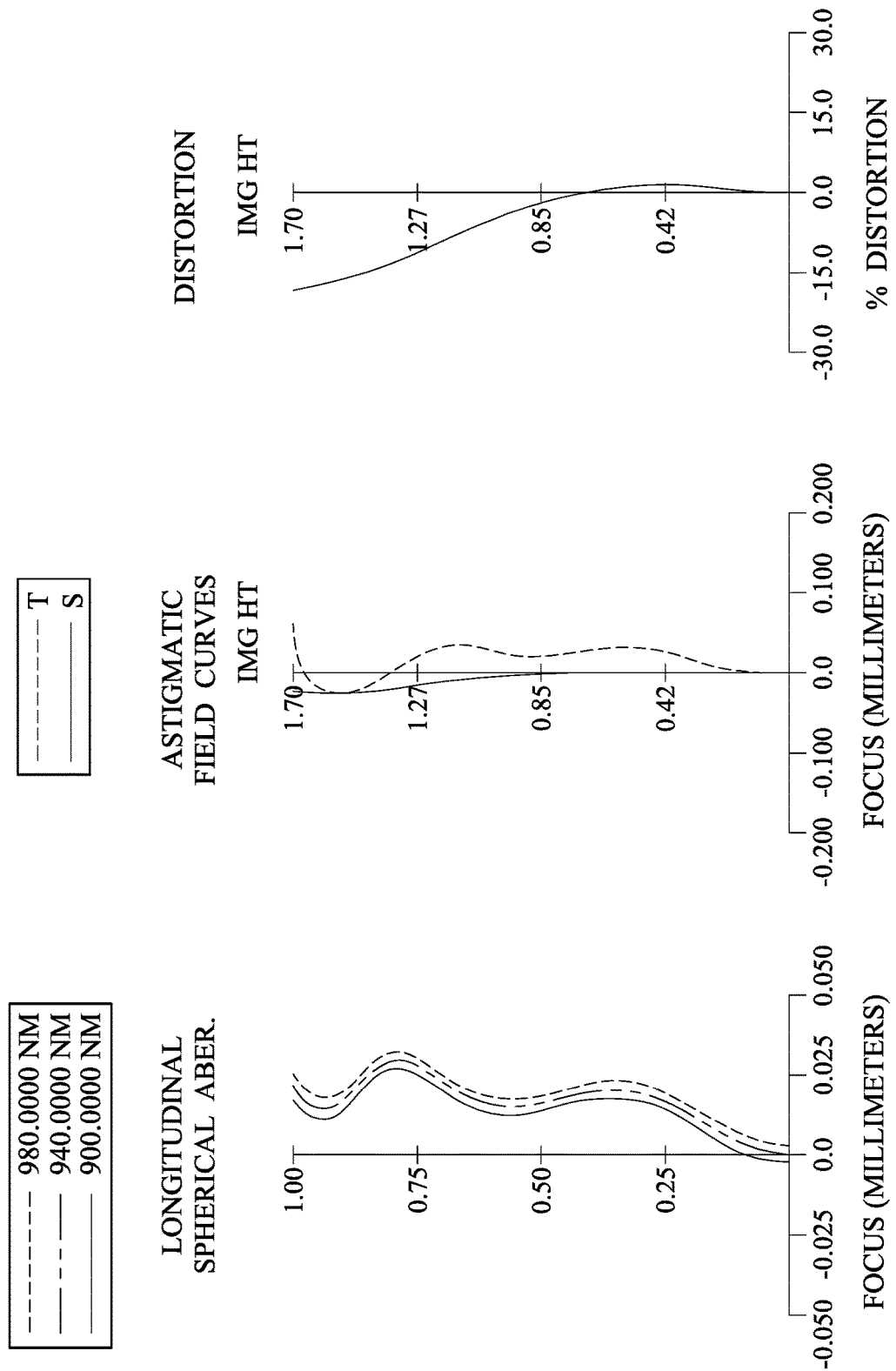
FIG. 20 shows spherical aberration curves, astigmatic field curves and a distortion curve of the electronic device according to the 10th embodiment.

FIG. 19 is a schematic view of an electronic device according to the 10th embodiment of the present disclosure. FIG. 20 shows spherical aberration curves, astigmatic field curves and a distortion curve of the electronic device according to the 10th embodiment. In FIG. 19, the electronic device includes an optical lens system (its reference numeral is omitted), wherein the optical lens system includes, in order from an outside to an inside, an aperture stop 1000, a first lens element 1010, a second lens element 1020, a stop 1001, a third lens element 1030, a fourth lens element 1040, a fifth lens element 1050 and an inside conjugation surface 1070. The optical lens system includes five lens elements (1010, 1020, 1030, 1040 and 1050) without additional one or more lens elements inserted between the first lens element 1010 and the fifth lens element 1050, and there is an air gap in a paraxial region between every adjacent lens element of the five lens elements.

The first lens element 1010 with positive refractive power has an outside surface 1011 being convex in a paraxial region thereof and an inside surface 1012 being convex in a paraxial region thereof. The first lens element 1010 is made of a plastic material, and has the outside surface 1011 and the inside surface 1012 being both aspheric. Furthermore, the outside surface 1011 of the first lens element 1010 includes at least one inflection point, and the outside surface 1011 of the first lens element 1010 includes at least one critical point in an off-axis region thereof.

The second lens element 1020 with negative refractive power has an outside surface 1021 being concave in a paraxial region thereof and an inside surface 1022 being convex in a paraxial region thereof. The second lens element 1020 is made of a plastic material, and has the outside surface 1021 and the inside surface 1022 being both aspheric.

The third lens element 1030 with negative refractive power has an outside surface 1031 being concave in a paraxial region thereof and an inside surface 1032 being convex in a paraxial region thereof. The third lens element 1030 is made of a plastic material, and has the outside surface 1031 and the inside surface 1032 being both aspheric. Furthermore, each of the outside surface 1031 and the inside surface 1032 of the third lens element 1030 includes at least one inflection point.

The fourth lens element 1040 with positive refractive power has an outside surface 1041 being convex in a paraxial region thereof and an inside surface 1042 being convex in a paraxial region thereof. The fourth lens element 1040 is made of a plastic material, and has the outside surface 1041 and the inside surface 1042 being both aspheric. Furthermore, each of the outside surface 1041 and the inside surface 1042 of the fourth lens element 1040 includes at least one inflection point, and each of the outside surface 1041 and the inside surface 1042 of the fourth lens element 1040 includes at least one critical point in an off-axis region thereof.

The fifth lens element 1050 with negative refractive power has an outside surface 1051 being concave in a paraxial region thereof and an inside surface 1052 being concave in a paraxial region thereof. The fifth lens element 1050 is made of a plastic material, and has the outside surface 1051 and the inside surface 1052 being both aspheric. Furthermore, each of the outside surface 1051 and the inside surface 1052 of the fifth lens element 1050 includes at least one inflection point, and each of the outside surface 1051 and the inside surface 1052 of the fifth lens element 1050 includes at least one critical point in an off-axis region thereof.

The detailed optical data of the 10th embodiment is shown in Table 19, and the aspheric surface data are shown in Table 20 below.

TABLE 19

10th Embodiment
f= 1.63 mm, Fno= 1.84, HFOV = 51.9 deg.

| Surface # | | Curvature Radius | | Thickness | Material | Index | Abbe # | Focal Length |
|---|---|---|---|---|---|---|---|---|
| 0 | Outside conjugation surface | Plano | | Infinity | | | | |
| 1 | Ape. Stop | Plano | | 0.054 | | | | |
| 2 | Lens 1 | 100.000 | ASP | 0.460 | Plastic | 1.634 | 20.4 | 2.26 |
| 3 | | −1.453 | ASP | 0.116 | | | | |
| 4 | Lens 2 | −4.750 | ASP | 0.200 | Plastic | 1.634 | 20.4 | −28.14 |
| 5 | | −6.579 | ASP | −0.300 | | | | |
| 6 | Stop | Plano | | 0.551 | | | | |
| 7 | Lens 3 | −0.457 | ASP | 0.391 | Plastic | 1.634 | 20.4 | −52.19 |
| 8 | | −0.618 | ASP | 0.020 | | | | |
| 9 | Lens 4 | 2.689 | ASP | 1.246 | Plastic | 1.535 | 56.0 | 1.05 |
| 10 | | −0.597 | ASP | 0.020 | | | | |
| 11 | Lens 5 | −6.624 | ASP | 0.200 | Plastic | 1.617 | 23.5 | −1.16 |
| 12 | | 0.810 | ASP | 0.744 | | | | |
| 13 | Inside conjugation surface | Plano | | — | | | | |

Reference wavelength (infrared light) is 940.0 nm
Effective radius of Surface 6 is 0.800 mm

TABLE 20

Aspheric Coefficients

| Surface # | 2 | 3 | 4 | 5 | 7 |
|---|---|---|---|---|---|
| k= | −9.9000E+01 | 3.0931E−01 | 3.9799E+01 | 5.4395E+01 | −2.8715E+00 |
| A4= | −4.8760E−01 | −4.9878E−01 | −8.2035E−01 | −3.1468E−01 | −1.9230E+00 |
| A6= | 5.1838E+00 | −4.0271E+00 | −2.8100E+00 | 3.8839E−01 | 1.2498E+01 |
| A8= | −5.6953E+01 | 3.7908E+01 | 9.1139E+00 | −5.7184E+00 | −4.9572E+01 |
| A10= | 2.2889E+02 | −1.9718E+02 | −3.4928E+01 | 1.1659E+01 | 1.1216E+02 |
| A12= | −1.9035E+02 | 5.0104E+02 | 4.0098E+01 | −7.5070E+00 | −1.2799E+02 |
| A14= | −7.8781E+02 | −5.1953E+02 | | | 5.6616E+01 |

| Surface # | 8 | 9 | 10 | 11 | 12 |
|---|---|---|---|---|---|
| k= | −3.1914E+00 | 9.0092E−01 | −3.2861E+00 | −9.1177E−02 | −3.1556E+00 |
| A4= | −8.7783E−01 | −2.1859E−02 | −2.7462E−01 | −1.8549E−01 | −4.4475E−01 |
| A6= | 3.5519E+00 | −3.1830E−01 | 5.0306E−01 | 2.4512E−01 | 5.0764E−01 |
| A8= | −1.0085E+01 | 4.3197E−01 | −6.6048E−01 | −1.3311E−01 | −3.8087E−01 |
| A10= | 1.6388E+01 | −2.6829E−01 | 5.0700E−01 | 4.3456E−02 | 1.7646E−01 |
| A12= | −1.3103E+01 | 7.7567E−02 | −2.0254E−01 | −9.0792E−03 | −4.7978E−02 |
| A14= | 3.9913E+00 | −7.4802E−03 | 3.5924E−02 | 1.1120E−03 | 6.9142E−03 |
| A16= | | | −1.1242E−03 | −5.7144E−05 | −4.0110E−04 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 1.63 | TD/BL | 3.90 |
| Fno | 1.84 | TL/f | 2.23 |
| HFOV [deg.] | 51.9 | TL/YI | 2.15 |
| Vd1 | 20.4 | [R8]/Y42 | 0.43 |
| Vd2 | 20.4 | f/EPD | 1.84 |
| Vd3 | 20.4 | f/f1 | 0.72 |
| Vd4 | 56.0 | f/f2 | −0.06 |
| Vd5 | 23.5 | f/f3 | −0.03 |
| Vd1 + Vd2 + Vd3 + Vd4 + Vd5 | 140.7 | f/f4 | 1.55 |
| CT3/CT2 | 1.96 | f/f5 | −1.41 |
| CT3/CT5 | 1.96 | |P|max | 1.55 |
| CT3/(T12 + T23 + T34) | 1.01 | Sag51/CT5 | −0.37 |
| CTmax/CTmin | 6.23 | Sag51/Y51 | −0.04 |
| SL/TL | 1.01 | Y11/Y52 | 0.27 |
| T45/CT5 | 0.10 | YI/Y52 | 0.97 |
| TD [mm] | 2.90 | | |

In the 10th embodiment, the numbers of the inflection points of the outside surfaces and the inside surfaces of the first lens element 1010, the second lens element 1020, the third lens element 1030, the fourth lens element 1040 and the fifth lens element 1050 are listed in the table below.

| 10th Embodiment - numbers of the inflection points | | | | | |
|---|---|---|---|---|---|
| | 1010 | 1020 | 1030 | 1040 | 1050 |
| outside surface | 1 | — | 3 | 2 | 1 |
| inside surface | — | — | 3 | 1 | 1 |

In the optical lens system according to the 10th embodiment, each of the outside surface 1011 of the first lens element 1010, the inside surface 1042 of the fourth lens element 1040, and the outside surface 1051 and the inside surface 1052 of the fifth lens element 1050 includes one critical point in an off-axis region thereof. The outside surface 1041 of the fourth lens element 1040 includes two critical points in an off-axis region thereof. The critical point located on the outside surface 1011 of the first lens element 1010 satisfies: Yc/Y=0.16. The two critical points located on the outside surface 1041 of the fourth lens element 1040 satisfy: Yc/Y=0.86, 0.92, respectively. The critical point located on the inside surface 1042 of the fourth lens element 1040 satisfies: Yc/Y=0.99. The critical point located on the outside surface 1051 of the fifth lens element 1050 satisfies: Yc/Y=0.74. The critical point located on the inside surface 1052 of the fifth lens element 1050 satisfies: Yc/Y=0.66.

11th Embodiment

Figure 23A:
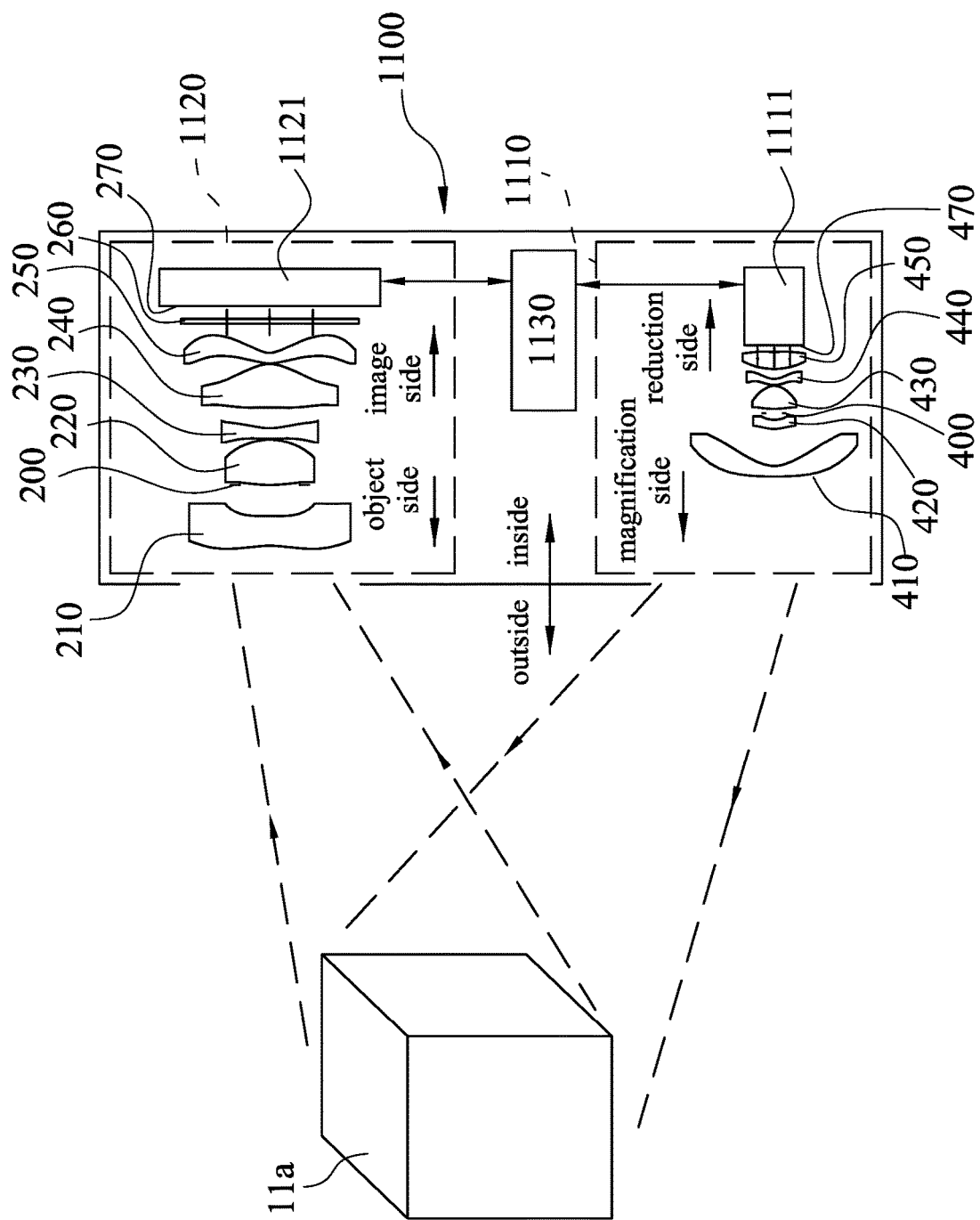
FIG. 23A is a schematic view of a sensing module of an electronic device according to the 11th embodiment of the present disclosure.
Figure 23C:
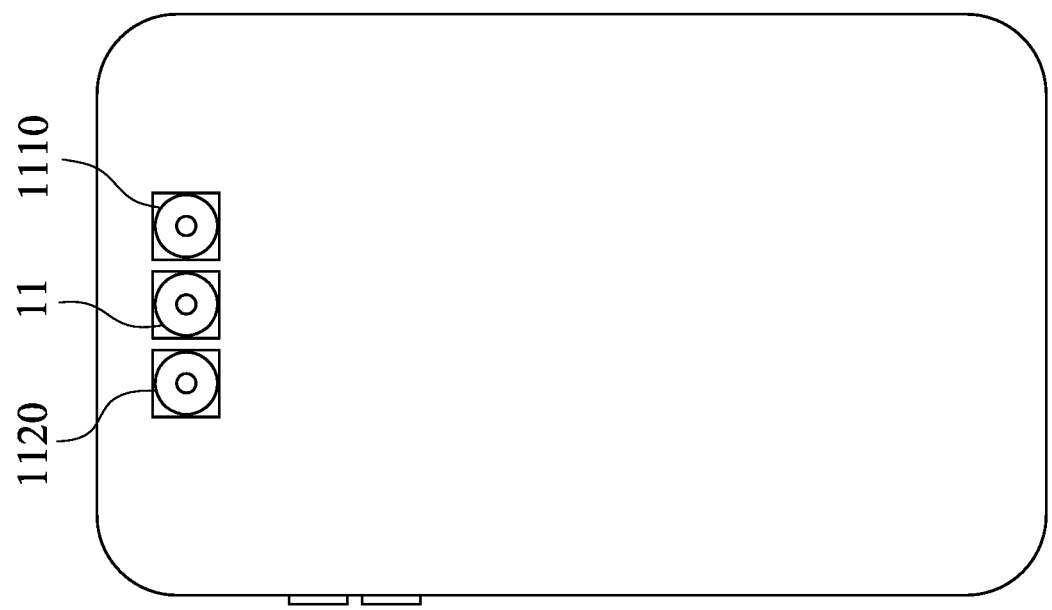
FIG. 23C is a schematic view of an appearance of the other side of the electronic device according to the 11th embodiment of the present disclosure.
Figure 23B:
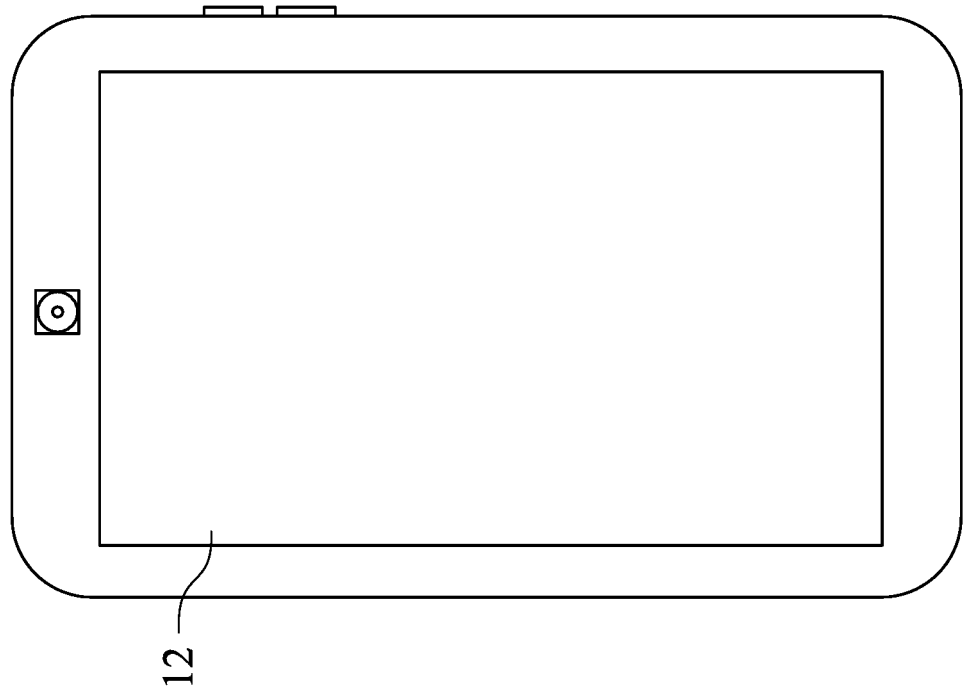
FIG. 23B is a schematic view of an appearance of one side of the electronic device according to the 11th embodiment of the present disclosure.

FIG. 23A is a schematic view of a sensing module 1100 of an electronic device 10 according to the 11th embodiment of the present disclosure. FIG. 23B is a schematic view of an appearance of one side of the electronic device 10 according to the 11th embodiment of the present disclosure. FIG. 23C is a schematic view of an appearance of the other side of the electronic device 10 according to the 11th embodiment of the present disclosure. In FIGS. 23A, 23B and 23C, the electronic device 10 according to the 11th embodiment is a tablet, which includes the sensing module 1100, an image capturing apparatus 11 and a display apparatus 12.

The sensing module 1100 includes a projection apparatus 1110, a receiving apparatus 1120 and a processor 1130, wherein the projection apparatus 1110 and the receiving apparatus 1120 are connected to the processor 1130. The projection apparatus 1110 includes a projection lens system (its reference numeral is omitted), which is the optical lens system according to the aforementioned 4th embodiment and at least one light source 1111, wherein the optical lens system includes, in order from an outside to an inside (that is, from a magnification side to a reduction side of the projection apparatus 1110), the first lens element 410, the second lens element 420, the aperture stop 400, the third lens element 430, the fourth lens element 440, the fifth lens element 450 and the inside conjugation surface 470, and the light source 1111 can be composed by a laser array, and can be vertical cavity surface emitting laser, which is disposed on the inside conjugation surface 470 of the optical lens system. The receiving apparatus 1120 includes an imaging lens system (its reference numeral is omitted), which is the optical lens system according to the aforementioned 2nd embodiment and an image sensor 1121, wherein the optical lens system includes, in order from an outside to an inside (that is, from an object side to an image side of the receiving apparatus 1120), the first lens element 210, the aperture stop 200, the second lens element 220, the third lens element 230, the fourth lens element 240, the fifth lens element 250, the filter 260 and the inside conjugation surface 270, and the image sensor 1121 is disposed on the inside conjugation surface 270 of the optical lens system.

The light of the light source 1111 of the projection apparatus 1110 passes through the optical lens system thereof so as to form into a structured light and project on a sensed object 11a. The receiving apparatus 1120 receives the reflective light from the sensed object 11a, images on the image sensor 1121, and the received information can be calculated by the processor 1130 so as to obtain the relative distance of each portion of the sensed object 11a, further obtain the 3D-shaped variation on the surface of the sensed object 11a.

In the 11th embodiment, the projection apparatus 1110 and the receiving apparatus 1120 (including the optical lens systems, the light source 1111 and the image sensor 1121) can be applied to the infrared band (750 nm-1500 nm) so as to decrease the interference from the visible light and enhance the sensing precision.

The image capturing apparatus 11 includes an image capturing lens assembly (its reference numeral is omitted), which is the optical lens system according to the aforementioned 5th embodiment according to the aforementioned 5th embodiment and an image sensor (its reference numeral is omitted) disposed on the inside conjugation surface 570, wherein the image capturing apparatus 11 (including the optical lens system and the image sensor) can be applied to the visible light (350 nm-750 nm). The image capturing apparatus 11 can be utilized to photographing, and can be matched to the sensing module 1100, wherein the obtained information of the receiving apparatus 1120 and the image capturing apparatus 11 can be shown on the display apparatus 12 after processing.

The sensed object 11a can include the surrounding environment, the sensing module 1100 can be matched with the image capturing apparatus 11 and the display apparatus 12 so as to apply but not limited to the augmented reality function, so that users can interact with the surrounding environment.

Furthermore, in the 11th embodiment, the projection apparatus 1110 includes the optical lens system according to the aforementioned 4th embodiment, the receiving apparatus 1120 includes the optical lens system according to the aforementioned 2nd embodiment and the image capturing apparatus 11 includes the optical lens system according to the aforementioned 5th embodiment, but the present disclosure will not be limited thereto. The projection lens system of the projection apparatus 1110, the imaging lens system the receiving apparatus 1120 and the image capturing lens assembly of the image capturing apparatus 11 can be other optical lens system according to the present disclosure. Alternatively, at least one of the projection lens system of the projection apparatus 1110, the imaging lens system the receiving apparatus 1120 and the image capturing lens assembly of the image capturing apparatus 11 can be the optical lens system according to the present disclosure, and others can differ from the optical lens system of the present disclosure according to actual needs.

12th Embodiment

Figure 24A:
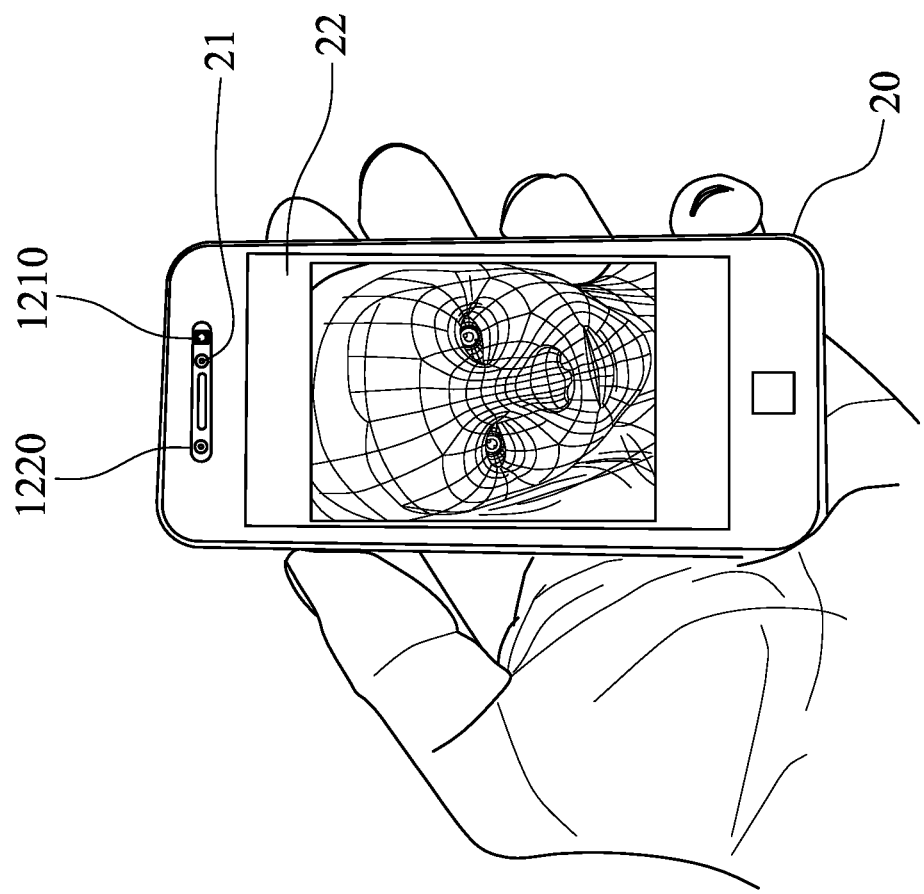
FIG. 24A is a schematic view of an appearance of the using state of an electronic device according to the 12th embodiment of the present disclosure.
Figure 24B:
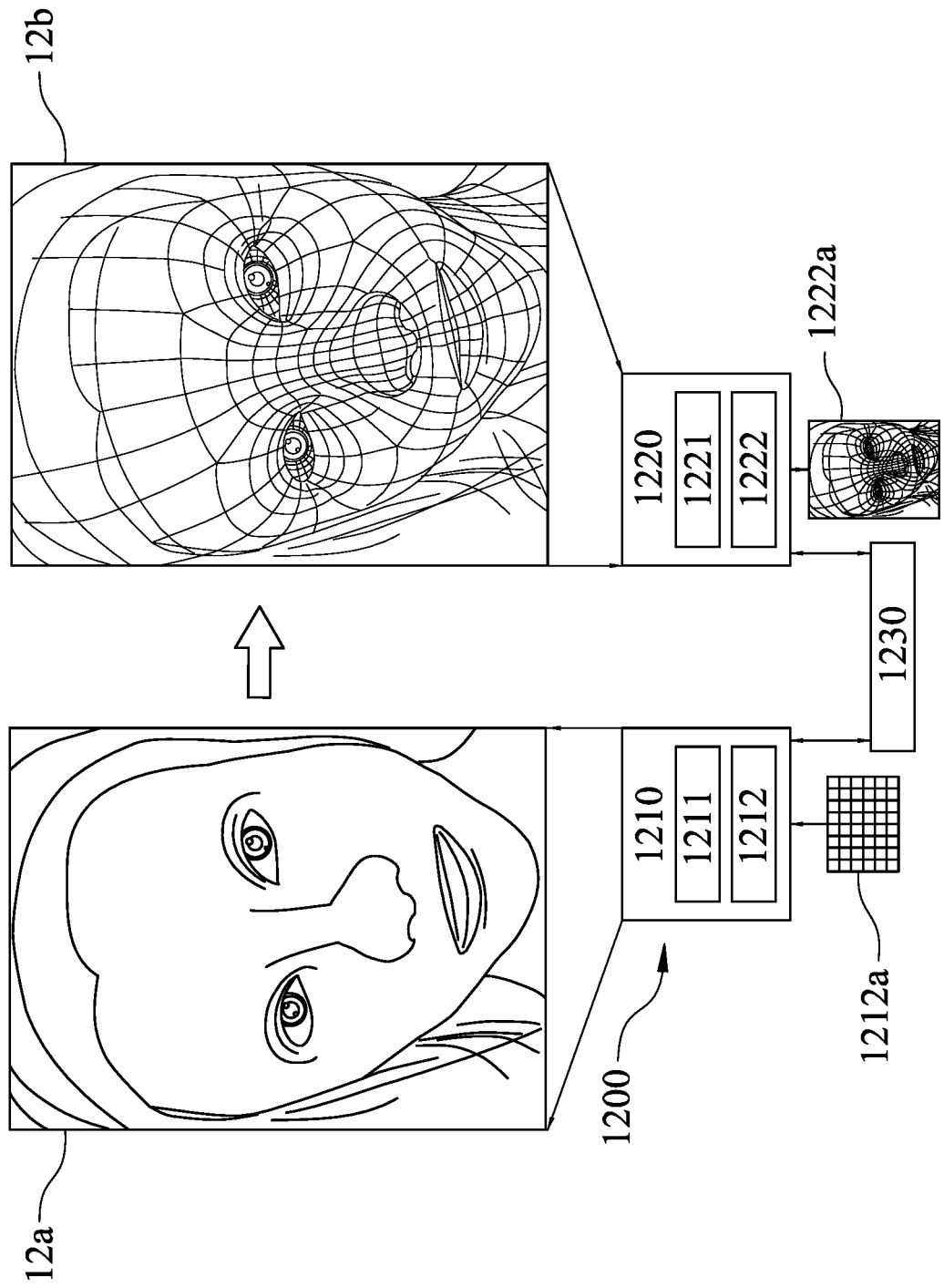
FIG. 24B is a schematic view of a sensing module of the electronic device according to the 12th embodiment of the present disclosure.

FIG. 24A is a schematic view of an appearance of the using state of an electronic device 20 according to the 12th embodiment of the present disclosure. FIG. 24B is a schematic view of a sensing module 1200 of the electronic device 20 according to the 12th embodiment of the present disclosure. According to the 12th embodiment, the electronic device 20 is a smartphone, which includes the sensing module 1200, an image capturing apparatus 21 and a display apparatus 22.

The sensing module 1200 includes a projection apparatus 1210, a receiving apparatus 1220 and a processor 1230, wherein the projection apparatus 1210 and the receiving apparatus 1220 are connected to the processor 1230. According to the 12th embodiment, the projection apparatus 1210 includes an optical lens system 1211 and a light source 1212, the receiving apparatus 1220 includes an optical lens system 1221 and an image sensor 1222, wherein the connecting relationship and functions of the image capturing apparatus 21, the projection apparatus 1210, the receiving apparatus 1220 and the processor 1230 can be the same with the image capturing apparatus 11, the projection apparatus 1110, the receiving apparatus 1120 and the processor 1130 stated in the 11th embodiment, and will not describe again herein.

The sensing module 1200 can be applied to face recognition function, in FIG. 24B, the light source 1212 can be composed by a laser array 1212a, which can form structured light with the optical lens system 1211 of the projection apparatus 1210, and project on an sensed object 12a, wherein the sensed object 12a is shown without an array image of projection, and the sensed object 12b is shown with an array image of projection. The optical lens system 1221 of the receiving apparatus 1220 receives the reflective light from the sensed object 12b, images on the image sensor 1222, and the received image 1222a can be calculated by the processor 1230 so as to obtain the relative distance of each portion of the sensed object 12b, further obtain the 3D-shaped variation on the surface of the sensed object 12b. Therefore, the security of the electronic device 20 in usage can be enhanced, but is not limited thereto. The image capturing apparatus 21 can be utilized to photographing, and can be matched to the sensing module 1200, wherein the obtained information of the receiving apparatus 1220 and the image capturing apparatus 21 can be shown on the display apparatus 22 after processing.

13th Embodiment

Figure 25:
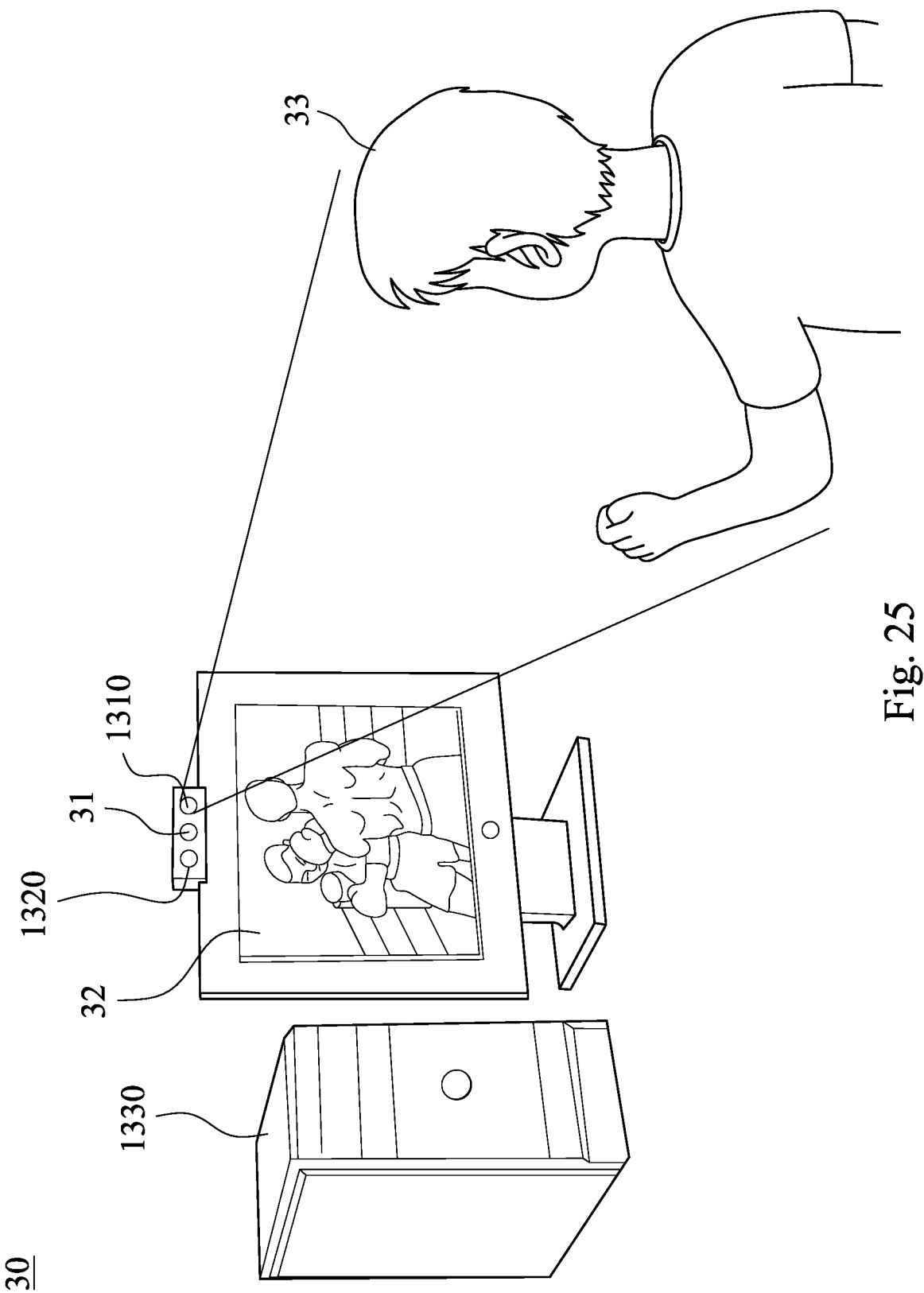
FIG. 25 is a schematic view of an electronic device according to the 13th embodiment of the present disclosure.

FIG. 25 is a schematic view of an electronic device 30 according to the 13th embodiment of the present disclosure. In the 13th embodiment, the electronic device 30 includes a sensing module (its reference numeral is omitted), an image capturing apparatus 31 and a display apparatus 32.

The sensing module includes a projection apparatus 1310, a receiving apparatus 1320 and a processor 1330, wherein the projection apparatus 1310 and the receiving apparatus 1320 are connected to the processor 1330. According to the 13th embodiment, the connecting relationship and functions of the image capturing apparatus 31, the projection apparatus 1310, the receiving apparatus 1320 and the processor 1330 can be the same with the image capturing apparatus 11, the projection apparatus 1110, the receiving apparatus 1120 and the processor 1130 stated in the 11th embodiment, and will not describe again herein.

According to the 13th embodiment, the sensing module can be utilized to capture the dynamic variation of the sensed object 33 so as to implement human-computer interaction, but is not limited thereto. The image capturing apparatus 31 can be utilized to photographing, and can be matched to the sensing module, wherein the obtained information of the receiving apparatus 1320 and the image capturing apparatus 31 can be shown on the display apparatus 32 after processing.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic device, comprising at least one optical lens system, which comprises five lens elements, the five lens elements being in order from an outside to an inside, a first lens element, a second lens element, a third lens element, a fourth lens element and a fifth lens element;
   wherein at least one of outside surfaces and inside surfaces of the first lens element, the second lens element, the third lens element, the fourth lens element and the fifth lens element is aspheric and comprises at least one inflection point;
   wherein at least four lens elements of the first lens element, the second lens element, the third lens element, the fourth lens element and the fifth lens element have Abbe numbers smaller than 38;
   wherein a total number of lens elements in the at least one optical lens system is five, an axial distance between an outside surface of one of the lens elements closest to the outside and an inside surface of one of the lens elements closest to the inside is TD, an axial distance between the outside surface of the first lens element and an inside conjugation surface of the optical lens system is TL, a focal length of the optical lens system is f, an entrance pupil diameter of the optical lens system is EPD, a central thickness of the third lens element is CT3, an axial distance between the first lens element and the second lens element is T12, an axial distance between the second lens element and the third lens element is T23, an axial distance between the third lens element and the fourth lens element is T34, a focal length of the first lens element is f1, a focal length of the second lens element is f2, a focal length of the third lens element is f3, a focal length of the fourth lens element is f4, a focal length of the fifth lens element is f5, and the following conditions are satisfied:

0.80 mm<$TD$<7.0 mm;

1.55<$TL/f$;

1.0<$f$/EPD<2.0;

0<CT3/($T$12+$T$23+$T$34)<10;

−1.5<$f/f1$≤−0.42;

−2.0<$f/f2$<2.0;

−1.8<$f/f3$<1.8;

−2.0<$f/f4$<2.5; and

−2.5<$f/f5$<1.5.

2. The electronic device of claim 1, wherein at least four lens elements of the first lens element, the second lens element, the third lens element, the fourth lens element and the fifth lens element have the Abbe numbers smaller than 35, the focal length of the optical lens system is f, the focal length of the fifth lens element is f5, and the following condition is satisfied:

0.23≤$f/f5$<1.5.

3. The electronic device of claim 1, wherein half of a maximum field of view of the optical lens system is HFOV, a maximum value of central thicknesses of the lens elements of the optical lens system is CTmax, a minimum value of the central thicknesses of the lens elements of the optical lens system is CTmin, and the following conditions are satisfied:

45.0 degrees<HFOV; and 4.30≤CTmax/CTmin<7.50.

4. The electronic device of claim 1, wherein when a measurement is made in accordance with a reference wavelength as a d-line, an Abbe number of the first lens element is Vd1, an Abbe number of the second lens element is Vd2, an Abbe number of the third lens element is Vd3, an Abbe number of the fourth lens element is Vd4, an Abbe number of the fifth lens element is Vd5, a central thickness of the second lens element is CT2, the central thickness of the third lens element is CT3, and the following conditions are satisfied:

50.0<$Vd1+Vd2+Vd3+Vd4+Vd5$<200; and 3.66≤CT3/CT2<7.0.

5. The electronic device of claim 1, wherein an axial distance between the fourth lens element and the fifth lens element is T45, a central thickness of the fifth lens element is CT5, the axial distance between the outside surface of one of the lens elements closest to the outside and the inside surface of one of the lens elements closest to the inside is TD, an axial distance between the inside surface of the fifth lens element and the inside conjugation surface of the optical lens system is BL, and the following conditions are satisfied:

0<$T$45/CT5<1.50; and 2.50<$TD/BL$<30.0.

6. The electronic device of claim 1, wherein the axial distance between the outside surface of the first lens element and the inside conjugation surface of the optical lens system is TL, a maximum optical effective radius of the inside conjugation surface of the optical lens system is YI, the focal length of the optical lens system is f, the focal length of the fourth lens element is f4, and the following conditions are satisfied:

0.80<$TL/YI$<5.5; and

−0.91≤$f/f4$≤−0.69.

7. The electronic device of claim 1, wherein the central thickness of the third lens element is CT3, a central thickness of the fifth lens element is CT5, a curvature radius of the inside surface of the fourth lens element is R8, a maximum optical effective radius of the inside surface of the fourth lens element is Y42, and the following conditions are satisfied:

0.10<CT3/CT5<6.0; and

|R8|/Y42<1.25.

8. The electronic device of claim 1, wherein the focal length of the optical lens system is f, the focal length of the first lens element is f1, the focal length of the second lens element is f2, the focal length of the third lens element is f3, the focal length of the fourth lens element is f4, the focal length of the fifth lens element is f5, and the following conditions are satisfied:

−1.0<$f/f1$≤−0.57;

−1.0<$f/f2$<1.5;

−1.4<$f/f3$<1.4;

−1.5<$f/f4$<2.0; and

−2.0<$f/f5$<1.2.

9. The electronic device of claim 1, wherein a displacement in parallel with an optical axis from an axial vertex on the outside surface of the fifth lens element to a maximum effective radius position on the outside surface of the fifth lens element is Sag51, a central thickness of the fifth lens element is CT5, a maximum optical effective radius of the outside surface of the first lens element is Y11, a maximum optical effective radius of the inside surface of the fifth lens element is Y52, and the following conditions are satisfied:

−0.50<Sag51/CT5<1.0; and 1.25≤$Y$11/$Y$52<1.6.

10. The electronic device of claim 1, wherein a maximum optical effective radius of the inside conjugation surface of the optical lens system is YI, a maximum optical effective radius of the inside surface of the fifth lens element is Y52, and the following condition is satisfied:

0.60<YI/Y52<1.10.

11. The electronic device of claim 1, wherein at least one of the outside surfaces and the inside surfaces of the first lens element, the second lens element, the third lens element, the fourth lens element and the fifth lens element comprises at least one critical point in an off-axis region thereof, a vertical distance between the critical point and an optical axis is Yc, a maximum optical effective radius of the surface where the critical point located is Y, and the following condition is satisfied:

$0.10 < Yc/Y < 0.90.$

12. The electronic device of claim 1, wherein the optical lens system is applied to an infrared band within a wavelength ranged from 750 nm to 1500 nm.

13. The electronic device of claim 12, further comprising:
a receiving apparatus comprising the optical lens system and at least one image sensor, wherein the image sensor is disposed on the inside conjugation surface of the optical lens system.

14. The electronic device of claim 12, further comprising:
a projection apparatus comprising the optical lens system and at least one light source, wherein the light source is disposed on the inside conjugation surface of the optical lens system.

15. The electronic device of claim 14, further comprising:
a sensing module comprising:
the projection apparatus; and
a receiving apparatus comprising an imaging lens system and an image sensor, wherein the image sensor is disposed on an inside conjugation surface of the imaging lens system;
wherein the light from the light source of the projection apparatus is projected on a sensed object and is received by the receiving apparatus after a reflection, and is imaged on the image sensor.

* * * * *